(12) United States Patent
Aoki et al.

(10) Patent No.: US 10,509,408 B2
(45) Date of Patent: *Dec. 17, 2019

(54) DRIVE PLANNING DEVICE, TRAVEL ASSISTANCE APPARATUS, AND DRIVE PLANNING METHOD

(71) Applicant: Nissan Motor Co., Ltd., Yokohama-shi, Kanagawa (JP)

(72) Inventors: Motonobu Aoki, Kanagawa (JP); Noriaki Fujiki, Kanagawa (JP); Susumu Fujita, Kanagawa (JP); Hikaru Nishira, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 110 days.

This patent is subject to a terminal disclaimer.

(21) Appl. No.: 15/745,589

(22) PCT Filed: Jul. 21, 2015

(86) PCT No.: PCT/JP2015/070747
§ 371 (c)(1),
(2) Date: Jan. 17, 2018

(87) PCT Pub. No.: WO2017/013749
PCT Pub. Date: Jan. 26, 2017

(65) Prior Publication Data
US 2018/0203454 A1 Jul. 19, 2018

(51) Int. Cl.
*G01C 22/00* (2006.01)
*G05D 1/02* (2006.01)
(Continued)

(52) U.S. Cl.
CPC ......... *G05D 1/0214* (2013.01); *G05D 1/0088* (2013.01); *G05D 1/0274* (2013.01); *G08G 1/096725* (2013.01); *G08G 1/096827* (2013.01)

(58) Field of Classification Search
CPC .. G05D 1/0214; G05D 1/0088; G05D 1/0274; B60W 30/09; G06K 9/00791;
(Continued)

(56) References Cited

U.S. PATENT DOCUMENTS 9,159,032 B1 * 10/2015 Tripathi ................. G06N 5/048
2004/0085197 A1 * 5/2004 Watanabe ................. B60T 7/22
340/435

(Continued)

FOREIGN PATENT DOCUMENTS

EP 3006294 A1 4/2016
EP 3118835 A1 1/2017
(Continued)

*Primary Examiner* — Shardul D Patel
(74) *Attorney, Agent, or Firm* — Young Basile Hanlon & MacFarlane, P.C.

(57) ABSTRACT

A drive planning processor plans a driving operation plan for a subject vehicle traveling on a route. The drive planning processor determines an action for each of a plurality of events which the subject vehicle encounters in a time-series manner when traveling on a first route and plans a series of driving operation plan for a scene which the subject vehicle encounters using content of each action determined for each of the plurality of events.

8 Claims, 50 Drawing Sheets

(51) Int. Cl.
  *G05D 1/00* (2006.01)
  *G08G 1/0967* (2006.01)
  *G08G 1/0968* (2006.01)

(58) Field of Classification Search
  CPC ..... G06K 2009/00738; G08G 1/09623; G08G 1/09626; G08G 1/163; G08G 1/166; G08G 1/096827; G08G 1/096725
  USPC ...................................... 701/24, 26; 318/587
  See application file for complete search history.

(56) References Cited

U.S. PATENT DOCUMENTS

| | | | | |
|---|---|---|---|---|
| 2005/0043867 | A1* | 2/2005 | Kudo | B60T 8/17557 701/23 |
| 2010/0256852 | A1* | 10/2010 | Mudalige | G08G 1/163 701/24 |
| 2012/0022716 | A1* | 1/2012 | Kitahama | G01C 21/34 701/1 |
| 2012/0218093 | A1* | 8/2012 | Yoshizawa | B60R 1/00 340/435 |
| 2012/0330540 | A1* | 12/2012 | Ozaki | G06Q 10/047 701/117 |
| 2015/0042463 | A1* | 2/2015 | Hiramatsu | G08G 1/0112 340/439 |
| 2015/0203126 | A1* | 7/2015 | Kobana | B60W 50/12 701/93 |
| 2016/0114800 | A1* | 4/2016 | Shimizu | B60W 30/0956 701/70 |
| 2016/0335892 | A1* | 11/2016 | Okada | B60T 7/22 |
| 2018/0203454 | A1* | 7/2018 | Aoki | B60W 30/09 |
| 2018/0208199 | A1* | 7/2018 | Fujita | G08G 1/00 |

FOREIGN PATENT DOCUMENTS

| | | |
|---|---|---|
| JP | 2006224754 A | 8/2006 |
| JP | 2009031968 A | 2/2009 |
| JP | 2010271844 A | 12/2010 |
| JP | 2011096105 A | 5/2011 |
| JP | 2011194979 A | 10/2011 |
| JP | 2013045306 A | 3/2013 |
| WO | 2011055823 A1 | 5/2011 |
| WO | 2013121587 A1 | 8/2013 |
| WO | 2014192370 A1 | 12/2014 |
| WO | 2015136958 A1 | 9/2015 |

\* cited by examiner

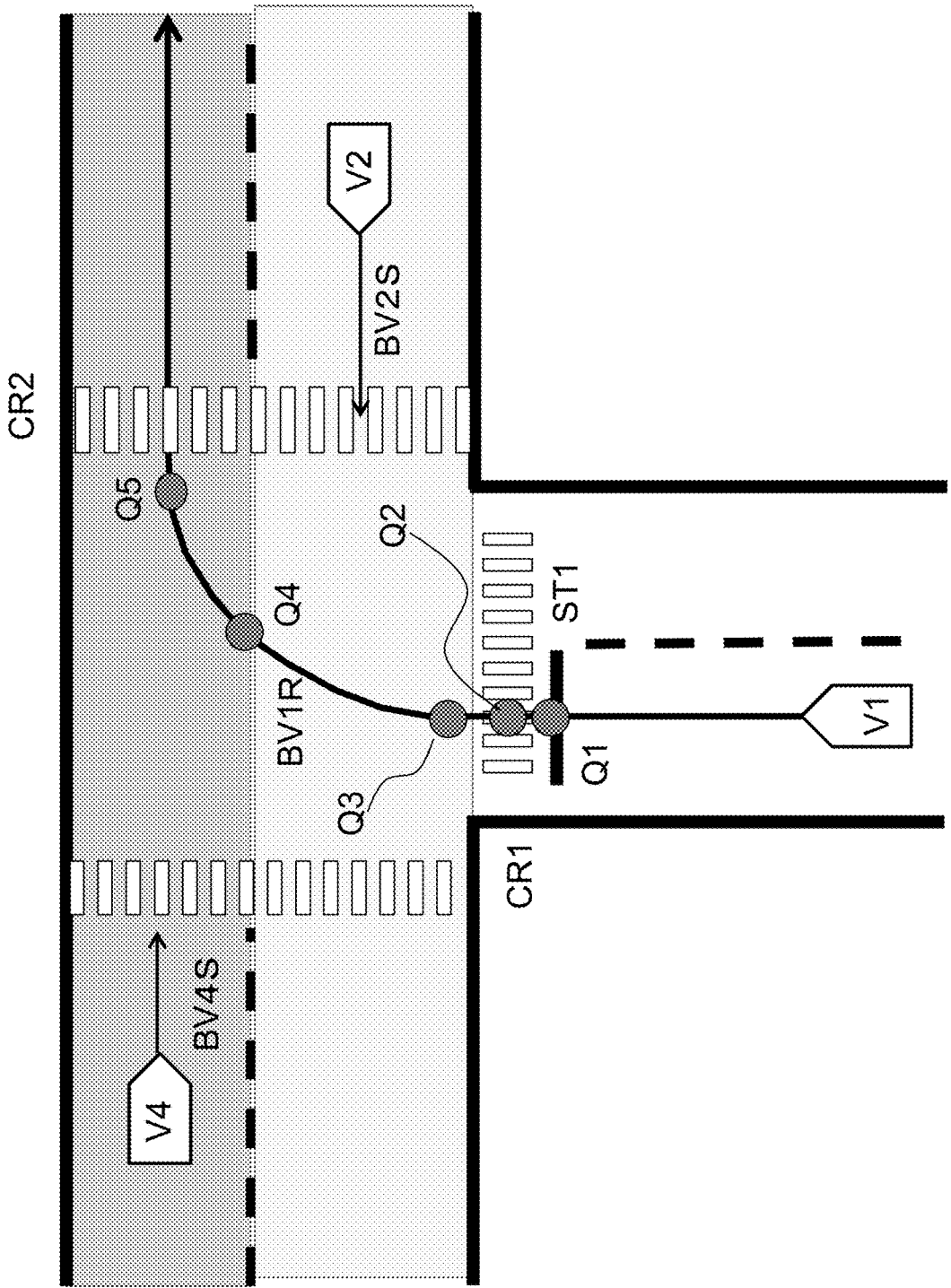

DRIVE PLANNING DEVICE, TRAVEL ASSISTANCE APPARATUS, AND DRIVE PLANNING METHOD

TECHNICAL FIELD

The present invention relates to a drive operational planning device configured to plan driving operation of a vehicle, a travel assistance apparatus, and a drive planning method.

BACKGROUND

With regard to this kind of device or apparatus, a technique utilizing multi-scale recognition is known. This technique includes calculating a set of traffic lines of a subject vehicle and an obstacle, estimating a risk in each traffic line based on existing probabilities of the subject vehicle and the obstacle at a point of intersection of their routes, and selecting a driving action (see Japanese Application Publication No. JP2011-96105A).

In the above prior art, however, a number of traffic lines of the subject vehicle and the obstacle are created as the traffic lines are subdivided by the multi-scale recognition, so the number of processing objects will be considerably large and, unfortunately, it may be difficult to determine the driving action in real time.

A problem to be solved by the present invention is to provide a drive planning device that quickly determines a driving operation plan in accordance with a scene which a subject vehicle traveling on a route encounters.

SUMMARY

The present invention solves the above problem by determining an action for each of a plurality of events which the subject vehicle encounters in a time-series manner when traveling on a first route, and planning a series of driving operation plan for a scene which the subject vehicle encounters using content of each action determined for each of the plurality of events.

According to the present invention, the process for determining the driving action can be simplified by determining an action for each of a plurality of events to be encountered in a time-series manner when traveling, and planning a series of driving operation plan for each scene using content of the action determined for each of the plurality of events. This allows an appropriate driving action to be determined while reducing the calculation load.

BRIEF DESCRIPTION OF THE DRAWINGS

FIG. 14A is a first view for describing a scheme of setting candidate stop positions in a T-intersection;

DETAILED DESCRIPTION OF THE EMBODIMENTS

Hereinafter, one or more embodiments of the present invention will be described with reference to the drawings. In the embodiments, the present invention will be described by exemplifying an example in which a travel scene determination device according to the present invention is applied to a travel assistance system equipped in a vehicle.

Figure 1:
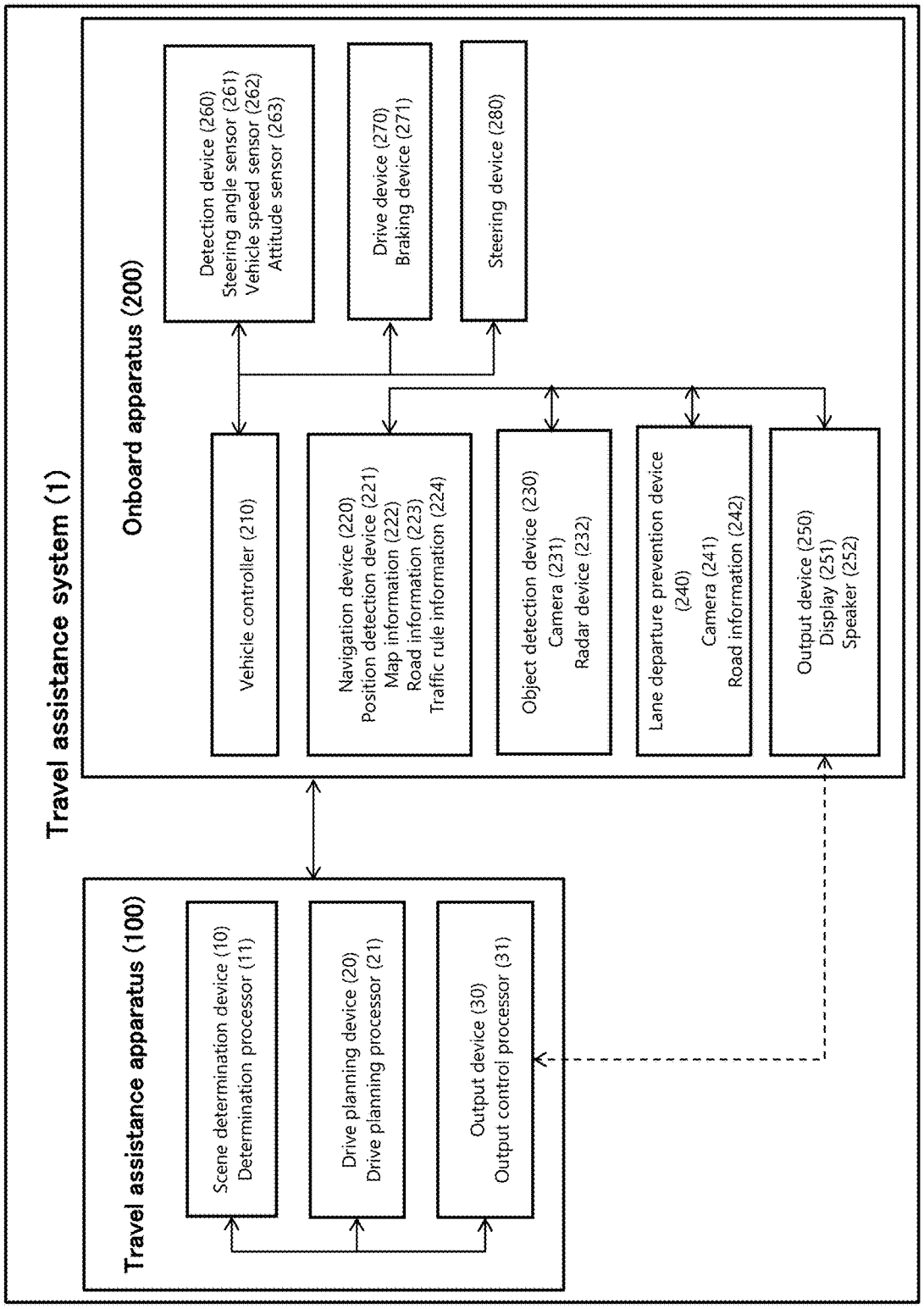
FIG. 1 is a block diagram illustrating a travel assistance system according to one or more embodiments of the present invention.

FIG. 1 is a diagram illustrating a block configuration of a travel assistance system 1 according to one or more embodiments of the present invention. The travel assistance system 1 comprises a travel assistance apparatus 100 and an onboard apparatus 200. In the present invention, the form of embodying the travel assistance apparatus 100 is not limited. The travel assistance apparatus 100 may be equipped in a vehicle or may also be applied to portable terminal devices that can exchange information with the onboard apparatus 200. Examples of such terminal devices include equipment, such as a smartphone and PDA. The travel assistance system 1, the travel assistance apparatus 100, the onboard apparatus 200, and various modules provided therein may each be a computer that includes an arithmetic processing unit, such as one or more CPUs, and executes calculation processes.

The onboard apparatus 200 will be described first.

The onboard apparatus 200 according to one or more embodiments of the present invention comprises a vehicle controller 210, a navigation device 220, an object detection device 230, a lane departure prevention device 240, and an output device 250. These devices which constitute the onboard apparatus 200 are connected to one another via a controller area network (CAN) or other onboard LAN to mutually exchange information. The onboard apparatus 200 can exchange information with the travel assistance apparatus 100 via such an onboard LAN. The vehicle controller 210 according to one or more embodiments of the present invention operates in cooperation with a detection device 260, a drive device 270, and a steering device 280.

The vehicle controller 210 according to one or more embodiments of the present invention is provided with the detection device 260. The detection device 260 has a steering angle sensor 261, a vehicle speed sensor 262, and an attitude sensor 263. The steering angle sensor 261 detect information, such as steering, steering amount, steering speed and steering acceleration, and outputs the information to the vehicle controller 210. The vehicle speed sensor 262 detects a speed and/or acceleration of the vehicle and outputs the detection result to the vehicle controller 210. The attitude sensor 263 detects a position of the vehicle, a pitch angle of the vehicle, a yaw angle of the vehicle, and a roll angle of the vehicle and outputs them to the vehicle controller 210. The attitude sensor 263 according to one or more embodiments of the present invention includes a gyro sensor.

The vehicle controller 210 according to one or more embodiments of the present invention is an onboard computer, such as an engine/electronic control unit (ECU), and electronically controls the driving state of the vehicle. The vehicle according to one or more embodiments of the present invention may be, for example, an electric car having an electric motor as the traveling drive source, an engine car having an internal-combustion engine as the traveling drive source, or a hybrid car having both an electric motor and an internal-combustion engine as the traveling drive sources. Examples of the electric car and hybrid car having an electric motor as the traveling drive source include a type in which the power source for the electric motor is a secondary battery and a type in which the power source for the electric motor is a fuel cell.

The drive device 270 according to one or more embodiments of the present invention includes a drive mechanism of a subject vehicle V. The drive mechanism includes an electric motor and/or internal-combustion engine as the above-described traveling drive sources, a power transmission device including a drive shaft and automatic transmission that transmit the output of the traveling drive source or sources to the drive wheels, and a braking device 271 that brakes wheels. The drive device 270 generates respective control signals for these components of the drive mechanism and executes the travel control including acceleration and deceleration of the vehicle. These control signals for the drive mechanism are generated on the basis of input signals by an accelerator operation and brake operation and control signals acquired from the vehicle controller 210 or from the travel assistance apparatus 100. Control information may be sent to the drive device 270, which can thereby automatically perform the travel control including acceleration and deceleration of the vehicle. In the case of a hybrid car, the drive device 270 may receive a ratio of the torque output to the electric motor and the torque output to the internal-combustion engine in accordance with the traveling state of the vehicle.

The steering device 280 according to one or more embodiments of the present invention includes a steering actuator. The steering actuator includes a motor and other necessary components attached to the steering column shaft. The steering device 280 executes control of varying the traveling direction of the vehicle on the basis of a control signal acquired from the vehicle controller 210 or an input signal by the steering operation. The vehicle controller 210 sends control information, including a steering amount, to the steering device 280 thereby to execute the control of varying the traveling direction. In addition or alternatively, the travel assistance apparatus 100 may control a braking quantity for each wheel of the vehicle thereby to execute the control of varying the traveling direction. In this case, the vehicle controller 210 sends control information, including the braking quantity for each wheel, to the braking device 271 thereby to execute the control of varying the traveling direction. Control of the drive device 270 and/or control of the steering device 280 may be performed in a completely automatic manner or in a form of assisting with the drive operation (traveling operation) by the driver. Control of the drive device 270 and control of the steering device 280 can be suspended/canceled due to an intervention operation by the driver. The vehicle controller 210 controls the driving of the subject vehicle in accordance with a driving operation plan (driving program) planned by a drive planning device 20.

The onboard apparatus 200 according to one or more embodiments of the present invention includes the navigation device 220. The navigation device 220 according to one or more embodiments of the present invention calculates a route from the current position of the subject vehicle to a destination. A known scheme at the time of filing of the present application based on a graph search algorithm, such as Dijkstra's algorithm and A* search algorithm, can be used as the scheme of calculating the route. The calculated route is sent to the vehicle controller 210 to be used for the traveling assistance for the subject vehicle. The calculated route is output as route guidance information via the output device 250, which will be described later.

The navigation device 220 includes a position detection device 221. The position detection device 221 according to one or more embodiments of the present invention is responsible to the Global Positioning System (GPS) and detects a traveling position (latitude and longitude) of the vehicle traveling.

The navigation device 220 possesses accessible map information 222, road information 223, and traffic rule information 224. It suffices that the map information 222, road information 223, and traffic rule information 224 can be read by the navigation device 220, and they may be provided as information items that are physically separated from the navigation device 220 or may also be stored in a server that is readable via a communication means.

The map information 222 according to one or more embodiments of the present invention is a so-called electronic map that represents information in which the latitude and longitude are associated with the map information. The map information 222 has the road information 223 which is associated with each point.

The road information 223 according to one or more embodiments of the present invention is defined by nodes and links connecting between nodes. The road information 223 includes information that specifies a road by a position/region of the road, the type of a road, the road width of a road, and shape information of a road. The road information 223 according to one or more embodiments of the present invention is stored such that identification information of each road link is associated with the position of an intersection, the entering direction into the intersection, the type of the intersection, and other information regarding the intersection. The road information 223 according to one or more embodiments of the present invention is also stored such that identification information of each road link is associated with the road type, road width, road shape, whether or not the straight-ahead traveling is permitted, the priority relationship in traveling, whether or not the overtaking is permitted (whether or not the lane change to an adjacent lane is permitted), and other road-related information.

The navigation device 220 specifies a first route on which the subject vehicle travels, on the basis of the current position of the subject vehicle detected by the position detection device 221. The first route on which the subject vehicle travels may be specified on each road, specified in each lane of which the inbound/outbound direction is specified, specified in each single lane in which the subject vehicle actually travels, and/or specified in each finite section. The navigation device 220 according to one or more embodiments of the present invention refers to the road information 223, which will be described later, to specify a road link as the first route on which the subject vehicle travels. The first route according to one or more embodiments of the present invention includes specific information (coordinate information) of one or more points through which the subject vehicle V1 passes in the future. The first route at least includes one point that suggests the next traveling position at which the subject vehicle travels. The target route (first route) may be composed of a continuous line or may also be composed of discrete points.

The traffic rule information 224 according to one or more embodiments of the present invention represents traffic rules, such as STOP, NO PARKING/NO STOPPING, SLOW, and SPEED LIMIT, which the vehicle must follow when traveling. Each rule is defined for each point (latitude, longitude) and each link. The traffic rule information 224 may include information on traffic signals which is acquired from an apparatus provided at the road side.

The onboard apparatus 200 according to one or more embodiments of the present invention includes the object detection device 230. The object detection device 230 according to one or more embodiments of the present invention detects the situation around the subject vehicle. The object detection device 230 of the subject vehicle detects the existence and existing positions of objects including obstacles that may exist around the subject vehicle. Although not particularly limited, the object detection device 230 according to one or more embodiments of the present invention includes a camera 231. The camera 231 according to one or more embodiments of the present invention is, for example, an imaging device comprising an imaging element, such as a CCD. The camera 231 may also be an infrared camera or a stereo camera. The camera 231 is disposed at a certain position of the subject vehicle and captures images around the subject vehicle. The term "around the subject vehicle" as used herein encompasses the concepts of "ahead of the subject vehicle," "behind the subject vehicle," "sideways ahead of the subject vehicle," and "sideways behind the subject vehicle." Examples of objects to be imaged by the camera 231 include stationary objects, such as traffic signs. Examples of the objects further include moving objects, such as pedestrians and other vehicles such as two-wheel vehicles and four-wheel vehicles. Examples of the objects also include road structures, such as guardrails, center dividers, and curbstones.

In addition or alternatively, the object detection device 230 may analyze the image data and identify the type of an object on the basis of the analysis result. The object detection device 230 uses a pattern matching technique or the like to identify whether the object included in the image data is a vehicle, pedestrian, or traffic sign. The object detection device 230 processes the acquired image data to obtain a distance from the subject vehicle to the object existing around the subject vehicle on the basis of the position of the object. In particular, the object detection device 230 acquires the positional relationship between the object and the subject vehicle.

In addition or alternatively, the object detection device 230 according to one or more embodiments of the present invention may use a radar device 232. Examples of the radar device 232 to be used include those, such as millimeter-wave radar, laser radar and ultrasonic radar, which are of schemes known at the time of filing of the present application. The object detection device 230 detects presence or absence of objects, positions of the objects, and distances to the objects on the basis of received signals from the radar device 232. The object detection device 230 may detect presence or absence of objects, positions of the objects, and distances to the objects on the basis of clustering results of point group information which the radar device acquires.

When the subject vehicle and another vehicle are capable of vehicle-to-vehicle communication, the object detection device 230 may acquire the vehicle speed and acceleration of the other vehicle which are detected by the vehicle speed sensor of the other vehicle, as object information that represents that the other vehicle exists. As will be understood, the object detection device 230 can also acquire the object information, which includes the position, speed, and acceleration of another vehicle, from external devices such as Intelligent Transport Systems (ITS).

The onboard apparatus 200 according to one or more embodiments of the present invention includes the lane departure prevention device 240. The lane departure prevention device 240 includes a camera 241 and road information 242. The camera 231 of the object detection device may be shared as the camera 241. The road information 223 of the navigation device may be shared as the road information 242. The lane departure prevention device 240 detects a lane, in which the subject vehicle travels, of the first route from the images captured by the camera 241. The lane departure prevention device 240 has a lane departure prevention function (lane keep support function) to recognize a first lane in which the subject vehicle is traveling and control the moving behavior of the subject vehicle so as to keep a certain relationship between the position of a lane marker of the lane and the position of the subject vehicle. The travel assistance apparatus 100 according to one or more embodiments of the present invention controls the moving behavior of the subject vehicle so that the subject vehicle travels along the center of the lane. In addition or alternatively, the travel assistance apparatus 100 may control the moving behavior of the subject vehicle so that the distance from the lane marker of the lane to the subject vehicle along the road width direction falls within a predetermined range. The lane marker in one or more embodiments of the present invention is not limited, provided that it has a function to define a lane. The lane marker may be a line drawn on a road surface, a planting that exists between lanes, or a road structure that exists at the side of a road shoulder of a lane, such as a guardrail, curbstone, sidewalk, and exclusive road for two wheels. The lane marker may also be a fixed structure that exists at the side of a road shoulder of a lane, such as an advertising display, traffic sign, store, and roadside tree. A determination processor 11, which will be described later, stores an object detected by the object detection device 230 so that the detected object is associated with a route. In other words, the determination processor 11 has information as to which route the object exists on.

The onboard apparatus 200 according to one or more embodiments of the present invention includes the output device 250. The output device 250 includes a display 251 and a speaker 252. The output device 250 according to one or more embodiments of the present invention outputs various information items regarding the travel assistance to the user or to passengers of surrounding vehicles. In one or more embodiments of the present invention, the output device 250 outputs information regarding a planned (determined) driving action/operation plan and travel control based on the driving action plan. The output device 250 preliminarily informs the subject vehicle's passengers that the steering operation and/or acceleration or deceleration will be performed via the display 251 and/or speaker 252, as information in accordance with the control information for the subject vehicle to travel on the first route (target route). In addition or alternatively, the passengers of the subject vehicle or the passengers of other vehicles may be preliminarily informed of such information items regarding the travel assistance via exterior lamps and/or interior lamps. In addition or alternatively, the output device 250 according to one or more embodiments of the present invention may output various information items regarding the travel assistance to external devices, such as Intelligent Transport Systems (ITS), via a communication device.

The travel assistance apparatus 100 will then be described.

The travel assistance apparatus 100 according to one or more embodiments of the present invention includes a scene determination device 10, a drive planning device 20, and an output device 30. The output device 30 serves in the same manner as the previously-described output device 250 of the onboard apparatus 200. Components comparable with the display 251 and the speaker 252 can be used as those of the output device 30. These devices can exchange information with one another via wired or wireless communication lines.

The scene determination device 10 will be described first. The scene determination device 10 includes a determination processor 11 that serves as a control device of the scene determination device 10. The determination processor 11 is a calculation device that is used to, when determining a driving action of the subject vehicle, determine a scene which the subject vehicle traveling on a route encounters. Specifically, the determination processor 11 is a computer comprising a read only memory (ROM) that stores programs for executing a process to determine a scene which the subject vehicle encounters, a central processing unit (CPU) as an operation circuit that executes the programs stored in the ROM to serve as the scene determination device 10, and a random-access memory (RAM) that serves as an accessible storage device. The determination processor 11 is provided with a storage medium that stores programs for executing a process to determine a scene which the subject vehicle encounters.

The determination processor 11 of the scene determination device 10 according to one or more embodiments of the present invention executes the following processes:

(1) a process of extracting one or more second routes having points of intersections with the first route on which the subject vehicle travels (route extraction process);

(2) a process of extracting a plurality of events which the subject vehicle traveling on the first route encounters, on the basis of the relationship between the first route and each second route (event extraction process); and (3) a process of determining a scene using the relationship between each extracted event and the subject vehicle (determination process).

The determination processor 11 according to one or more embodiments of the present invention has a first block that realizes a route extraction function, a second block that realizes an event extraction function, and a third block that realizes a scene determination function. The first block executes the route extraction process, the second block executes the event extraction process, and the third block executes the determination process. The determination processor 11 according to one or more embodiments of the present invention executes each of the above functions by cooperation of software for realizing each function or executing each process and the above-described hardware.

Each process executed by the determination processor 11 according to one or more embodiments of the present invention will be described below with reference to FIG. 2A to FIG. 2G. The route extraction process executed by the determination processor 11 will be described first.

The determination processor 11 according to one or more embodiments of the present invention calculates a first route on which the subject vehicle is traveling or is planned to travel. To calculate the first route, the determination processor 11 acquires the subject vehicle information. The determination processor 11 acquires the current position of the subject vehicle from the position detection device 221. The determination processor 11 refers to the map information 222 to calculate the first route using the acquired current position and traveling direction. In addition or alternatively, the determination processor 11 may acquire a planned traveling route for the subject vehicle, which is obtained by the navigation device 220, as the first route. In addition or alternatively, the determination processor 11 may acquire a guidance route from the current position to a destination, which is obtained by the navigation device 220, as the first route.

The determination processor 11 according to one or more embodiments of the present invention extracts one or more second routes having points of intersections with the first route on which the subject vehicle is traveling or is planned to travel. The second routes in one or more embodiments of the present invention are routes having points of intersections with the first route. Examples of such routes having points of intersections with the first route include a route that intersects with the first route, a route that merges into the first route, a route that is branched from the first route, and other forms of intersections with the first route.

The determination processor 11 determined whether the subject vehicle V1 encounters a scene that is to be determined. Specifically, the determination processor 11 determines whether the subject vehicle V1 encounters a scene in which the first route on which the subject vehicle V1 travels intersects with another route as a second route.

Figure 2A:
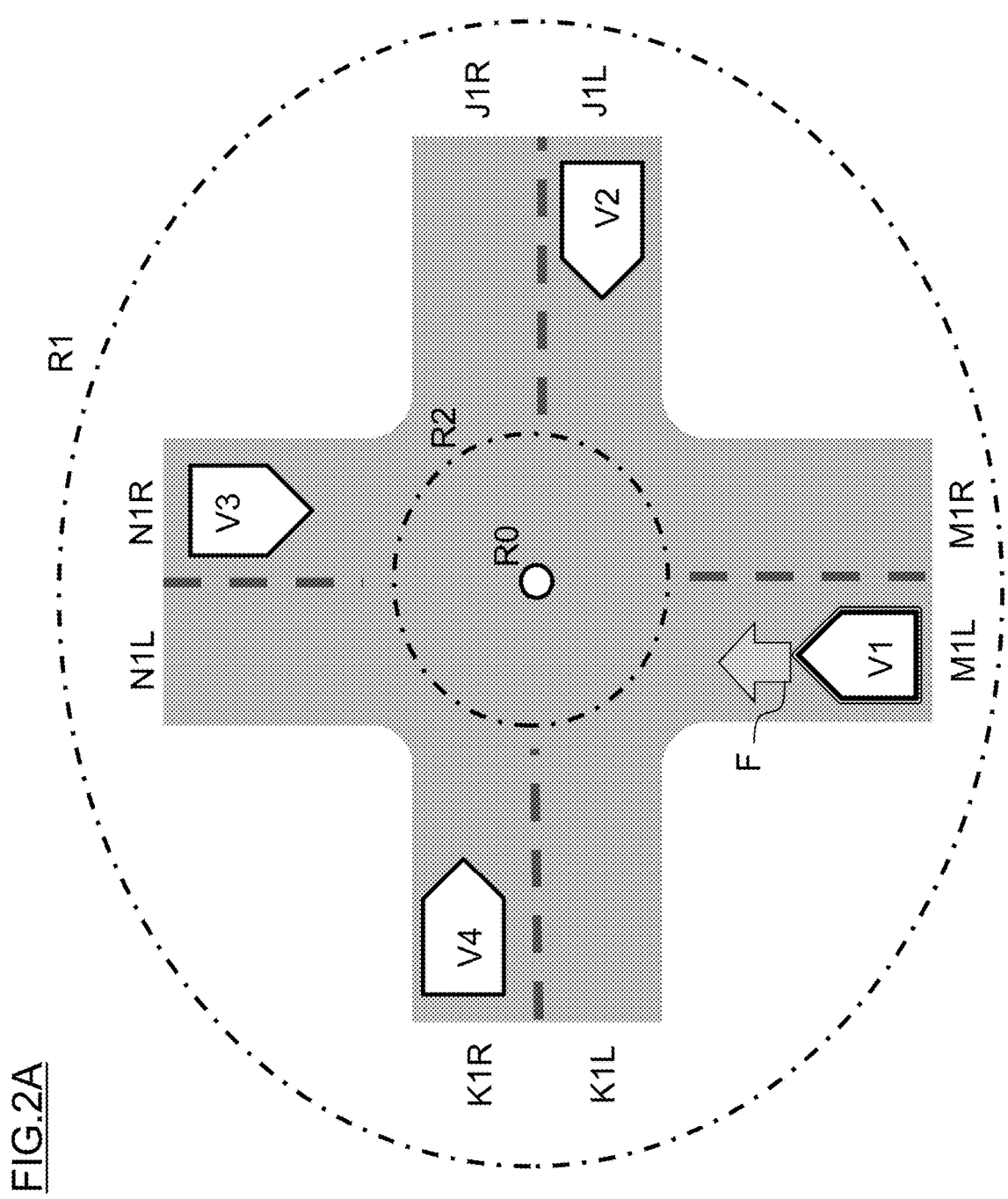
FIG. 2A is a first view for describing a scheme of determining a scene which the subject vehicle encounters.

The scene illustrated in FIG. 2A will be exemplified for description. In this scene, the subject vehicle V1 travels on a first route MIL at the current moment. The determination processor 11 refers to the link information of the map information 222 or the road information 223 to extract the first route MIL including a link to which the current position acquired from the position detection device 221 belongs. The first route M1L is a route to which the current position of the subject vehicle V1 belongs. The first route M1L is identified by a link ID defined in the map information 222 or in the road information 223. The first route M1L which includes the current position of the subject vehicle V1 is specified as the first route on which the subject vehicle V1 travels.

Figure 2B:
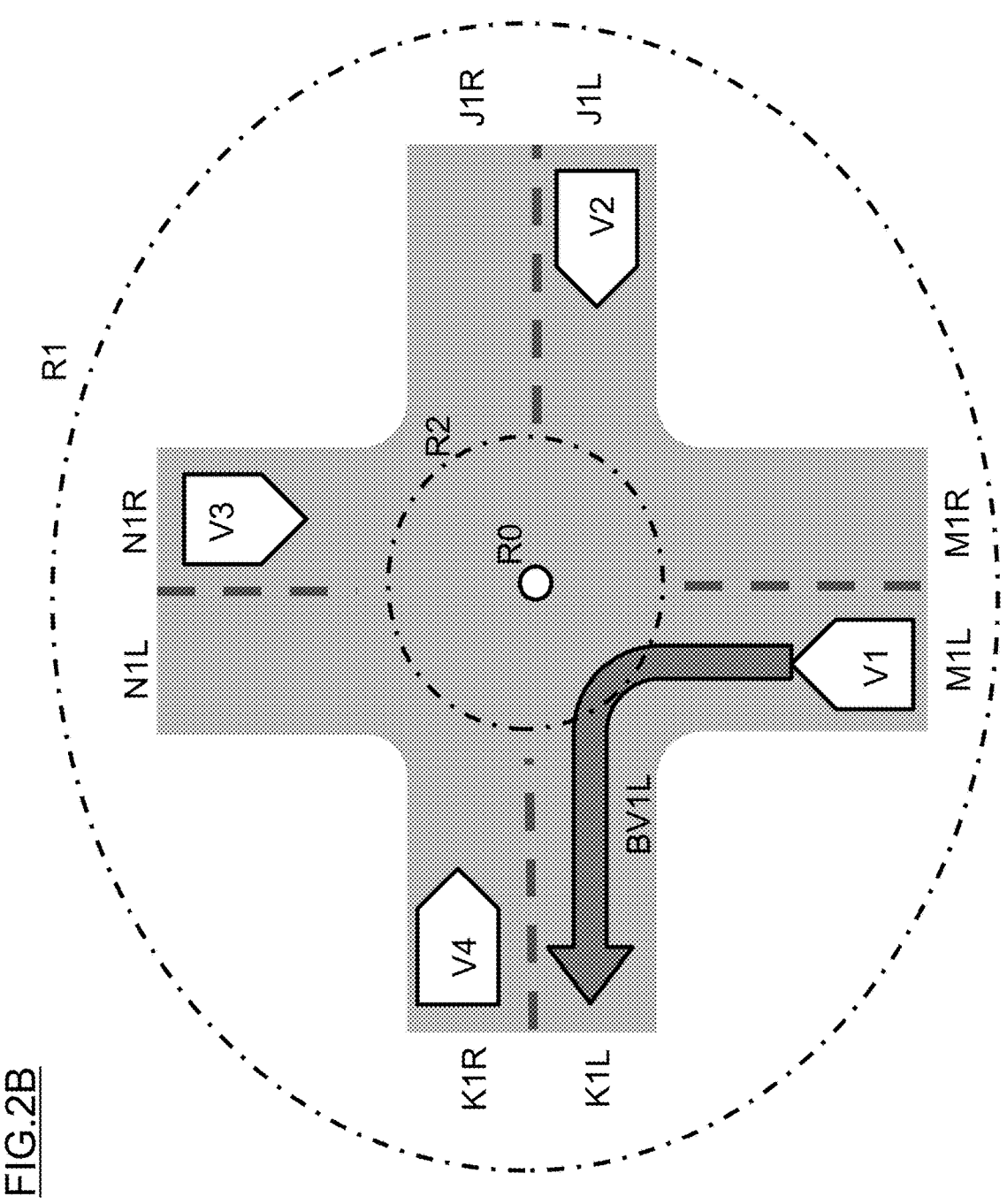
FIG. 2B is a second view for describing a scheme of determining a scene which the subject vehicle encounters.

The determination processor 11 calculates a first route on which the subject vehicle V1 is planned to travel. FIG. 2B illustrates a determination of a first route BV1L on which the subject vehicle V1 is planned to travel. The determination processor 11 may determine the first route BV1L from the route information to the destination calculated by the navigation device 220 and may also determine the first route BV1L from a winker signal that represents intention of left turn of the subject vehicle V1. The winker signal is acquired via the vehicle controller 210.

Figure 2C:
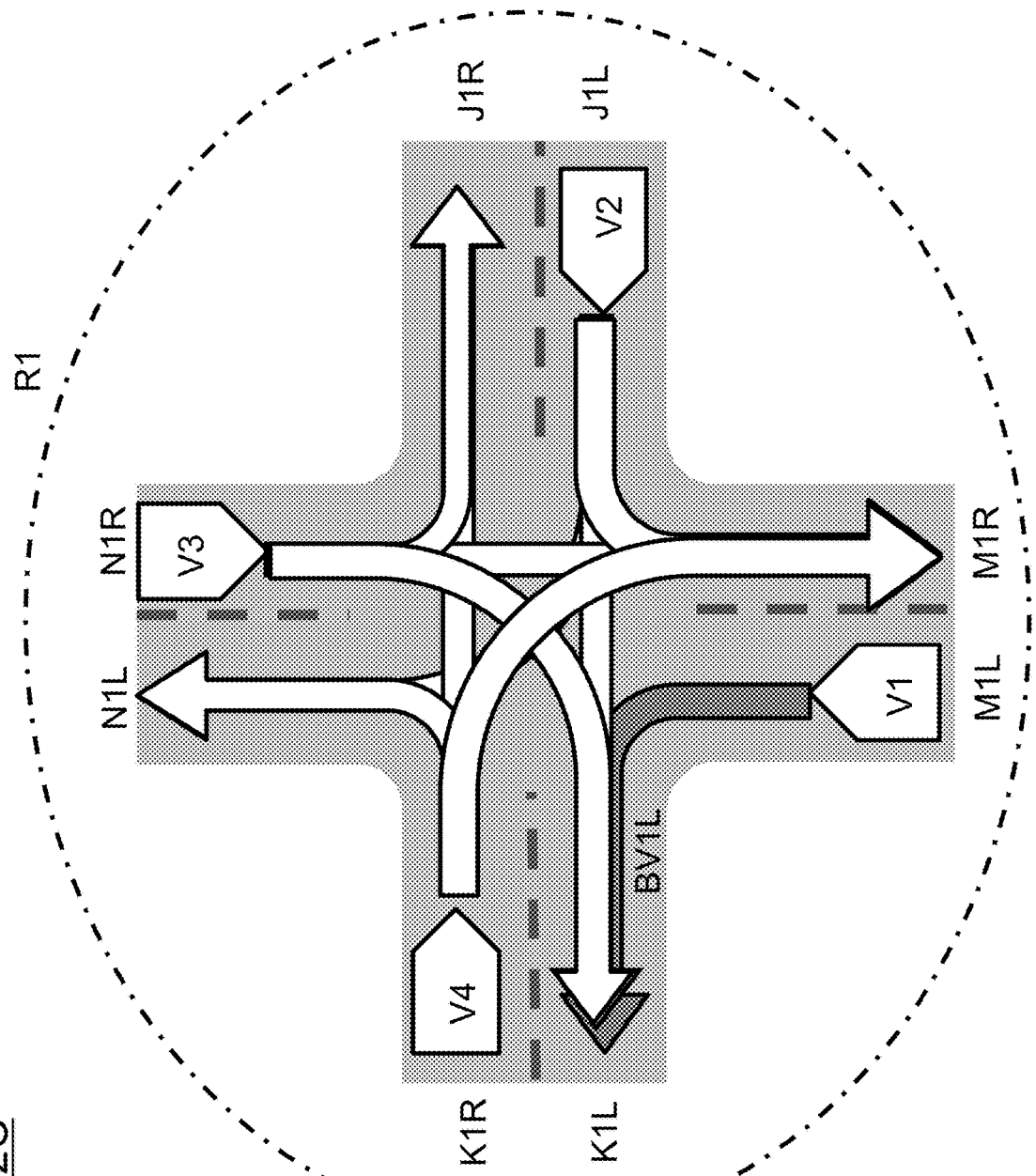
FIG. 2C is a third view for describing a scheme of determining a scene which the subject vehicle encounters.

FIG. 2C is a view illustrating an example of the intersection which is associated with the first route BV1L. FIG. 2C illustrates all possible routes on which vehicles traveling in respective lanes may travel, in an overlapped manner. As illustrated in FIG. 2C, another vehicle V2 has three possible traveling routes of traveling straight and turning right and left, still another vehicle V3 has three possible traveling routes of traveling straight and turning right and left, and yet another vehicle V4 has three possible traveling routes of traveling straight and turning right and left. When traveling along the first route BV1L, the subject vehicle V1 is required to make a determination as to the information on all the possible routes illustrated in FIG. 2C.

The determination processor 11 according to one or more embodiments of the present invention extracts second routes having points of intersections with the first route BV1L. Examples of the second routes in one or more embodiments of the present invention include a route that intersects with the first route, a route that abuts the first route (T-intersection), a route that merges into the first route, and a route that passes through a region connected to the first route.

A scheme of extracting the second routes will be described. This scheme is executed by the determination processor 11 according to one or more embodiments of the present invention.

First, the determination processor 11 according to one or more embodiments of the present invention specifies/determines a region of a "scene which the subject vehicle encounters" to be determined when determining a driving action of the subject vehicle. When there is a second route to which a link having a point of intersection with the first route M1L belongs, the determination processor 11 estimates that the subject vehicle V1 is to encounter a scene to be determined. In an example, the determination processor 11 specifies a scene in which the current position of the subject vehicle V1 belongs to a region R1 within a predetermined distance from the point of intersection (e.g. the center R0 of the intersection of FIG. 2A) between the first route M1L and the second route, as the scene to be determined.

The determination processor 11 executes extraction of second routes when the subject vehicle V1 encounters a scene to be determined. The determination processor 11 executes extraction of second routes that exist within a region (R1 of FIG. 2A) corresponding to a scene to be determined which the subject vehicle V1 encounters. Thus, by extracting the second routes in each scene to be determined/evaluated and determining/evaluating the scene, determination/evaluation can be performed as to which state the scene encountered by the subject vehicle is in, without increasing the processing load.

Figure 2D:
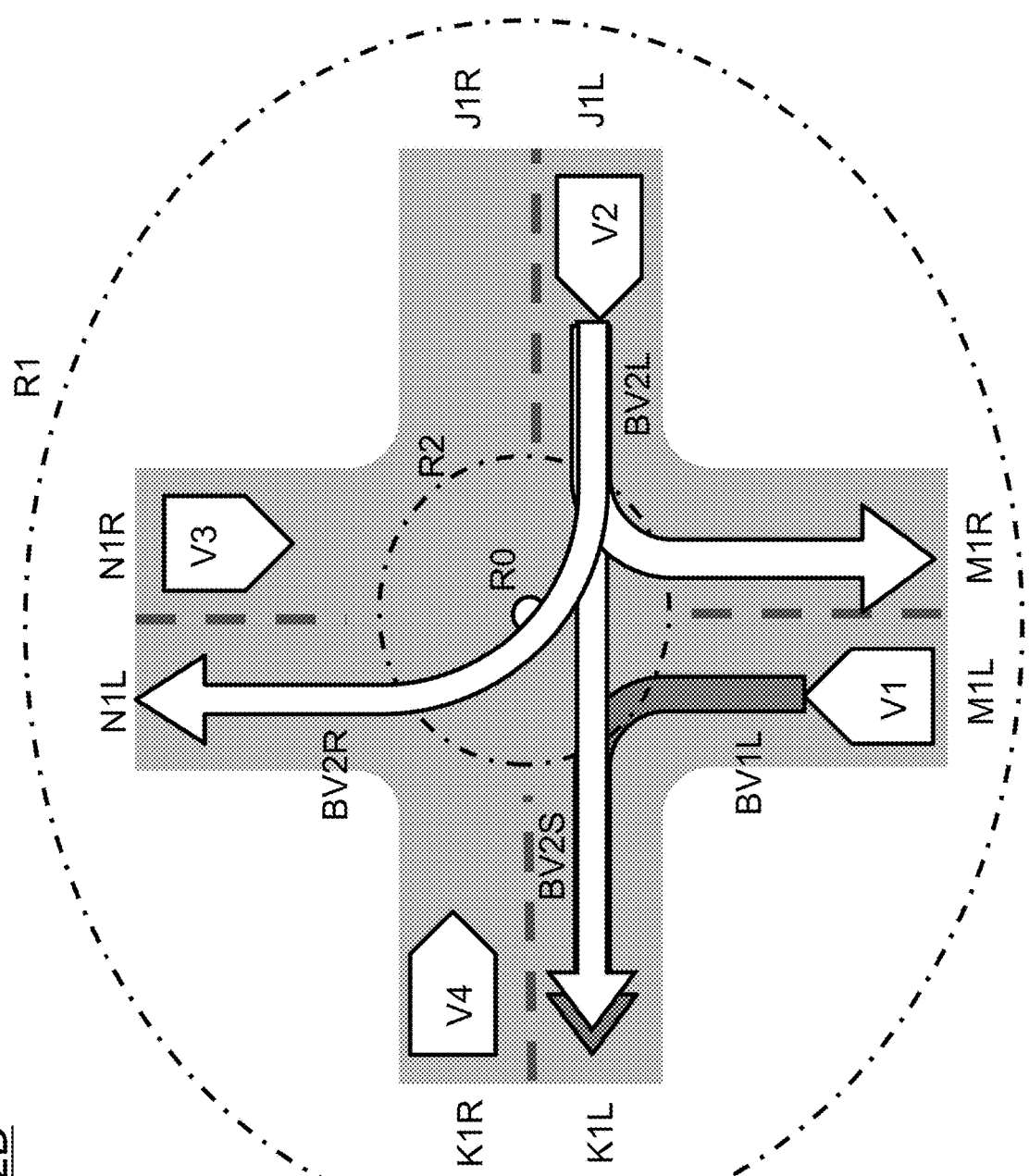
FIG. 2D is a fourth view for describing a scheme of determining a scene which the subject vehicle encounters.

A scheme of extracting second routes in the scene illustrated in FIG. 2B will be described below with reference to FIGS. 2D to 2G. First, as illustrated in FIG. 2D, the determination processor 11 according to one or more embodiments of the present invention determines possible routes on which another vehicle V2 may travel. The determination processor 11 uses the map information 222, the road information 223, the traffic rule information, and the images captured by the camera 231 to calculate possible routes on which the other vehicle V2 may travel (the same applies to other vehicles V3 and V4).

Figure 2E:
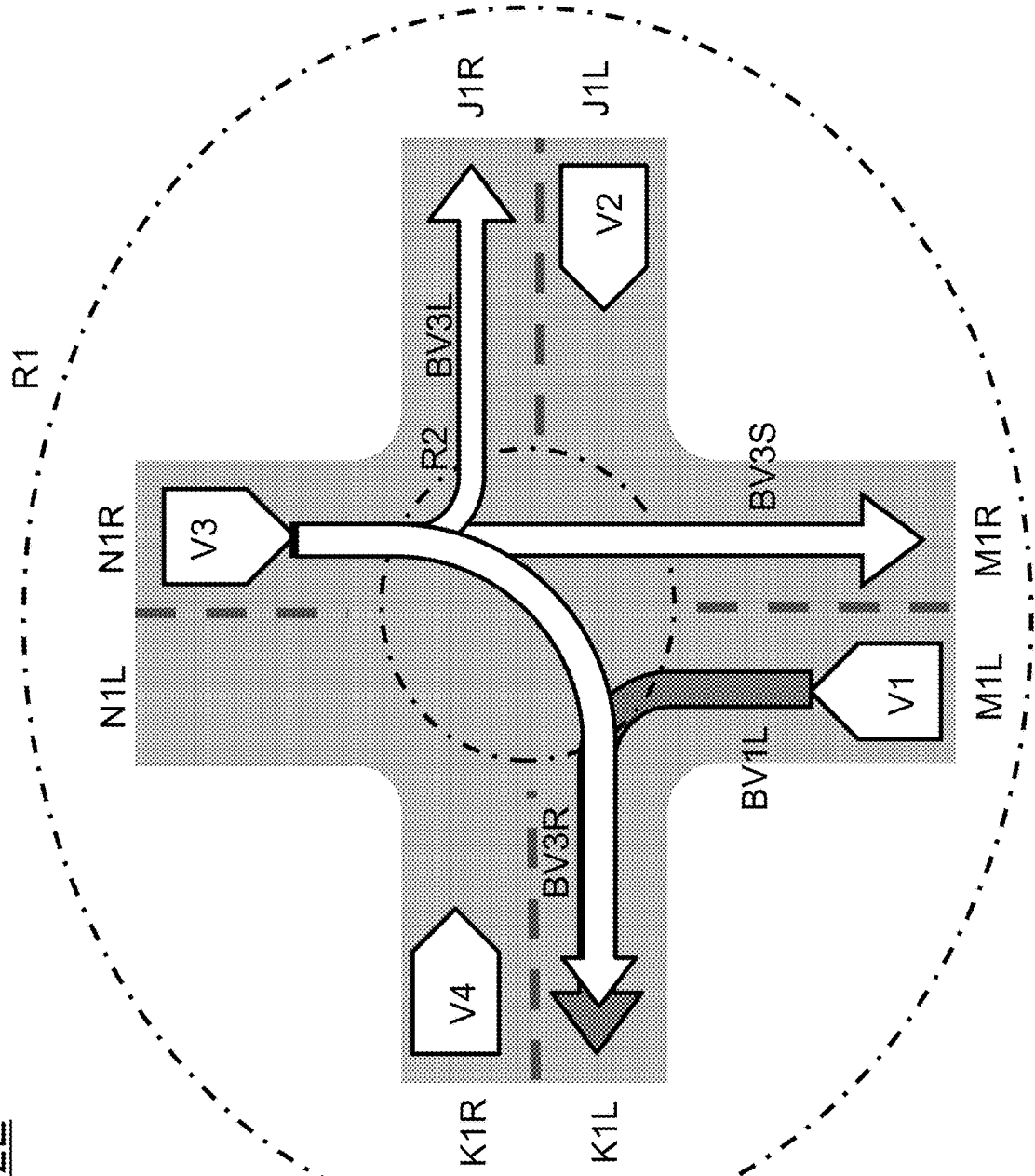
FIG. 2E is a fifth view for describing a scheme of determining a scene which the subject vehicle encounters.
Figure 2F:
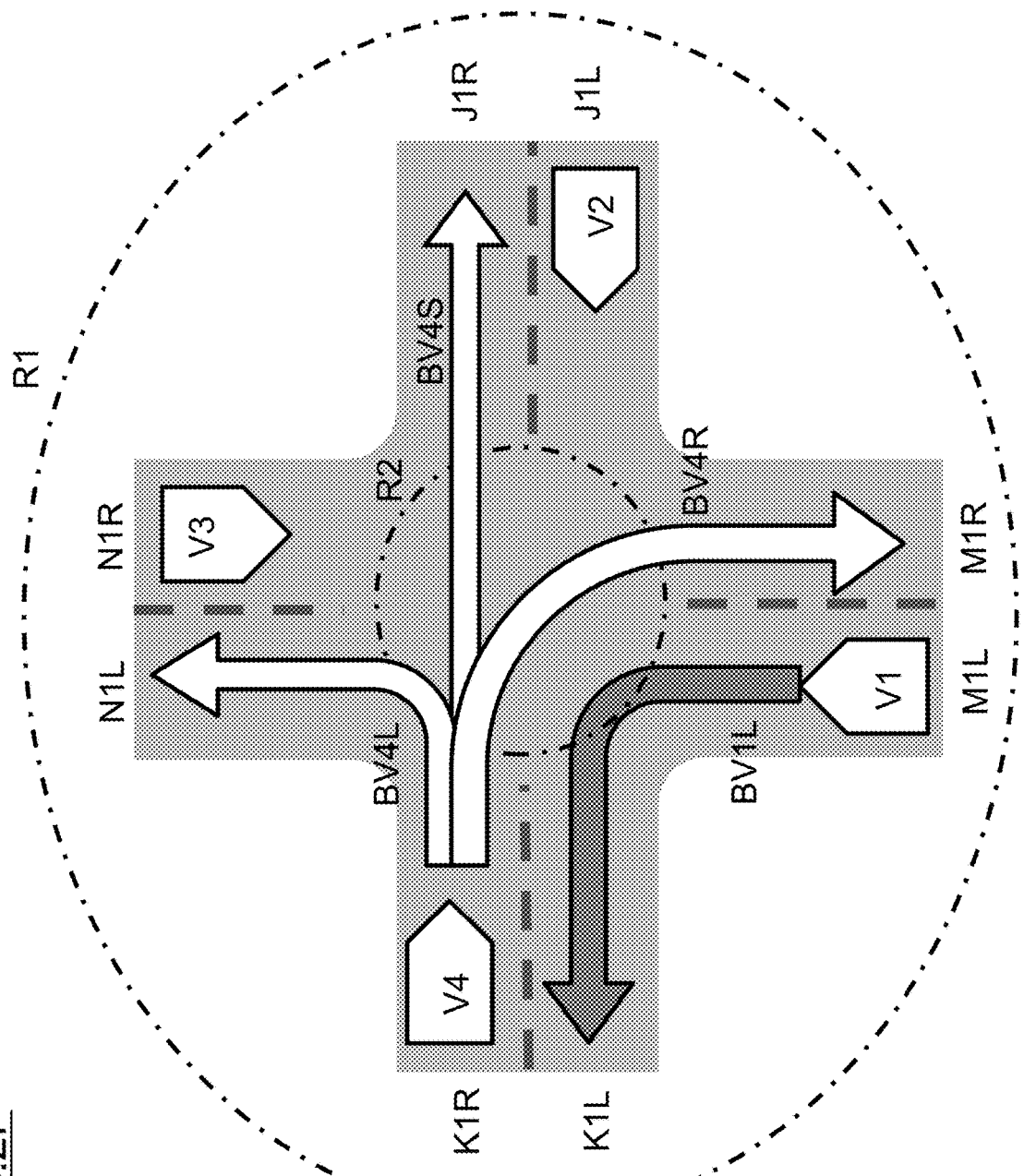
FIG. 2F is a sixth view for describing a scheme of determining a scene which the subject vehicle encounters.

As illustrated in FIG. 2D, another vehicle V2 has possibilities of progressing to a second route BV2S to travel straight, a second route BV2L to turn left, and a second route BV2R to turn right. As illustrated in FIG. 2E, still another vehicle V3 has possibilities of progressing to a second route BV3S to travel straight, a second route BV3L to turn left, and a second route BV3R to turn right. As illustrated in FIG. 2F, yet another vehicle V4 has possibilities of progressing to a second route BV4S to travel straight, a second route BV4L to turn left, and a second route BV4R to turn right. Thus, three routes exist as the routes on which each of the other vehicles can travel.

Figure 2G:
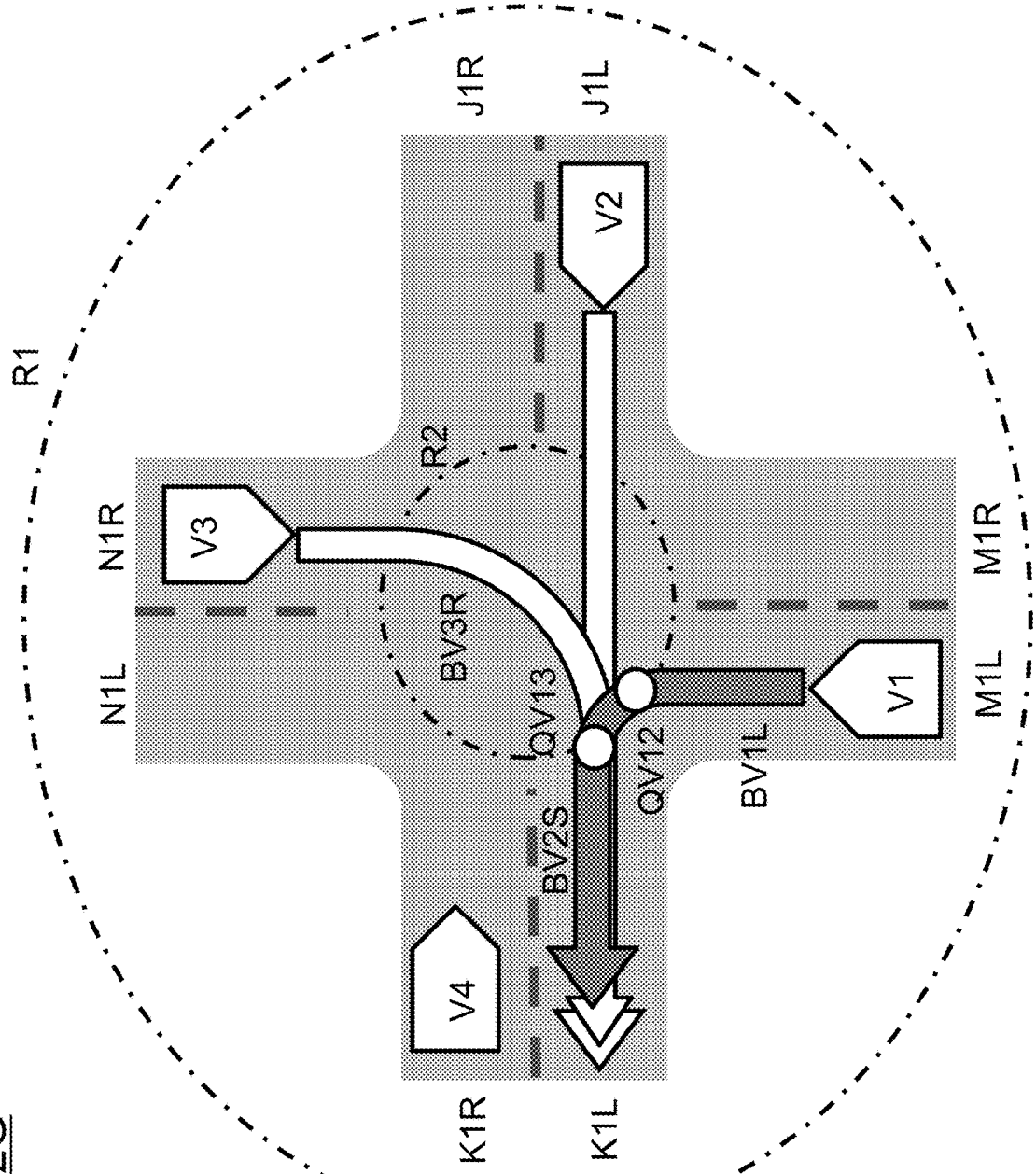
FIG. 2G is a seventh view for describing a scheme of determining a scene which the subject vehicle encounters.

The determination processor 11 according to one or more embodiments of the present invention narrows down the above all routes (all the routes on which the other vehicles can travel) to possible routes that may intersect with the first route BV1L for the subject vehicle V1. As illustrated in FIG. 2G, the determination processor 11 extracts points of intersections QV12 and QV13 between the first route BV1L on which the subject vehicle V1 is planned to travel and other routes. The determination processor 11 then extracts the second route BV2S which shares the point of intersection QV12 with the first route BV1L and the second route BV3R which shares the point of intersection QV13 with the first route BV1L. Through this process, the determination processor 11 extracts two second routes BV2S and BV3R having points of intersections with the first route BV1L, from among the nine routes existing in the scene which the subject vehicle V1 encounters (scene of passing through the intersection). The extracted second routes BV2S and BV3R have the points of intersections with the first route BV1L and are highly likely to constitute a scene which the subject vehicle V1 encounters. It is thus possible to disassemble a number of routes relating to the first route on which the subject vehicle V1 travels and extract, from among them, only the second routes which should be taken into account when planning/determining the driving operation plan for the subject vehicle V1.

The determination processor 11 according to one or more embodiments of the present invention extracts a plurality of events which the subject vehicle V1 traveling on the first route BV1L encounters, on the basis of the relationships between the first route BV1L and the second routes BV2S and BV3R. The events which the subject vehicle V1 encounters refer to incidents, occurrences, and scenes that occur on the subject vehicle V1, such as the subject vehicle V1 passing through a point of intersection between the first route and a second route, the subject vehicle V1 entering a second route from the first route, the subject vehicle V1 coming close to another vehicle V2, V3, V4, and the subject vehicle V1 passing each other with another vehicle V2, V3, V4. An event can be expressed as a location at which the subject vehicle encounters the incident. In the present description, therefore, an "event" may be described through specifying the event by positional information of a point, intersection, point of intersection, or the like.

The determination processor 11 according to one or more embodiments of the present invention determines points corresponding to the points of intersections QV12 and QV13 between the first route BV1L on which the subject vehicle V1 is planned to travel and the second routes BV2S and BV3R, as the points at which the subject vehicle V1 traveling on the first route BV1L encounters the events. The determination processor 11 positions the points of intersections QV12 and QV13 between the first route BV1L and the second routes BV2S and BV3R as the events which the subject vehicle V1 encounters. At the points of intersections QV12 and QV13, the subject vehicle V1 encounters the events of entering (merging into) the second routes BV2S and BV3R. The subject vehicle V1 encounters the events of coming close to other vehicles V2, V3, and V4. Thus, locations of encounters with the events are extracted from the relationships between the first route and the second routes and it is therefore possible to take into account only the events which affect the driving operation plan for the subject vehicle V1.

The determination processor 11 according to one or more embodiments of the present invention refers to the traffic rule information 224 to extract the events which the subject vehicle V1 traveling on the first route encounters, using the relationship derived from the traffic rule on the first route and the traffic rule on each second route. The traffic rule information 224 is information in which information, such as a stop position, entry prohibition, and one-way traffic, is associated with links (routes) and/or positional information. This process may refer to the map information 222 and/or the road information 223.

The determination processor 11 recognizes the traffic rule of stopping as an event. The determination processor 11 extracts a position at which the stopping rule is effective as the position at which the subject vehicle V1 encounters the event. The extracted positions of events are associated with routes (including links). Similarly, the determination processor 11 recognizes the traffic rule of entry prohibition as an event. The determination processor 11 extracts a further upstream position (upstream side in the traveling direction) than a position at which the entry prohibition rule is effective as the position at which the subject vehicle V1 encounters the event. The extracted positions of events are associated with routes (including links). The determination processor 11 extracts a further upstream position (upstream side in the traveling direction) than a region, such as the central part of the intersection (region R2 of FIG. 2A), within which the stopping and prohibition rules are effective, as the position at which the subject vehicle V1 encounters the event. The extracted positions of events are associated with routes (including links).

The determination processor 11 according to one or more embodiments of the present invention calculates a priority level of the first route to a second route from the traffic rule information 224 of the first route and the second route and uses the priority level to extract events for the subject vehicle V1 traveling on the first route.

Figure 3:
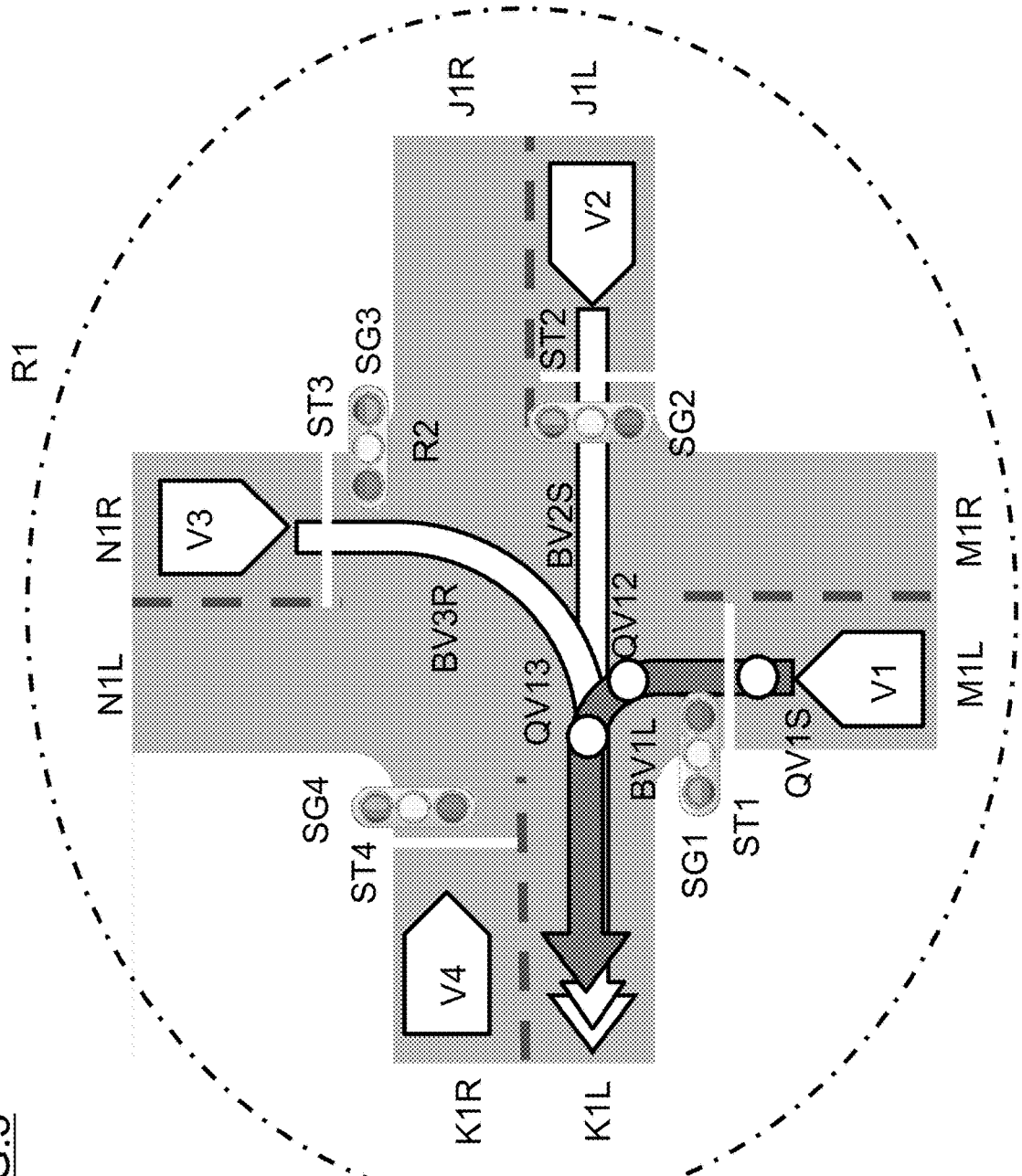
FIG. 3 is a view for describing a scheme of determining events using traffic rules.

In the scene illustrated in FIG. 3, the determination processor 11 according to one or more embodiments of the present invention refers to the traffic rule information 224 to extract a stop line ST1 on the first route BV1L. Similarly, the determination processor 11 extracts a stop line ST2 on the second route BV2S and a stop line ST3 on the second route BV3R. The determination processor 11 compares a stopping rule at the stop line ST2 on the second route BV2S, which is estimated to intersect with the first route BV1L at the point of intersection QV12, and a stopping rule at the stop line ST1 on the first route BV1L and determines the relationship there-between. If traveling through either one of the stop lines is preferentially permitted while traveling through the other is prohibited, the stop line through which traveling is preferentially permitted is removed from candidates for the events. This is because, for example, under the traffic in which traveling on the second route is prohibited while traveling on the first route is preferentially permitted, another vehicle V2 traveling on the second route does not affect the travel of the subject vehicle V1 traveling on the first route. In the example illustrated in FIG. 3, both the stopping rule at the stop line ST1 on the first route BV1L and the stopping rule at the stop line ST2 on the second route BV2S require stopping at the stop lines without exception. The determination processor 11 cannot determine the priority levels of the first route BV1L and the second route BV2S. The point of intersection QV12 is therefore not removed from candidates for the events.

The determination processor 11 according to one or more embodiments of the present invention calculates the priority level of the first route to a second route from the traffic signal information included in the traffic rule information 224 for the first route and the second route and uses the priority level to extract the events for the subject vehicle V1 traveling on the first route. The traffic signal information is information that is sequentially updated, and may therefore be recognized using the images captured by the cameras 231 and 241 and may also be acquired via the ITS. In this example, a form of acquiring the traffic signal information via a storage device of the navigation device 220 will be described, but the determination processor 11 may directly acquire the traffic signal information.

In the scene illustrated in FIG. 3, the determination processor 11 according to one or more embodiments of the present invention refers to the traffic rule information 224 to extract the traffic light shown by a traffic signal SG1 that is disposed along the first route BV1L. Similarly, the determination processor 11 extracts the traffic light shown by a traffic signal SG2 that is disposed along the second route BV2S.

The determination processor 11 according to one or more embodiments of the present invention sets the priority level of the route on which traveling is permitted (green light) at a relatively higher level than the priority level of the route on which stopping is required (traveling is prohibited: red light). If traveling is permitted on both of two routes having a point of intersection, the priority levels cannot be obtained, so setting of priority levels is not performed. As will be understood, the green light means permission of progressing and this may also be displayed by another color.

When the traffic signal SG1 disposed at the point of intersection QV12 on the first route BV1L shows the green light while the traffic signal SG2 disposed along the second route BV2S shows the red light, the determination processor 11 determines that traveling on the first route BV1L has priority over traveling on the second route BV2S. The point of intersection QV12 with the second route BV2S on which traveling is prohibited is removed from candidates for the events.

When the traffic signal SG1 disposed at the point of intersection QV12 on the first route BV1L shows the green light while the traffic signal SG2 disposed along the second route BV2S also shows the green light, traveling is permitted on both the first route BV1L and the second route BV2S. The determination processor 11 cannot determine the priority levels of the first route BV1L and the second route BV2S in this situation. The point of intersection QV12 is therefore not removed from candidates for the events.

The determination processor 11 according to one or more embodiments of the present invention calculates the priority level of the first route to a second route from the road information 223 of the first route and the second route and uses the priority level to extract the events for the subject vehicle V1 traveling on the first route. The road information 223 is stored with identification between a priority route (lane) and a non-priority route (lane) at a T-intersection, identification between a priority route (lane) and a non-priority route (lane) in accordance with the widths of lanes, and identification between a priority route (lane) and a non-priority route (lane) in accordance with road shapes. With regard to routes that constitute a T-intersection, the road information 223 defines one of the routes as the priority route and the other as the non-priority route. With regard to routes that have a point of intersection, the road information 223 defines one of the routes having a wider lane width as the priority route and the other having a narrower lane width as the non-priority route. As will be understood, the route having a narrower lane width may be defined as the priority route in accordance with the actual traffic state. With regard to routes that merge into each other, the road information 223 defines the main route as the priority route and the merging route as the non-priority route. The road information 223 defines a route having a relatively large curvature radius as the priority route and a route having a relatively small curvature radius as the non-priority route. As will be understood, the route having a relatively small curvature radius may be defined as the priority route in accordance with the actual traffic state.

The determination processor 11 according to one or more embodiments of the present invention uses the detection information of objects existing around the subject vehicle V1 to extract events which the subject vehicle V1 traveling on the first route encounters. The determination processor 11 recognizes situations in which objects (including pedestrians, other vehicles, and road structures) detected by the object detection device 230 exist, as events which the subject vehicle V1 encounters. When the distance between the subject vehicle V1 and the detected object is less than a predetermined value, the determination processor 11 may extract the existence of the object as an event. In addition or alternatively, when an estimated time remaining for the subject vehicle V1 to come into contact with the detected object is less than a predetermined value, the determination processor 11 may extract the existence of the object as an event.

The determination processor 11 according to one or more embodiments of the present invention uses the positional information of objects to extract events which the subject vehicle V1 traveling on the first route encounters. Examples of the objects include those relating to temporary traffic regulation, such as construction sites, disabled vehicles, and regions to avoid. Information on positions at which objects exist may be included in the road information 223. In addition or alternatively, information on positions at which objects exist can be received from an information provision apparatus, such as the ITS, at the road side.

The determination processor 11 stores the objects detected by the object detection device 230 in an accessible state so that the objects are associated with routes. The determination processor 11 has information as to which routes the objects exist on. Further, the determination processor 11 can determine whether or not an object exists on the extracted second route, the positional relationship between an object on the second route and the subject vehicle, and the possibility of contact between an object on the second route and the subject vehicle.

The determination processor 11 according to one or more embodiments of the present invention associates positions of the extracted plurality of events with respective routes. The determination processor 11 rearranges the extracted plurality of events in the order of encounters with the subject vehicle V1. The determination processor 11 according to one or more embodiments of the present invention obtains the order of encounters with the events from transition of the position of the subject vehicle V1 traveling on the first route and the positions of the events and rearranges the events in the order of encounters with the subject vehicle V1.

The determination processor 11 according to one or more embodiments of the present invention extracts objects to be encountered and associates the encounter positions with respective routes. The determination processor 11 rearranges the objects detected by the object detection device 230 in the order of encounters with the subject vehicle V1. The determination processor 11 according to one or more embodiments of the present invention obtains the order of encounters with the objects from transition of the position of the subject vehicle V1 traveling on the first route and the positions of the objects and rearranges the objects in the order of encounters with the subject vehicle V1.

The output device 30 will then be described.

The output device 30 includes an output control processor 31. The output control processor 31 displays information using the display 251 as the output device 30. The output control processor 31 displays information items representing the events extracted by the determination processor in the order of encounters with the subject vehicle and in a side-by-side fashion.

The output control processor 31 is a computer comprising a read only memory (ROM) that stores programs for executing a process to display the information items representing the events, a central processing unit (CPU) as an operation circuit that executes the programs stored in the ROM to serve as the output device 30, and a random-access memory (RAM) that serves as an accessible storage device. The output control processor 31 is provided with a storage medium that stores programs for executing a process to display the information items representing the events.

Figure 4:
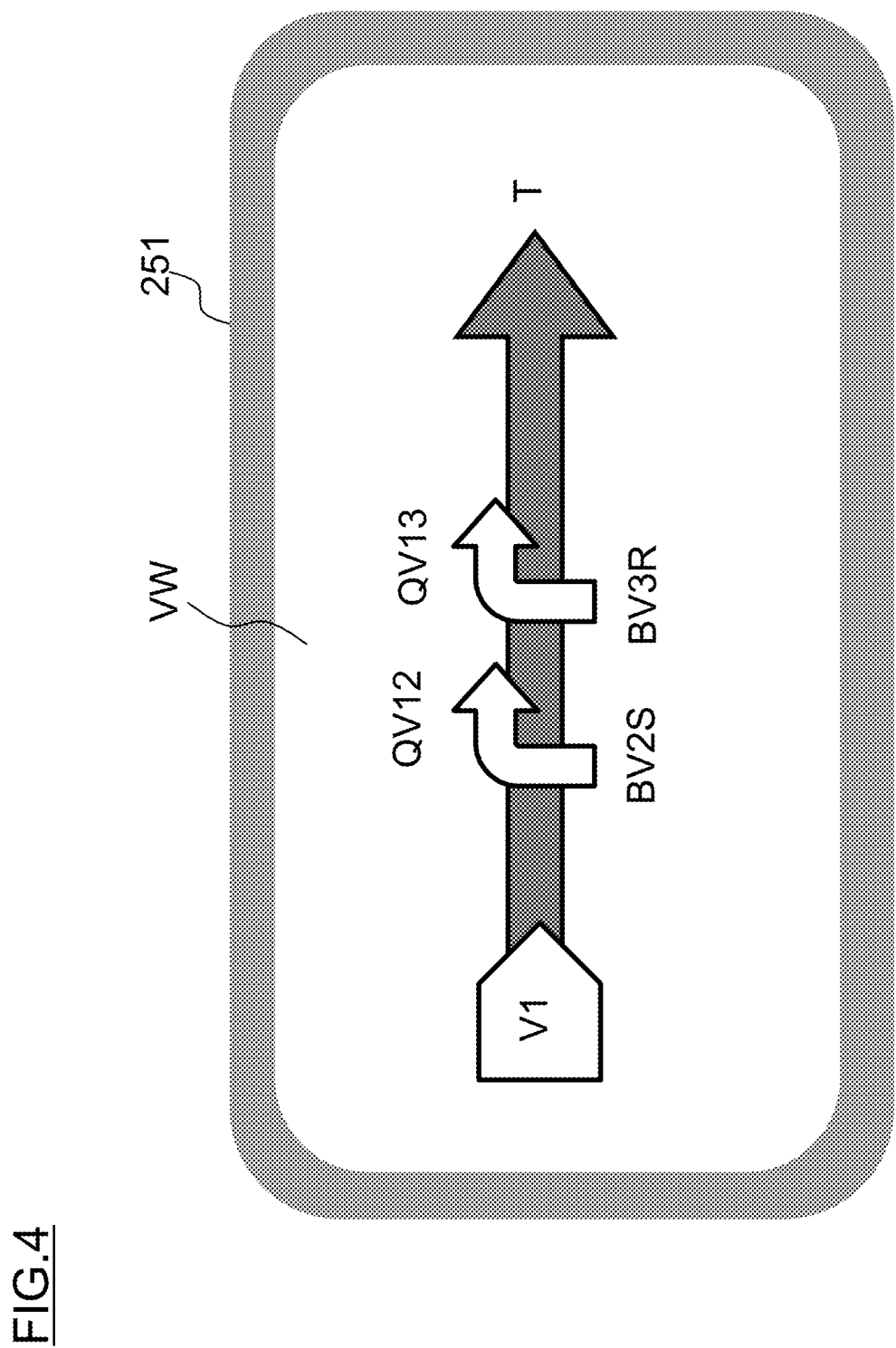
FIG. 4 is an example of display information representing events in a time-series manner.

FIG. 4 illustrates an example of display information VW that represents the events in a time-series manner. In the display example illustrated in FIG. 4, the first route for the subject vehicle V1 is displayed as an arrow T. The direction of the arrow represents the time axis for the subject vehicle V1. The points of intersections QV12 and QV13 extracted as the events are displayed as right-angled arrows superimposed on the arrow T. In addition, the traffic signal SG1, stop line ST1, and/or the points of intersections QV12 and QV13 with the second routes may be displayed as the events which the subject vehicle V1 encounters. Information items representing the events (encounter positions/encounter timings) may be symbols or may also be abstract marks. Forms, such as color and size, can be freely determined.

The output control processor 31 displays the information items, such as symbols and marks, which represent the extracted events at positions in accordance with ratios of actual distances from the subject vehicle V1 to the events. As illustrated in FIG. 4, the output control processor 31 determines the positions of the arrows of QV12 and QV13 with respect to the arrow T such that the ratio between the actual distance from the subject vehicle V1 to the point of intersection QV12 and the actual distance from the subject vehicle V1 to the point of intersection QV13 is expressed in the display information VW in which the length of the arrow T representing the first route is a predetermined distance. In an alternative embodiment, the output control processor 31 may take into account the speed of the subject vehicle V1 and determine the positions of the arrows of QV12 and QV13 with respect to the arrow T such that the ratio between the time required for the subject vehicle V1 to arrive at the point of intersection QV12 and the time required for the subject vehicle V1 to arrive at the point of intersection QV13 is expressed in the display information VW in which the length of the arrow T representing the first route is a predetermined distance.

When the events to be encountered are objects (physical objects), the output control processor 31 takes into account the positions of the objects and/or the relative speeds of the objects to obtain the positional relationships with the subject vehicle V1. The events in this example include objects that exist behind the subject vehicle V1. Vehicles coming close to the subject vehicle V1 from behind can be recognized as the events which the subject vehicle V1 encounters. Also for other vehicles coming close to the subject vehicle V1 from behind, the positions and relative speeds are taken into account to obtain the positional relationships with the subject vehicle V1.

Also, when the events include stationary objects, such as points of intersections of routes, stop lines defined in the traffic rule, and road structures, as well as moving objects, such as pedestrians and other vehicles, the output control processor 31 rearranges the stationary objects and moving objects included in the extracted plurality of events in the order of encounters with the subject vehicle, that is, along the common time axis. Other vehicles include those coming close to the subject vehicle from behind.

Thus, the events which the subject vehicle V1 traveling on the first route encounters are displayed in the order of encounters with the subject vehicle and in a side-by-side fashion, and the driver of the subject vehicle V1 can thereby visually recognize what types of events the subject vehicle V1 is to encounter and the order of the encounters.

The output control processor 31 according to one or more embodiments of the present invention displays the information output from the drive planning device 20 which will be described later. Specific examples of display will also be described later.

Figure 5A:
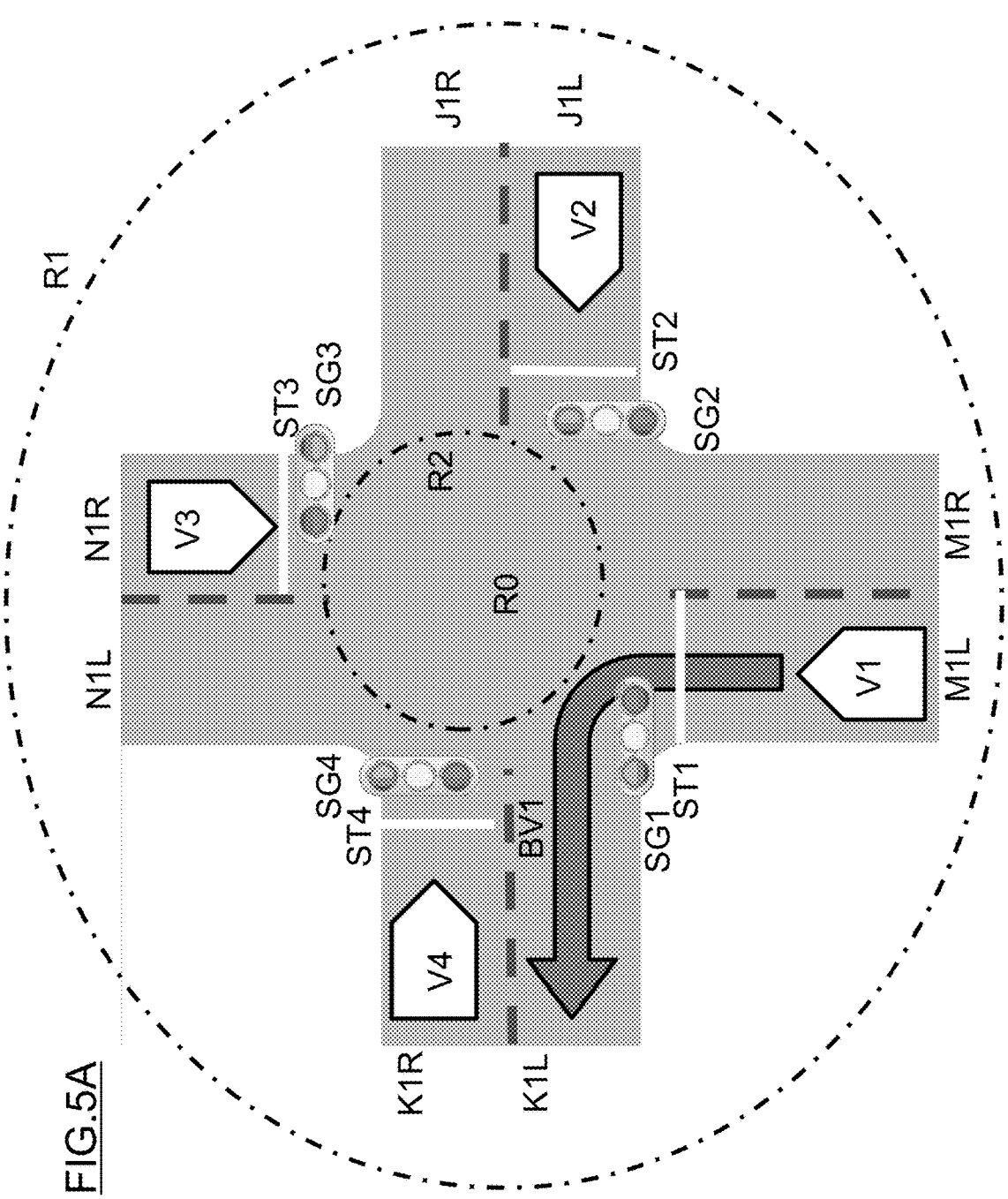
FIG. 5A is a first view for describing a scheme of a determination process for a driving action in events.
Figure 5B:
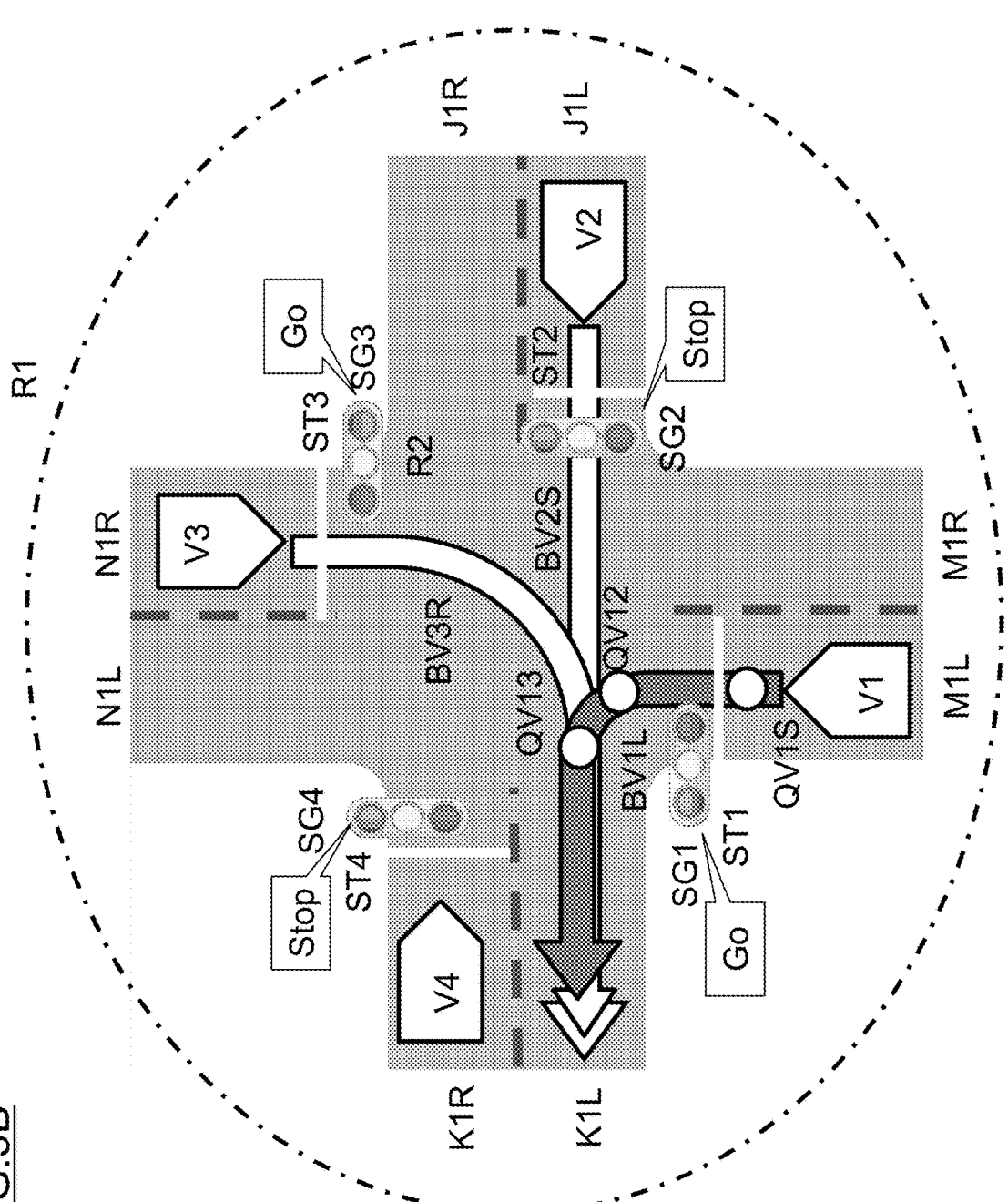
FIG. 5B is a second view for describing a scheme of a determination process for a driving action in events.

Here, the determination process for a scene using the traffic rule information 224 will be described. The scene of this example is illustrated in FIG. 5A. As illustrated in FIG. 5A, the subject vehicle V1 traveling on a first route BV1 turns left and passes through the intersection at which the traffic signal SG1 is provided. The determination processor 11 extracts routes having points of intersections with the first route BV1. As in the previously-described example, the second route BV2S and second route BV3R illustrated in FIG. 5B are extracted in this example. The determination processor 11 refers to the traffic rule information 224 associated with the positional information and refers to the traffic rule effective on the first route BV1L. The determination processor 11 extracts the stop line ST1 on the first route BV1L. The position of the stop line ST1 is stored in association with the first route BV1L. Similarly, for the second route BV2S and the second route BV3R, the determination processor 11 refers to the traffic rule information 224 and extracts the traffic rule relating to the driving of other vehicles, and necessary items are stored in association with each second route. The determination processor 11 determines the positions of events for the subject vehicle V1 in accordance with the positions (positions of stop lines) to which the traffic rules stored in the traffic rule information 224 are applied. In this example, the determination processor 11 determines the position of a point of intersection QV1S between the stop line ST1 and the first route BV1L which are stored in the traffic rule information 224, as the position of an event.

The determination processor 11 checks the priority levels of routes. In the example illustrated in FIG. 5B, the green light is shown (progressing is permitted) on the first route BV1L and on the second route BV3R. On the other hand, the red light is shown (stopping is required) on the second route BV2S. In this case, the determination processor 11 determines that the priority level of the first route BV1L is higher than the priority level of the second route BV2S. The determination processor 11 may remove the point of intersection QV12 between the first route BV1L and the second route BV2S from candidates for the events because the priority level of the first route BV1L is higher than the priority level of the second route BV2S. As will be understood, the point of intersection QV12 may still remain stored and used to make a determination of progressing in the drive operation planning process which will be described later. The determination processor 11 does not determine the priority levels of the first route BV1L and second route BV3R because the green light is shown on these routes.

The determination processor 11 rearranges the events in the order of encounters with the subject vehicle V1, that is, in a time-series manner. Information on the order of rearranged events is transmitted to a drive planning processor 21. The events extracted via the output device 30 are presented to the user in a time-series manner and in a side-by-side fashion. This allows the user to visually recognize what types of events the subject vehicle V1 is to encounter.

Figure 6:
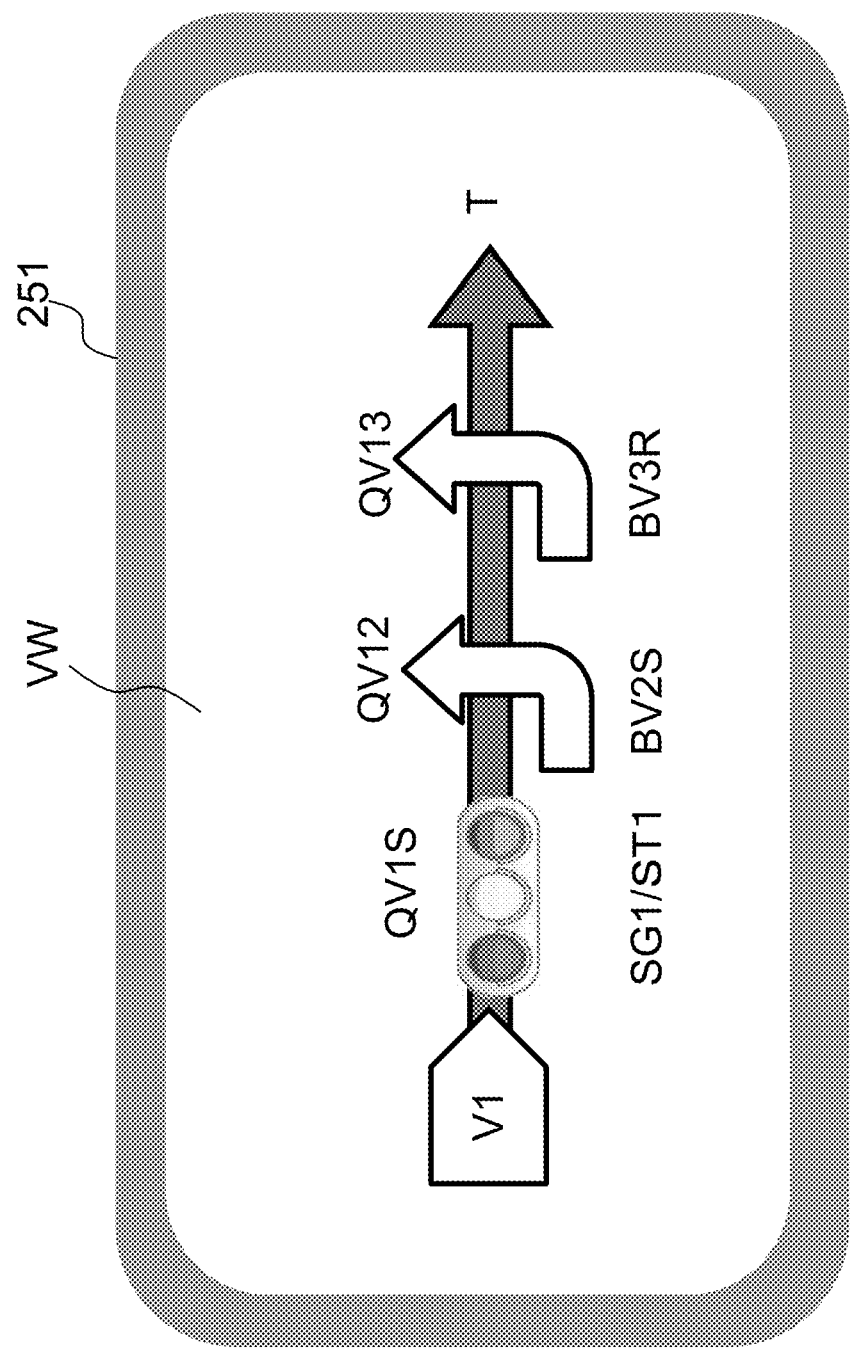
FIG. 6 is an example of display information representing a determination result of the driving action.

FIG. 6 illustrates an example of display information VW that represents the events in a time-series manner. In the display example illustrated in FIG. 6, the progressing direction of the subject vehicle V1 on the first route is displayed as a bold arrow T. The direction of the arrow represents the time axis for the subject vehicle V1. The point of intersection QV1S with the stop line existing before the traffic signal is displayed as an icon of the traffic signal on the arrow T because the point of intersection QV1S is extracted as an event, and the points of intersections QV12 and QV13 also extracted as events are displayed as right-angled arrows superimposed on the arrow T. In addition, the traffic signal SG1, stop line ST1, and/or the points of intersections QV12 and QV13 with the second routes may be displayed as the events (objects in this example) which the subject vehicle V1 encounters. Information items representing the events (encounter positions/encounter timings) may be symbols or may also be abstract marks. Forms, such as color and size, can be freely determined.

The drive planning device 20 will then be described. The drive planning device 20 includes a drive planning processor 21. The drive planning processor 21 plans a driving action of the subject vehicle traveling on a route. The drive planning processor 21 acquires determination results for relationships between the subject vehicle and a plurality of events which the subject vehicle encounters in a time-series manner when traveling on the first route, from the determination processor 11. The drive planning processor 21 uses the relationships (determination results) between the events determined by the determination processor 11 and the subject vehicle V1 to plan/determine the driving operation plan for the subject vehicle V1 to travel on the first route. When planning the driving operation plan, the drive planning processor 21 takes into account the existence of objects detected by the object detection device 230 to plan/determine the driving operation plan. The drive planning processor 21 plans the driving operation plan such that the subject vehicle V1 is avoided from contact with the objects existing around the subject vehicle V1.

The drive planning processor 21 is a computer comprising a read only memory (ROM) that stores programs for executing a process to plan/determine the driving actions including traveling/stopping of the subject vehicle, a central processing unit (CPU) as an operation circuit that executes the programs stored in the ROM to serve as the drive planning device 20, and a random access memory (RAM) that serves as an accessible storage device. The drive planning processor 21 is provided with a storage medium that stores programs for executing a process to determine/plan the driving actions including traveling/stopping of the subject vehicle.

The drive planning processor 21 according to one or more embodiments of the present invention determines an action (a single action) for each of a plurality of events that are extracted by the determination processor 11. Actions to be determined are those relating to the driving and include progressing actions and stopping actions. The drive planning processor 21 determines either the progressing action or the stopping action for each event. The drive planning processor 21 comprehensively takes into account the content of each action determined for each of the plurality of events to plan/determine a series of driving operation plan for a scene which the subject vehicle V1 encounters. Through this operation, the driving operation plan can be planned in which it is made clear where the subject vehicle V1 should make a stop from start of passing through a scene to completion of passing through the scene. This can simplify the process for planning an ultimate driving operation plan and reduce the calculation load.

A scheme of determining the driving actions will be described below with reference to FIG. 7A and FIG. 7B. This scheme is executed by the drive planning processor 21. The description herein is directed to a scheme of determining the driving actions in two events illustrated in FIG. 2G, that is, the event (point of intersection QV12) and the event (point of intersection QV13).

Figure 7A:
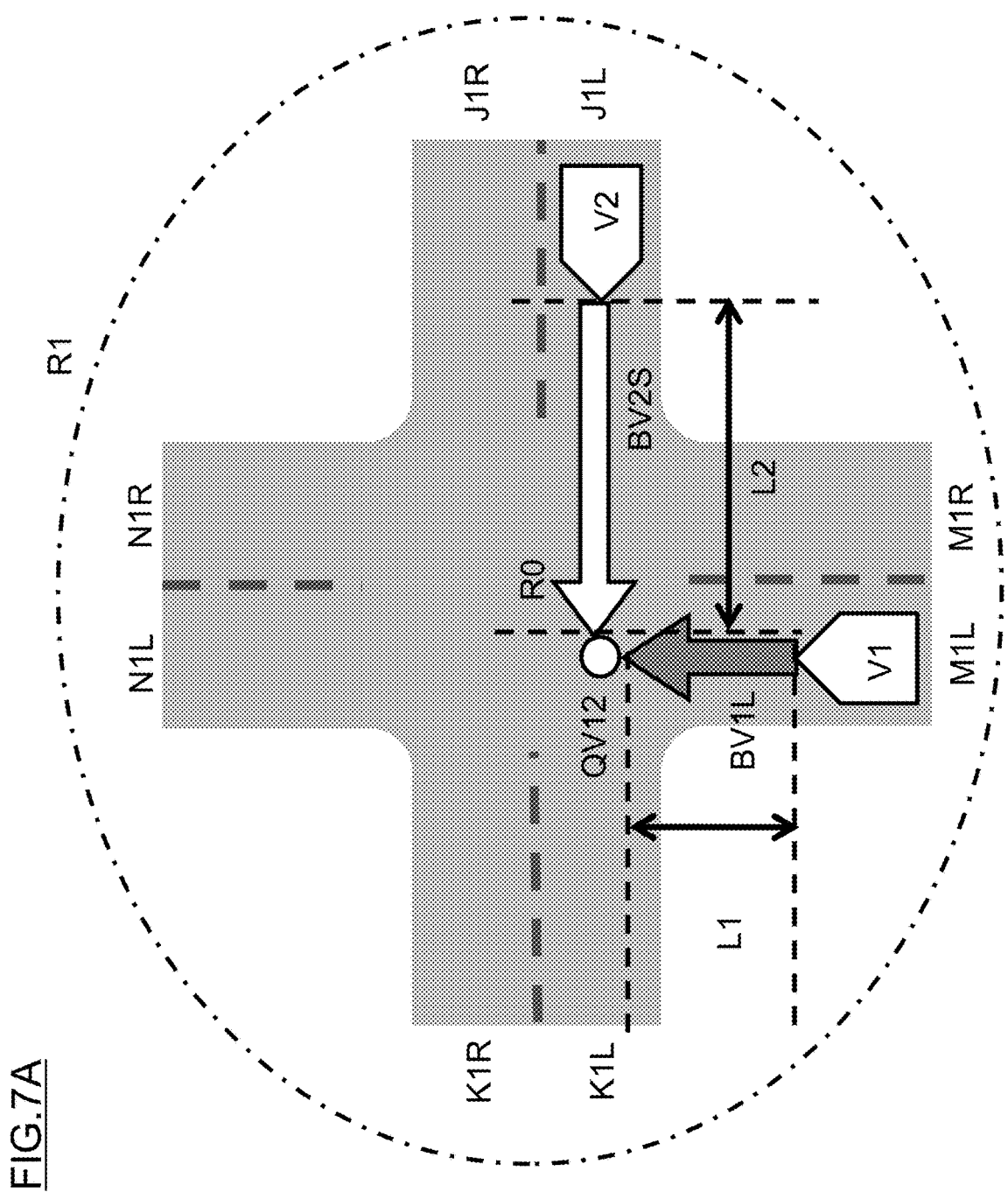
FIG. 7A is a first view for describing an extraction process for an event.

FIG. 7A is a view for describing a scheme of a determination process for the driving action in the event (point of intersection QV12) illustrated in FIG. 2G. The drive planning processor 21 determines the driving action to be taken for the event that the subject vehicle V1 passes through the point at which the first route BV1L and the second route BV2S intersect with each other. The drive planning processor 21 calculates the positional relationship between the subject vehicle and another vehicle V2 associated with the second route BV2S and the change in the positional relationship (degree of approaching). On the basis of the time remaining for the subject vehicle V1 to come into contact with the other vehicle V2, the drive planning processor 21 determines whether or not the subject vehicle V1 can pass through the event (point of intersection QV12), which is the point of intersection between the first route and the second route, without coming into contact with the other vehicle V2.

The point of intersection QV12, at which the subject vehicle V1 is highly likely to encounter an event, will be discussed.

As illustrated in FIG. 7A, the drive planning processor 21 calculates an estimated time for each of the subject vehicle V1 and another vehicle V2 to arrive at the point of intersection QV12 and determines whether or not the subject vehicle V1 can pass through the event (point of intersection QV12) with a margin. Assume, for example, that the speed of the subject vehicle V1 is VV1, the distance from the subject vehicle V1 to the point of intersection QV12 is L1, the speed of the other vehicle V2 is VV2, and the distance from the other vehicle V2 to the point of intersection QV12 is L2.

When the following Expression (1) is satisfied, a determination is made that the subject vehicle V1 is highly likely to come into contact with the other vehicle V2 at the point of intersection QV12, and the driving action in this event encountered at the point of intersection QV12 is determined to be "stopping."

$$IL2/VV2-L1/VV1|<Tthreshold \qquad (1)$$

On the other hand, when the following Expression (2) is satisfied, a determination is made that the subject vehicle V1 is unlikely to encounter an issue/a situation of coming into contact with the other vehicle V2 at the point of intersection QV12, and the driving action in this event is determined to be "progressing."

$$IL2/VV2 - L1/VV1 \geq T\text{threshold} \qquad (2)$$

Tthreshold represents a margin time in consideration of the safety in the passing of the vehicles.

Figure 7B:
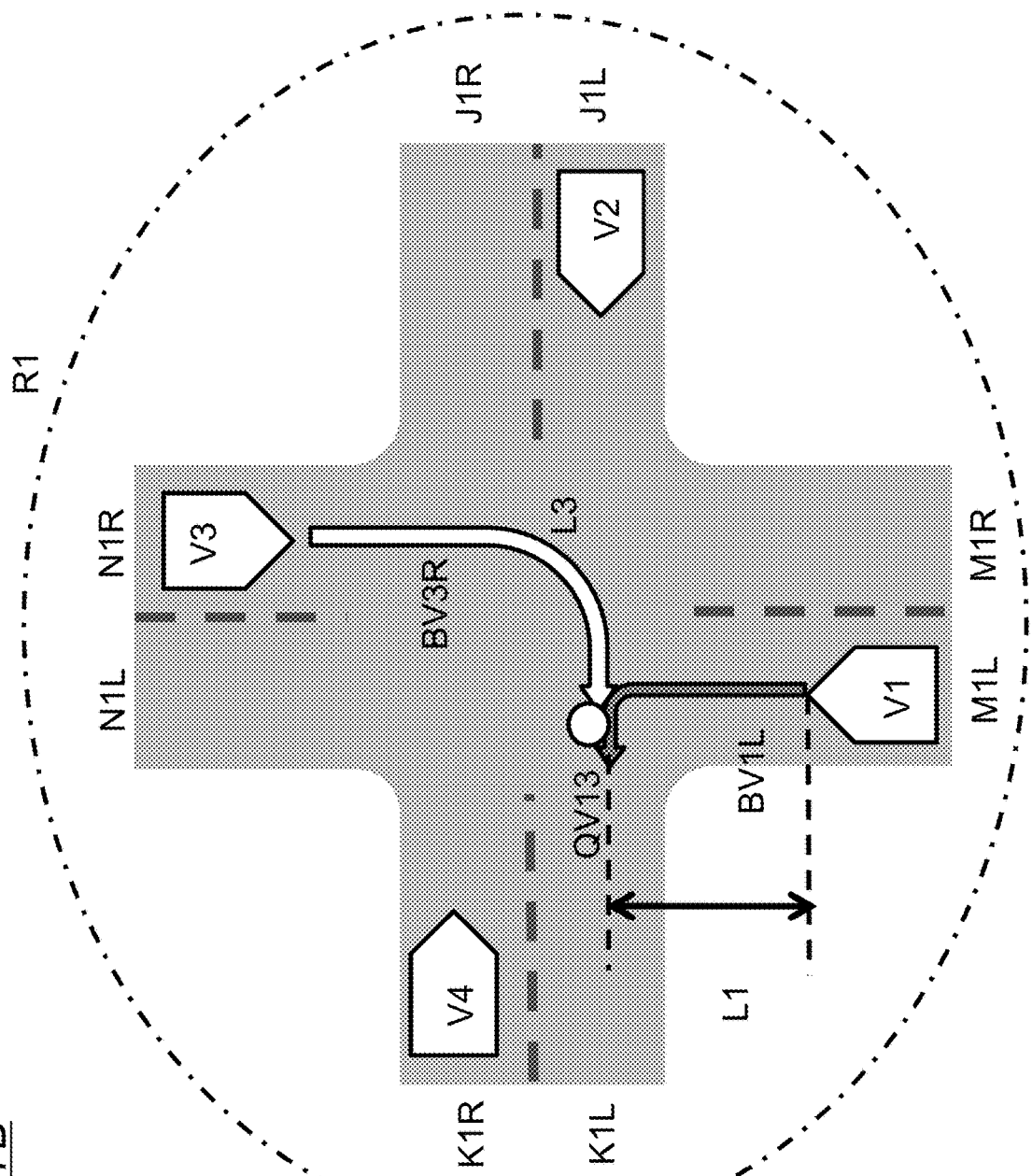
FIG. 7B is a second view for describing an extraction process for an event.

FIG. 7B is a view for describing a scheme of a determination process for the driving action in the event (point of intersection QV13) illustrated in FIG. 2G. The drive planning processor 21 determines the driving action to be taken for the event that the subject vehicle V1 passes through the point at which the first route BV1L and the second route BV3R intersect with each other. The drive planning processor 21 calculates the positional relationship between the subject vehicle and another vehicle V3 associated with the second route BV3R and the change in the positional relationship (degree of approaching). On the basis of the time remaining for the subject vehicle V1 to come into contact with the other vehicle V3, the drive planning processor 21 determines whether or not the subject vehicle V1 can pass through the point of intersection QV13 between the first route and the second route without coming into contact with the other vehicle V3. In other words, the drive planning processor 21 determines whether or not the subject vehicle V1 can pass through the point of intersection QV13 without encountering an issue/a situation of coming into contact with the other vehicle V3.

As illustrated in FIG. 7B, the drive planning processor 21 calculates an estimated time for each of the subject vehicle V1 and another vehicle V3 to arrive at the point of intersection QV13 and determines whether or not the subject vehicle V1 can pass through the point of intersection QV13 with a margin. That is, the drive planning processor 21 determines whether the subject vehicle V1 is highly likely or unlikely to encounter an issue/a situation of coming into contact with the other vehicle V3 at the point of intersection QV13. Assume, for example, that the speed of the subject vehicle V1 is VV1, the distance from the subject vehicle V1 to the point of intersection QV13 is L1, the speed of the other vehicle V3 is VV3, and the distance from the other vehicle V3 to the point of intersection QV13 is L3. The distance L3 may be calculated with reference to the curvature/curvature radius or the like stored as a part of the road information 223 and may also be calculated with reference to the distance between nodes which is stored as a part of the road information 223.

When the following Expression (3) is satisfied, a determination is made that the subject vehicle V1 is highly likely to encounter an issue/a situation of coming into contact with the other vehicle V3 at the point of intersection QV13, and the driving action in this event is determined to be "stopping."

$$IL3/VV3 - L1/VV1 < T\text{threshold} \qquad (3)$$

On the other hand, when the following Expression (4) is satisfied, a determination is made that the subject vehicle V1 is unlikely to encounter an issue/a situation of coming into contact with the other vehicle V3 at the point of intersection QV13, and the driving action in this event is determined to be "progressing."

$$IL3/VV3 - L1/VV1 \geq T\text{threshold} \qquad (4)$$

Tthreshold represents a margin time in consideration of the safety in the passing of the vehicles.

Figure 8:
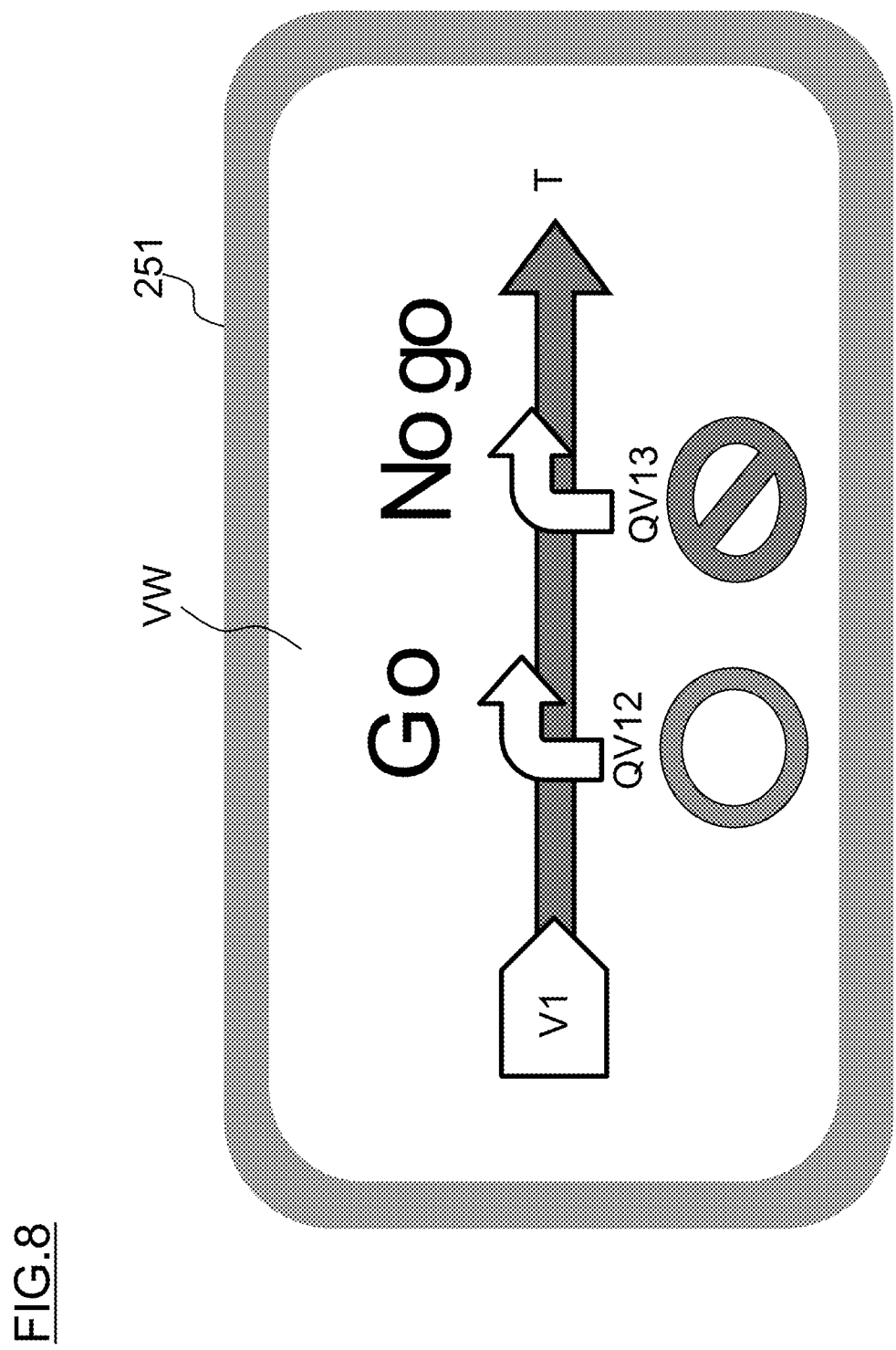
FIG. 8 is an example of display information representing a determination result of the driving action.

The previously-described output control processor 31 may display the determination result of the driving action in each event on the display 251. FIG. 8 illustrates a display example of the determination result of the driving action. As illustrated in FIG. 8, the output control processor 31 arranges a plurality of events in the order of encounters with the subject vehicle V1 and displays the determination of the driving action in each event as text information and/or a symbol.

The drive planning processor 21 according to one or more embodiments of the present invention uses the determined relationships between the subject vehicle V1 and a plurality of events which the subject vehicle V1 encounters in a time-series manner, to plan/determine a series of driving operation plan for a scene which the subject vehicle encounters. Although not particularly limited, the drive planning processor 21 plans a unified driving operation plan for driving operations which the subject vehicle V1 should take for the scene to be encountered. The driving operation plan represents instructions in which commands of stopping and progressing are associated with respective events extracted in the first route from when entering a scene (e.g. the region R1 of a scene) to when exiting the scene (e.g. the region R1 of the scene).

When a determination of the stopping action or a determination of being undeterminable (impossible to determine) is made for at least one or more events of the events extracted by the determination processor 11, the drive planning processor 21 according to one or more embodiments of the present invention plans a driving operation plan of controlling the subject vehicle V1 to make a stop in a scene which the subject vehicle V1 encounters.

When a determination of the stopping action or a determination of being undeterminable (impossible to determine) is made for at least one or more events of the events extracted by the determination processor 11, the drive planning processor 21 according to one or more embodiments of the present invention plans the driving operation plan such that the subject vehicle V1 makes a stop at an event that is nearest to the current position of the subject vehicle V1. When a point at which the subject vehicle V1 should make a stop exists within the region R1 corresponding to the scene, the subject vehicle V1 can be controlled to make a stop in a moment to avoid a risk.

Cases in which the drive planning processor 21 makes a determination of being undeterminable (impossible to determine) include a case in which the ratio of the blind area included in an image captured by the camera 231 is a predetermined value or more, a case in which the detection accuracy for an object by the object detection device 230 is less than a predetermined value, a case in which the process executed by the lane departure prevention device 240 is aborted, and a case in which the driver intervenes the operation. When a determination of being undeterminable (impossible to determine) is made, the subject vehicle V1 can be controlled to immediately make a stop thereby to suppress execution of the driving operation plan based on incorrect information.

When a determination of the progressing action is made for an event of the events extracted by the determination processor 11 and a determination of the stopping action or of being undeterminable is made for a next event to be encountered next to the event, the drive planning processor 21 according to one or more embodiments of the present invention plans the driving operation plan such that the subject vehicle V1 makes a stop at an encounter point with the event for which the progressing action is made. Even in a case in which the progressing action is once determined, when the event which the subject vehicle V1 encounters next requires the stopping action or is undeterminable, the subject vehicle V1 can be controlled to make a stop at a position for which the progressing action is once determined. The location for which the progressing action is determined is a location in which the subject vehicle V1 is permitted to exist, and the subject vehicle V1 can therefore be controlled to make a stop in safety.

When a determination of the stopping action or of being undeterminable is made for an event of the events extracted by the determination processor 11 and the event belongs to a second route, the drive planning processor 21 according to one or more embodiments of the present invention controls the subject vehicle V1 to make a stop at a position which is located at the further upstream side than the event and at which stopping is possible. Even in a case in which a determination of the stopping action or of being undeterminable is made for an event, when the stop position for the event belongs to a second route, the subject vehicle V1 may obstruct other vehicles traveling on the second route. The stop position is therefore inappropriate. According to one or more embodiments of the present invention, the stop position can be set at the upstream position at which stopping is possible, rather than within the second route.

When a determination of the stopping action or of being undeterminable is made for an event of the events extracted by the determination processor 11 and the event is close to or overlaps another event so that these events are located within a predetermined distance, the drive planning processor 21 according to one or more embodiments of the present invention controls the subject vehicle V1 to make a stop at a position which is located at the further upstream side than the event and at which stopping is possible. Even in a case in which a determination of the stopping action or of being undeterminable is made for an event, when the stop position for the event is close to or overlaps the stop position for another event, matching with the determination for the other event may have to be taken into account. The stop position is therefore inappropriate. According to one or more embodiments of the present invention, the stop position can be set at the upstream position at which stopping is possible, rather than within the second route. This can reduce cases of being undeterminable. Moreover, the load of determination processes can be reduced and the subject vehicle V1 can travel smoothly in the region R1 of the scene without repeating stop-and-go driving.

When a determination of the progressing action is made for one event of the events extracted by the determination processor 11 and a determination of the stopping action or of being undeterminable is made for another event to be encountered next to the one event, the drive planning processor 21 according to one or more embodiments of the present invention plans the driving operation plan such that the subject vehicle V1 progresses through the one event if a degree of separation between the one event and the other event is a predetermined value or more. When progressing is permitted for one event, but a determination of the stopping action or of being undeterminable is made for another event to be thereafter encountered, if the subject vehicle V1 is controlled to make a stop at the upstream one event, a determination has to be made again as to whether or not the progressing through the other event is allowed, and the subject vehicle V1 may interfere with the traffic stream of other vehicles on another route as a second route. Thus, when separate events are determined in different ways: "progressing" at the upstream side and "stopping" at the downstream side, the subject vehicle V1 can be allowed to progress through the upstream event thereby to prevent the process from being complexed.

When the drive planning processor 21 according to one or more embodiments of the present invention determines a stop position for the subject vehicle V1, the stop position may be the position of an event that is nearest to the current position of the subject vehicle V1 and within the boundary R1 corresponding to the scene. The stop position for the subject vehicle V1 may otherwise be located outside/near-side the boundary R1 corresponding to the scene. The stop position for the subject vehicle V1 may also be the position of an event, among the events within the boundary R1 corresponding to the scene, which is located at the most upstream side along the approaching direction of the subject vehicle V1.

The setting process for the above stop position can be selected in accordance with the traffic volume of an intersection, the type of a road, and the road width.

The drive planning processor 21 according to one or more embodiments of the present invention performs control of a speed. When a determination of the progressing action is made for one event of the events extracted by the determination processor 11 and a determination of the stopping action or of being undeterminable is made for another event to be encountered next to the one event, the drive planning processor 21 according to one or more embodiments of the present invention plans/determines the driving operation plan so as to reduce the speed of the progressing action in the one event.

Figure 9A:
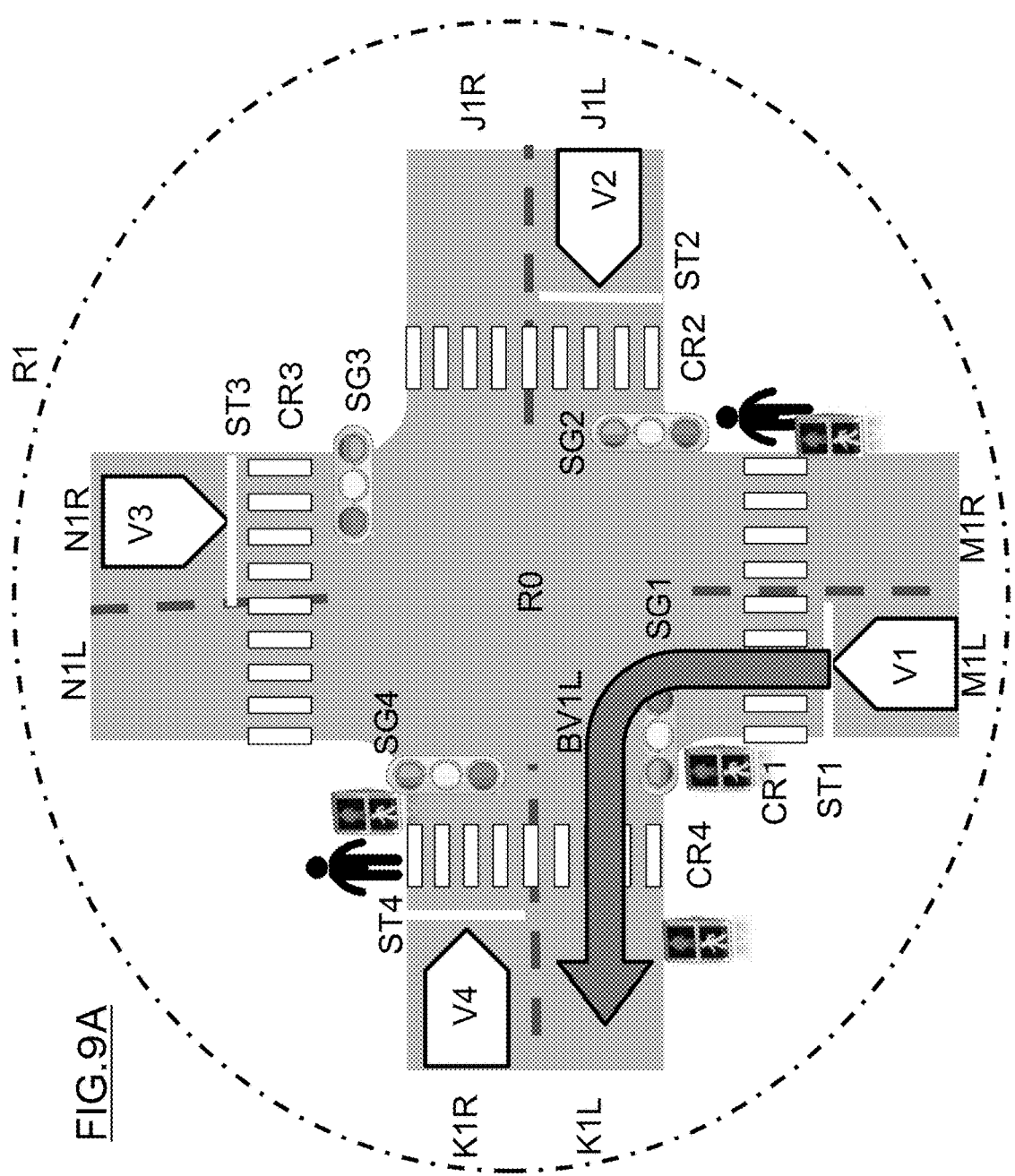
FIG. 9A is a first view for describing an extraction process for events and a planning process for driving.

Here, the determination process for a scene and the planning process for a driving operation plan will be described with reference to an example of a specific scene. The scene of this example is illustrated in FIG. 9A. As illustrated in FIG. 9A, the subject vehicle V1 traveling on the first route BV1 turns left and passes through the intersection at which a traffic signal SG1 and a crosswalk CR1 are provided. The determination processor 11 extracts routes having points of intersections with the first route BV1L. A crosswalk is one of routes through which pedestrians pass.

Figure 9B:
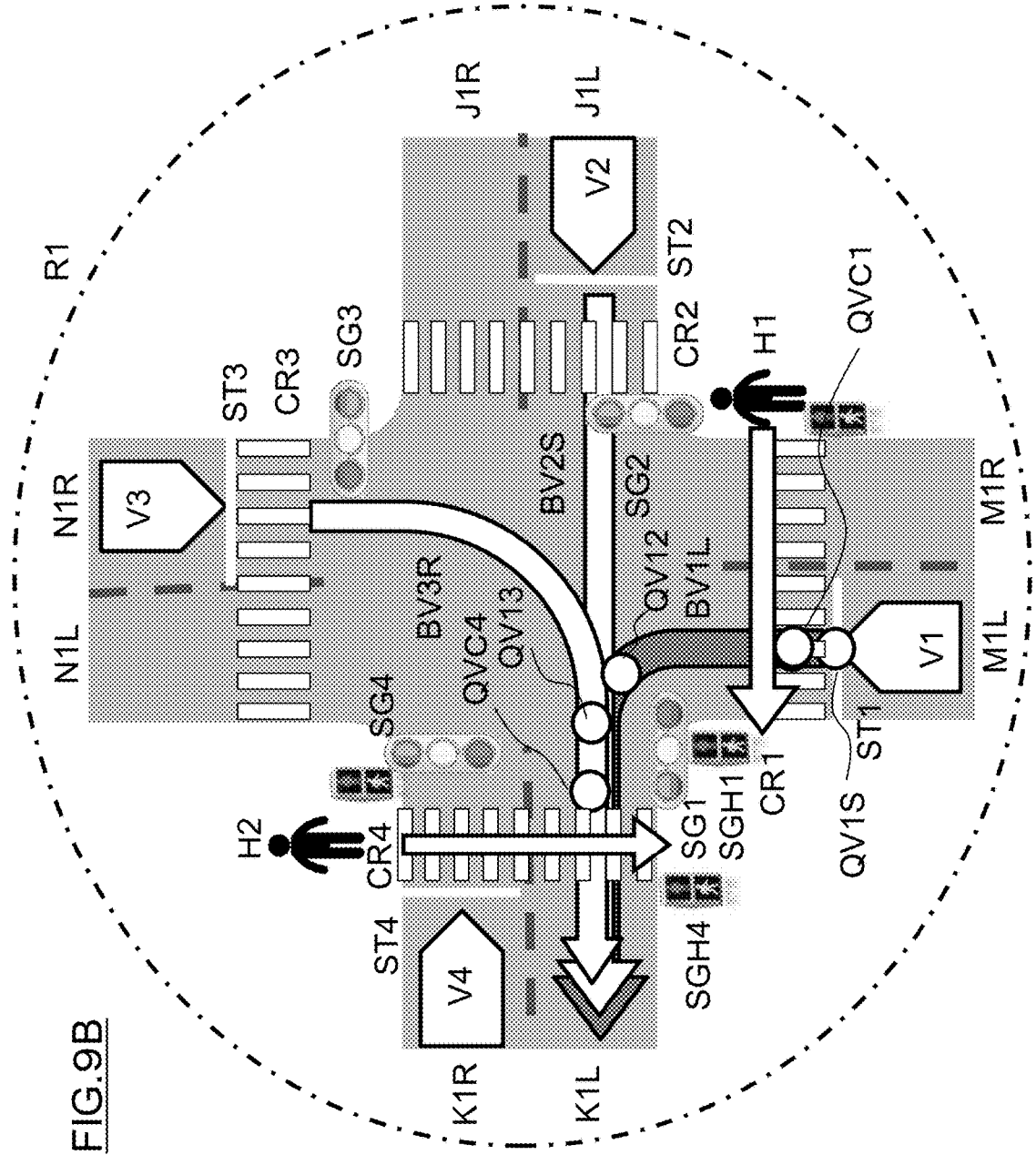
FIG. 9B is a second view for describing an extraction process for events and a planning process for driving.

In this example, as illustrated in FIG. 9B, the crosswalk CR1, second route BV2S, second route BV3R, and crosswalk CR4 are extracted as the second routes. The determination processor 11 refers to the traffic rule information 224 associated with the positional information and refers to the traffic rule effective on the first route BV1L. The determination processor 11 extracts a stop line ST1 that is located on the first route BV1L and at the upstream side of the crosswalk CR1. The position of the stop line ST1 is stored in association with the first route BV1L. Similarly, for the second route BV2S and the second route BV3R, the determination processor 11 refers to the traffic rule information 224 and extracts the traffic rules relating to the driving of other vehicles, and necessary items are stored in association with each second route. The determination processor 11 determines the positions of events for the subject vehicle V1 in accordance with the positions (positions of stop lines) to which the traffic rules stored in the traffic rule information 224 are applied.

In this example, the determination processor 11 determines the position of a point of intersection QVC1 between the stop line ST1 and the first route BV1L which are stored in the traffic rule information 224, as the position of an event. Stop positions corresponding to events are stored for each route. In this example, the point of intersection QV1S as an event is associated as a stop position with the crosswalk CR1. The point of intersection QV12 as an event is associated as a stop position with the second route BV2S.

The point of intersection QV13 as an event is associated as a stop position with the second route BV3R. The point of intersection QVC4 as an event is associated as a stop position with the crosswalk CR4.

The determination processor 11 checks the priority levels of the first route and the second route. In the example illustrated in FIG. 9B, the green light is shown (progressing is permitted) on the first route BV1L and on the second route BV3R. On the other hand, the red light is shown (stopping is required) on the second route BV2S. In this case, the determination processor 11 determines that the priority level of the first route BV1L is higher than the priority level of the second route BV2S. The determination processor 11 may remove the point of intersection QV12 between the first route BV1L and the second route BV2S from candidates for the events because the priority level of the first route BV1L is higher than the priority level of the second route BV2S. As will be understood, the point of intersection QV12 may still remain stored and used to make a determination of progressing in the drive operation planning process which will be described later. The determination processor 11 does not determine the priority levels of the first route BV1L and second route BV3R because the green light is shown on these routes.

In addition, the determination processor 11 checks the priority levels of the crosswalks as second routes and the first route. In the example illustrated in FIG. 9B, the red light is shown (crossing is prohibited) on the crosswalk CR1 while the green light is shown (progressing is permitted) on the first route BV1L. It is therefore determined that the priority level of the first route BV1L is higher than the priority level of the crosswalk CR1. The determination processor 11 may remove the point of intersection QVC1 between the first route BV1L and the crosswalk CR1 from candidates for the events because the priority level of the first route BV1L is higher than the priority level of the crosswalk CR1. As will be understood, the point of intersection QVC1 may still remain stored and used to make a determination of progressing in the drive operation planning process which will be described later.

In the example illustrated in FIG. 9B, the green light is shown (crossing is permitted) on the crosswalk CR4 with which the first route BV1L intersects. The green light is also shown (progressing is permitted) on the first route BV1L, but in accordance with the traffic rule that pedestrians on crosswalks take priority, a determination is made that the priority level of the first route BV1L is lower than the priority level of the crosswalk CR4. The determination processor 11 stores the point of intersection QVC4 between the first route BV1L and the crosswalk CR4 because the priority level of the first route BV1L is lower than the priority level of the crosswalk CR4.

The determination processor 11 determines the point of intersection QV1S between the first route BV1L and the stop line ST1, the point of intersection QV12 between the first route BV1L and the second route BV2S, the point of intersection QV13 between the first route BV1L and the second route BV3R, and the point of intersection QVC4 between the first route BV1L and the crosswalk CR4 as the events.

The determination processor 11 extracts the first route BV1L, the second route BV2S, the second route BV3R, the crosswalk CR1 as a second route, and objects existing on the crosswalk CR4, such as pedestrians and two wheels, as the events. In the example illustrated in FIG. 9B, the determination processor 11 extracts another vehicle V2 traveling on the second route BV2S, another vehicle V3 traveling on the second route BV3R, a pedestrian H1 crossing the crosswalk CR1, and a pedestrian H4 crossing the crosswalk CR4 as the events. Each object is stored in association with the route/position.

The determination processor 11 rearranges the events in the order of encounters with the subject vehicle V1, that is, in a time-series manner. Information on the order of rearranged events is transmitted to the drive planning processor 21. The events extracted via the output device 30 are presented to the user in a time-series manner and in a side-by-side fashion. This allows the user to visually recognize what types of events the subject vehicle V1 is to encounter.

Figure 10:
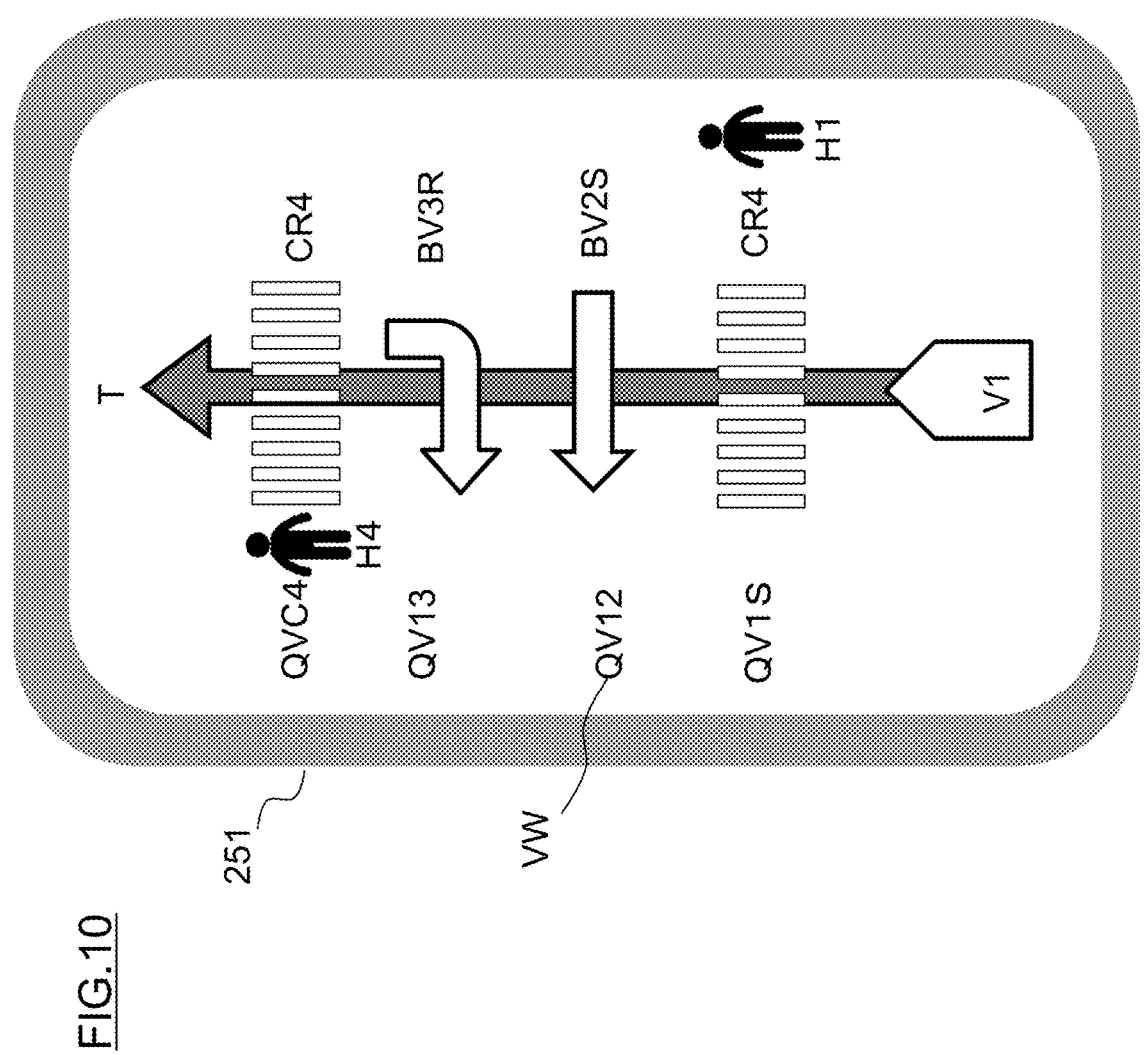
FIG. 10 is an example of display information representing events in a time-series manner.

FIG. 10 illustrates an example of display information VW that represents the events in a time-series manner. In the display example illustrated in FIG. 10, the progressing direction of the subject vehicle V1 on the first route is displayed as a bold arrow T. The direction of the arrow represents the time axis for the subject vehicle V1. The point of intersection QV1S with the stop line existing before the traffic signal is displayed as an icon of the crosswalk on the arrow T because the point of intersection QV1S is extracted as an event, and the points of intersections QV12 and QV13 extracted as events are displayed as straight and right-angled arrows superimposed on the arrow T while the point of intersection QVC4 with the crosswalk CR4 extracted as an event is displayed as an icon of the crosswalk superimposed on the arrow T. In addition, the crosswalk CR1, the points of intersections QV12 and QV13 with the second routes, and the crosswalk CR4 may also be displayed as the events which the subject vehicle V1 encounters. Objects existing on each second route may further be displayed. In this display example, the pedestrian H1 existing on the crosswalk CR1 and the pedestrian H4 existing on the crosswalk CR4 are displayed. Information items that represent points and/or objects representing the events (encounter positions/encounter timings/encounter objects) may be symbols or may also be abstract marks. Forms, such as color and size, can be freely determined.

The drive planning processor 21 according to one or more embodiments of the present invention determines the driving actions for respective events or second routes associated with the events in the following manner.

(1) The traffic signal SG1 on the first route BV1L shows the green light (progressing) while the traffic signals for pedestrians SGH1 on the crosswalk CR1 show the red light (stopping). The drive planning processor 21 determines the driving action for the event at the point of intersection QV1S as "progressing" because the priority level of the first route BV1L is higher than the priority level of the crosswalk CR1.

(2) The traffic signal SG2 on the second route BV2S shows the red light (stopping). The drive planning processor 21 determines the driving action for the event at the point of intersection QV12 as "progressing" because the priority level of the first route BV1L is higher than the priority level of the second route BV2S.

(3) The traffic signal SG1 on the first route BV1L shows the green light (progressing) while the traffic signal SG3 on the second route BV3R also shows the green light (progressing). The drive planning processor 21 does not determine the priority level of the first route BV1L to the second route BV3R. On the basis of the time remaining for the subject vehicle V1 to come into contact with another vehicle V3, the drive planning processor 21 determines the driving action at the point of intersection QV13.

(4) The traffic signal SG1 on the first route BV1L shows the green (or blue) light (progressing is permitted) while the traffic signals for pedestrians SGH4 on the crosswalk CR4 also show the green light (crossing is permitted). According to the traffic rule stored in the traffic rule information 224, the priority level of a crosswalk is higher than the priority level of a road for vehicles. Thus, both show the green light, but in accordance with the traffic rule information 224, the drive planning processor 21 determines the driving action for the event at the point of intersection QVC4 (see FIG. 9B) as "stopping."

Subsequently, the drive planning processor 21 according to one or more embodiments of the present invention plans/determines the driving operation plan in each scene. The drive planning processor 21 determines whether or not there is an event for which the "stopping" is determined among the plurality of events extracted within the region R1 set with the scene. When the extracted events include one or more events for which the "stopping" is determined, the drive planning processor 21 determines that the driving actions in the scene as a whole are "stopping." The drive planning processor 21 further determines a specific stop position.

In this example, when the "stopping" is determined, for example, for the event at the point of intersection QV13 on the second route BV3R, there are two or more routes for which the "stopping" is determined: the second route BV3R; and the crosswalk CR4 which is a second route.

The drive planning processor 21 determines the "stopping" for an event that is nearest to the subject vehicle V1 traveling on the first route. The drive planning processor 21 determines the stop position on the basis of the position of this event. The stop position is to be located at the further upstream side than the position of the event with respect to the traveling direction of the subject vehicle V1 on the first route and located within a predetermined distance from the event. In this example, the "stopping" is determined for the event relating to the point of intersection QV13 on the second route BV3R rather than the point of intersection QVC4 with the crosswalk CR4.

In the above case, the stop position for the point of intersection QV13 (event) is associated with the second route BV3R, but the point of intersection QV13 exists on the second route BV2S. The drive planning processor 21 therefore does not set the stop position at the point of intersection QV13 and in the vicinity thereof and instead sets the stop position at the point of intersection QV12 associated with the second route BV2S or in the vicinity of the point of intersection QV12.

When the "progressing" is determined for the event relating to the point of intersection QV13 on the second route BV3R, the point of intersection QVC4 with the crosswalk CR4 is set as the stop position. The point of intersection QVC4 is located on the crosswalk CR4 and also located on the second route BV3R. As such, the point of intersection QV13 on the second route BV3R at the upstream side in the traveling direction of the subject vehicle V1 is set as the stop position. Further, the point of intersection QV13 is located on the second route BV3R and also located on the second route BV2S. As such, the point of intersection QV12 on the second route BV2S at the upstream side in the traveling direction of the subject vehicle V1 is set as the stop position.

The above process is repeated until a determination is made that all the events are processed along the first route to the destination.

Figure 11A:
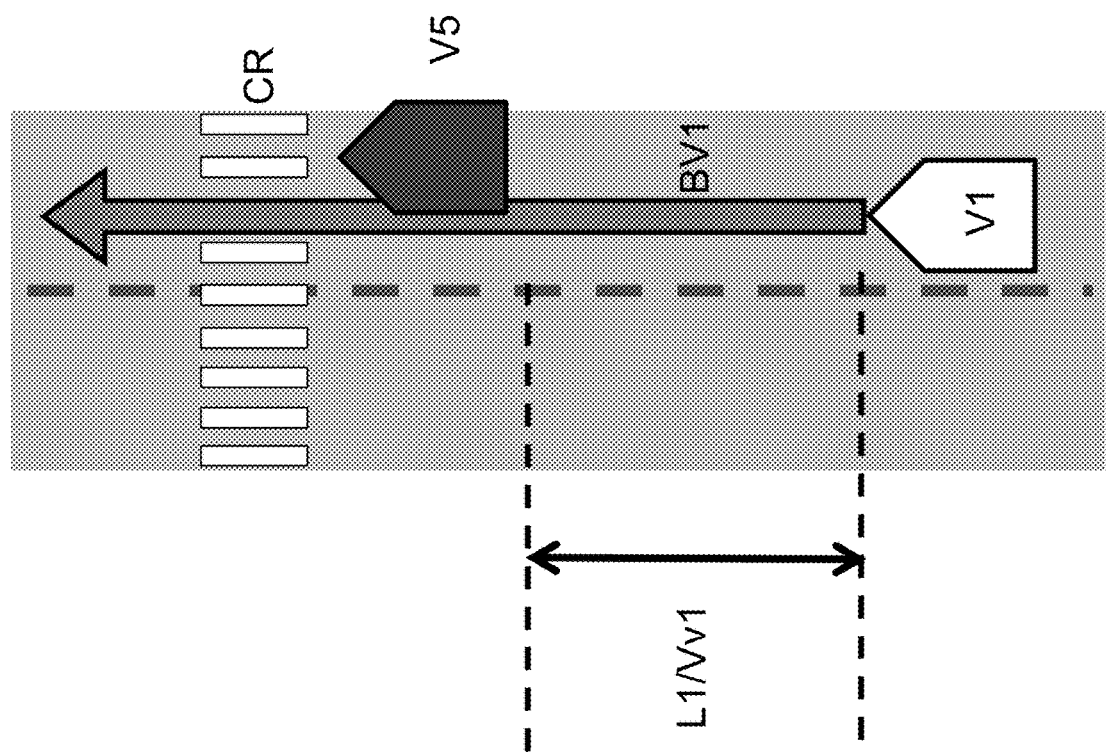
FIG. 11A is a first view for describing an extraction process for events including a parking vehicle.

A modified example of the above process will be described below. The scene of this example is illustrated in FIG. 11A. This example is an exemplary scene when the subject vehicle travels on a two-lane road as the first route BV1.

The determination processor 11 extracts a crosswalk CR as a second route having a point of intersection with the first route BV1. The determination processor 11 further extracts another vehicle V5 as an event and stores it in association with the first route BV1. In the previously-described example, the first route and a second route intersect with each other at an angle, but in this example, the first route and the second route share a certain area on their route.

Figure 12:
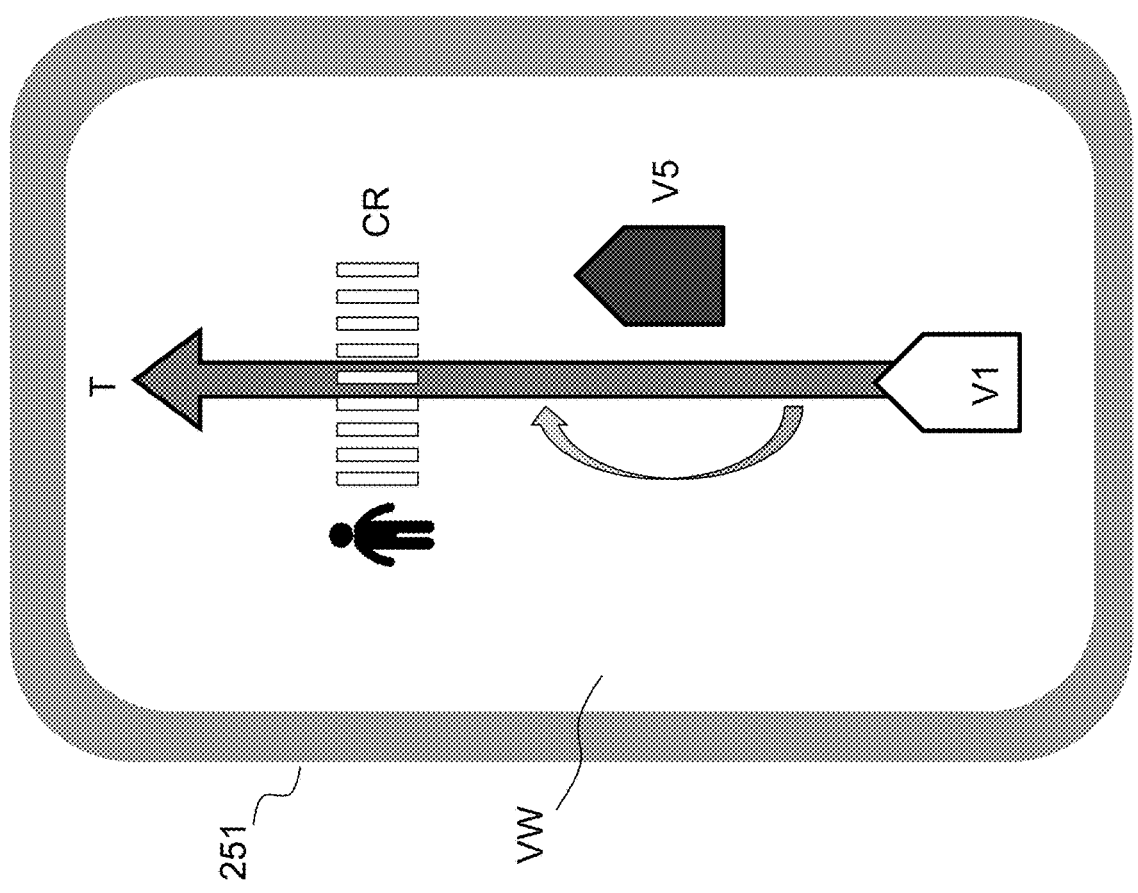
FIG. 12 is an example of display information representing events in a time-series manner.

The extracted events are arranged in the order of encounters. Now consider the relative distance from the subject vehicle V1 to another vehicle V5 and the relative distance from the subject vehicle V1 to the crosswalk CR with reference to the first route BV1 for the subject vehicle V1. The output control processor 31 displays the arranged events on the display 251 on the basis of the obtained relative distances. A display example is illustrated in FIG. 12. As illustrated in FIG. 12, the subject vehicle V1, another vehicle V5, and the crosswalk CR are displayed in this order.

If the subject vehicle V1 travels straight in the state of FIG. 11A, the subject vehicle V1 cannot pass through the event relating to another vehicle V5 because the subject vehicle V1 will come into contact with the other vehicle V5. When a pedestrian exists on the crosswalk CR, the drive planning processor 21 determines "stopping." When, as in this example, the other vehicle V5 hides the pedestrian on the crosswalk CR, a determination of being undeterminable (impossible to determine) is made because of occurrence of a blind area.

Figure 11B:
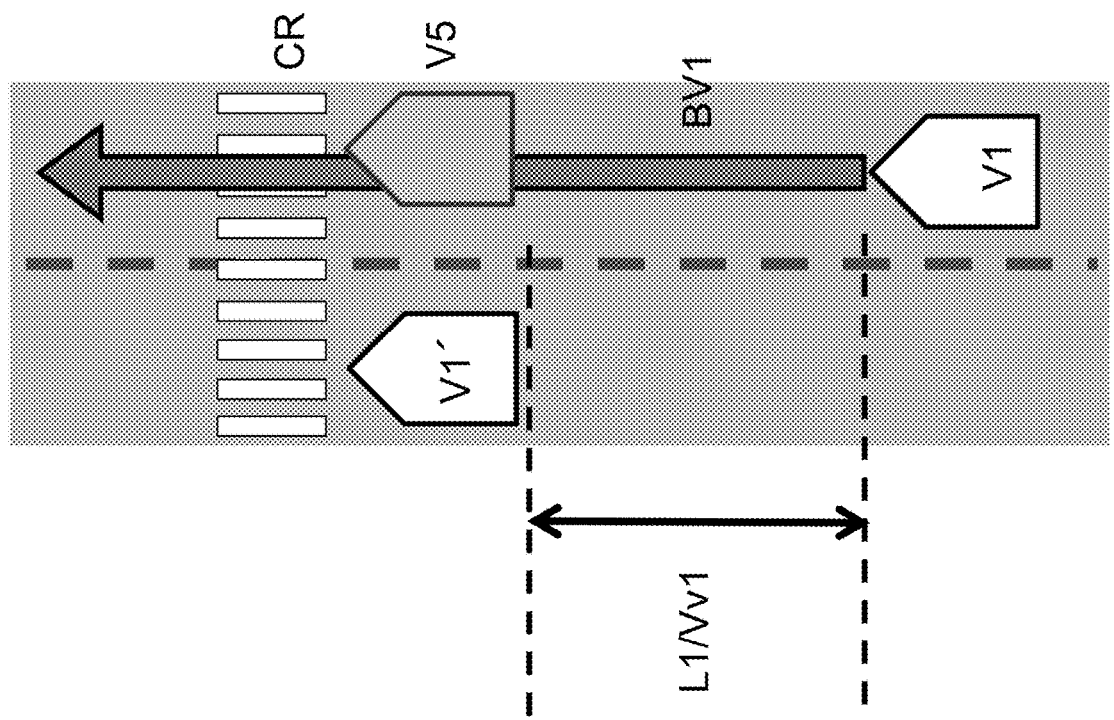
FIG. 11B is a second view for describing an extraction process for events including a parking vehicle.

The drive planning processor 21 determines a possibility of contact between the subject vehicle V1 and another vehicle V5. The determination processor 11 searches for a route for avoiding the other vehicle V5 as illustrated in FIG. 11B and, when such an avoidance route is obtained, the event relating to the other vehicle V5 can be determined as "progressing." Conditions for the avoidance route can include a condition that there are no other vehicles traveling on the oncoming lane and a condition that a route is obtained for avoiding another vehicle V5 having a vehicle width larger than that of the subject vehicle V1.

The drive planning processor 21 determines actions throughout the entire scene. In this example, another vehicle V5 is avoidable, so "progressing" is determined for this event. The existence of a pedestrian on the crosswalk CR cannot be confirmed (impossible to determine). In this case, the subject vehicle V1 must stop before the crosswalk CR and "stopping" is thus determined. An event of "progressing" exists before an event of "stopping." In this case, the drive planning processor 21 sets the speed when traveling on the route for avoiding another vehicle V5, for which the "progressing is determined, at a lower speed than the speed set previously. In other words, the drive planning processor 21 controls the subject vehicle V1 to decelerate. The subject vehicle V1 decelerates to avoid another vehicle V5, which is avoidable, and approaches the crosswalk CR (event) at a stoppable speed (speed from which immediate stopping is possible) to pass through the crosswalk CR. Again, determination is undeterminable for the crosswalk CR because of the blind area due to the other vehicle V5 parking.

When the existence of a pedestrian on the crosswalk CR can be confirmed and the "stopping" is determined for the crosswalk CR, the subject vehicle V1 makes a stop before the crosswalk CR. In cases of a four-lane road, whether to be able to change lanes may be determined together with consideration for the possibility of interference with other vehicles traveling on the adjacent lane. These allow appropriate responses to events that are difficult to determine in advance, such as the occurrence of a blind area.

A scheme of setting candidate stop positions when determining a stop position in a driving operation plan will be described below.

The drive planning processor 21 according to one or more embodiments of the present invention sets one or more candidate stop positions for the subject vehicle V1 to make a stop, using determination results for relationships between the subject vehicle V1 and a plurality of events which the subject vehicle V1 encounters in a time-series manner when traveling on the first route. The one or more candidate stop positions are set for respective events. The drive planning processor 21 plans/determines a driving operation plan for a scene which the subject vehicle encounters using determination results for relationships between the subject vehicle V1 and the plurality of events which the subject vehicle encounters at the candidate stop positions.

Thus, in the traffic in which the first route and the second route have an point of intersection, the driving operation plan is planned/determined with consideration for the relationships between the subject vehicle V1 and the plurality of events which the subject vehicle V1 encounters at the candidate stop positions and, therefore, the driving can be realized without affecting other vehicles, pedestrians, etc.

The drive planning processor 21 according to one or more embodiments of the present invention determines a candidate stop position, among the candidate stop positions, that is nearest to the subject vehicle V1 in the scene which the subject vehicle V1 encounters, as a stop position for the subject vehicle V1 to make a stop. Thus, the subject vehicle V1 is controlled to make a stop at the position, among the candidate stop positions, which is nearest to the current position of the subject vehicle V1, and the influence on the traffic stream can be mitigated.

The drive planning processor 21 according to one or more embodiments of the present invention sets the candidate stop positions at positions located at a further upstream side by predetermined distances than stop positions required for the subject vehicle V1 to make a stop. The influence on the traffic stream can be mitigated because the subject vehicle V1 is controlled to make a stop at a position that is nearer to the current position of the subject vehicle than the stop position defined in the actual traffic rule information 224.

The drive planning processor 21 according to one or more embodiments of the present invention sets the candidate stop positions at positions located at a further upstream side by predetermined distances than an outer edge of a region in which parking and stopping of the subject vehicle V1 are prohibited, that is, outside/nearside the parking and stopping prohibition region. The influence on the traffic stream can be mitigated because the subject vehicle V1 is controlled to make a stop at a position that is nearer to the current position of the subject vehicle than the stop position defined in the actual traffic rule information 224.

The drive planning processor 21 according to one or more embodiments of the present invention sets the candidate stop positions outside/nearside a travelable region of another route as a second route that intersects with the first route. The influence on the traffic stream can be mitigated because the subject vehicle V1 is controlled to make a stop at a position that is nearer to the current position of the subject vehicle V1 than a position located inside the lane of the second route or than the outer edge of the travelable region.

When the subject vehicle V1 passes through one event and the vehicle body of the subject vehicle V1 protrudes from the first route, the drive planning processor 21 according to one or more embodiments of the present invention plans/determines the driving operation plan such that the subject vehicle V1 makes a stop at a candidate stop position that is located at the upstream side adjacent to the one event. When the subject vehicle V1 protrudes from the first route, that is, when the vehicle body of the subject vehicle V1 may enter a lane of another route or its travelable region, the influence on the traffic stream can be mitigated because the subject vehicle V1 is controlled to make a stop at the position of an event that is nearer to the current position of the subject vehicle V1. Although not particularly limited, when the subject vehicle V1 passes through one event and at least a part of the vehicle body of the subject vehicle V1 enters the second route, the subject vehicle V1 may be controlled to make a stop at a candidate stop position that is located at the upstream side adjacent to the one event. Also in this case, the influence on the traffic stream can be mitigated.

The drive planning processor 21 according to one or more embodiments of the present invention can be configured not to set the candidate stop positions in a region in which events which the subject vehicle V1 encounters do not occur due to a traffic signal on the first route or a traffic rule on the first route. When the subject vehicle V1 is ensured to travel on the first route due to the green light and/or when the first route is defined as a priority road by the traffic rule and the subject vehicle V1 is ensured to have a priority to travel, setting of the candidate stop positions can be unnecessary. Stopping can therefore be avoided in a scene in which stopping is not required, and smooth traveling can be performed.

When another vehicle merges into the first route at the position of a candidate stop position from a second route having a point of intersection with the first route and the speed of the other vehicle is a specified speed or less, the drive planning processor 21 according to one or more embodiments of the present invention determines stopping at another candidate stop position that is located at the upstream side adjacent to the candidate stop position. When the speed of another vehicle merging into the first route at the position of a candidate stop position is a specified speed or less, a traffic jam or other similar traffic situation may possibly occur. In such cases, the subject vehicle cannot make a stop at an appropriate position and may affect other vehicles and/or pedestrians. When the speed of another vehicle merging into the first route at the position of a candidate stop position is a specified speed or less, therefore, the subject vehicle can be controlled to make a stop at a candidate stop position near the current position of the subject vehicle thereby to take a driving action that does not affect the streams of other vehicles and pedestrians.

A first scheme of setting a stop position in a driving operation plan will be described below.

Figure 13A:
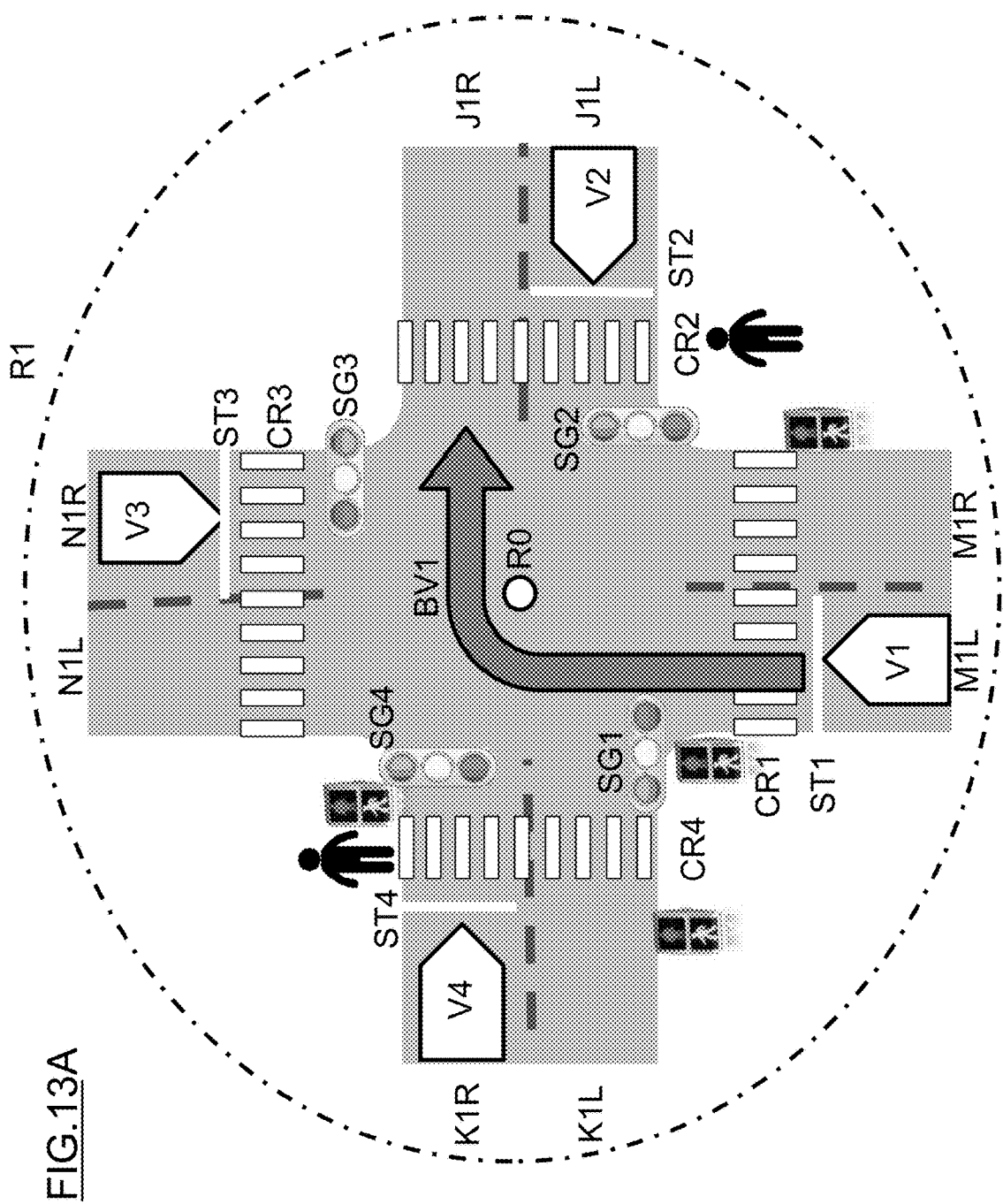
FIG. 13A is a first view for describing a scheme of setting candidate stop positions.

Description will be made with reference to an exemplary scene illustrated in FIG. 13A. The scene illustrated in FIG. 13A is a scene in which the subject vehicle V1 turns to the right at an intersection. The determination processor 11 extracts a first route BV1, a crosswalk CR1, and a crosswalk CR2.

Figure 13B:
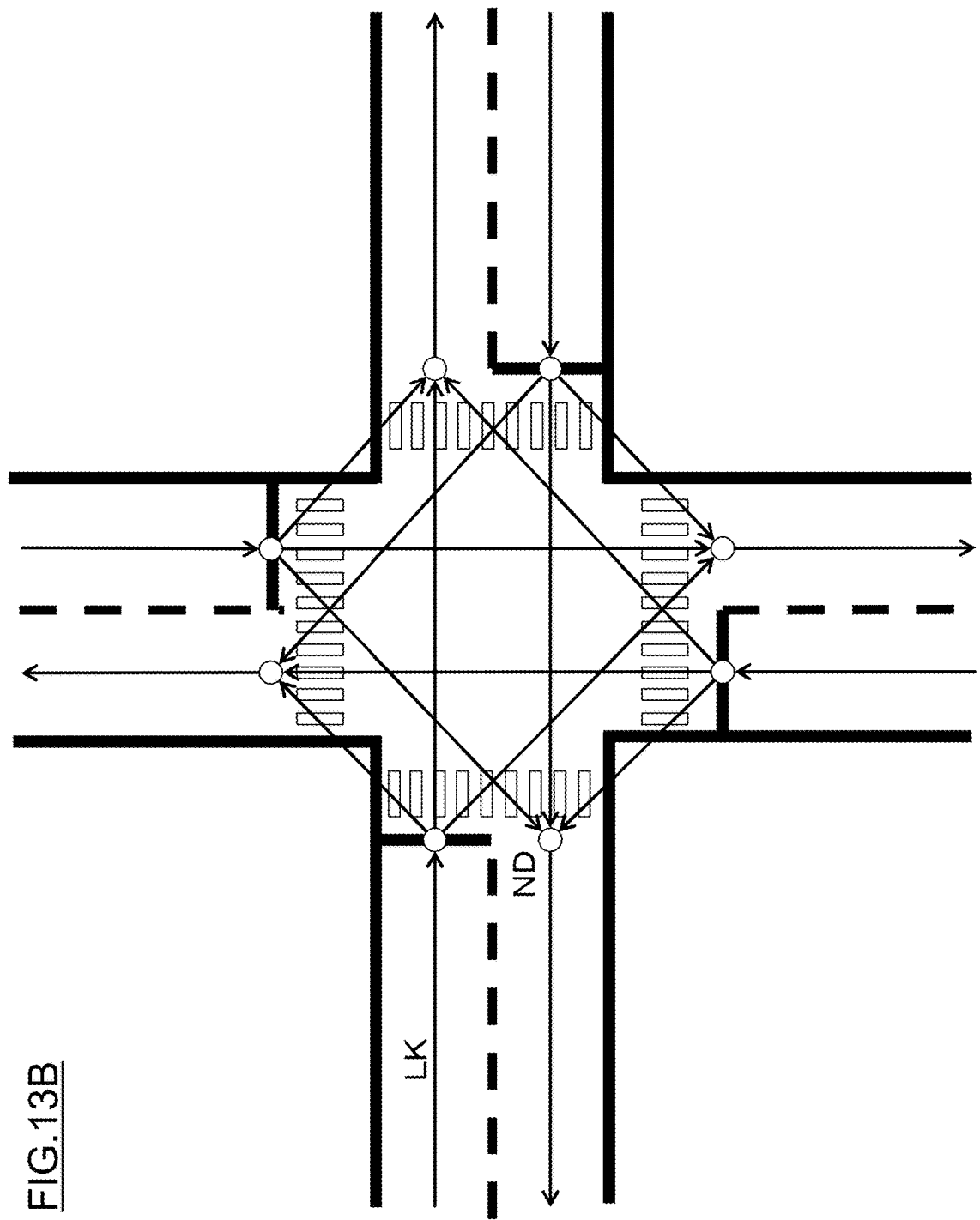
FIG. 13B is a second view for describing a scheme of setting candidate stop positions.

Here, second routes having points of intersections with the first route are extracted. Extraction of the second routes can be efficiently processed using link information and node information that are included in the map information 222. As illustrated in FIG. 13B, the map database representing an intersection includes a number of nodes ND and a number of links LK. Nodes ND are denoted by circles and links LK are denoted by arrows on the routes. Links LK express all the destinations (connecting ports) at nodes ND that are start/end points. Examples of such nodes include those at which links are branched from one node to two or more nodes and those at which links are unified into one node from two or more nodes. Here, by focusing attention on nodes at which links are unified into one node from two or more nodes, it is possible to extract links that may merge into the first route for the subject vehicle and links that may intersect with the first route for the subject vehicle. This enables extraction of lanes that may merge into the first route for the subject vehicle and lanes that may intersect with the first route for the subject vehicle.

The drive planning processor 21 sets candidate stop positions. The candidate stop positions are set for events that are selected from the events extracted by the determination processor 11. The drive planning processor 21 determines whether or not the candidate stop positions are those for the events extracted by the determination processor 11.

Figure 13C:
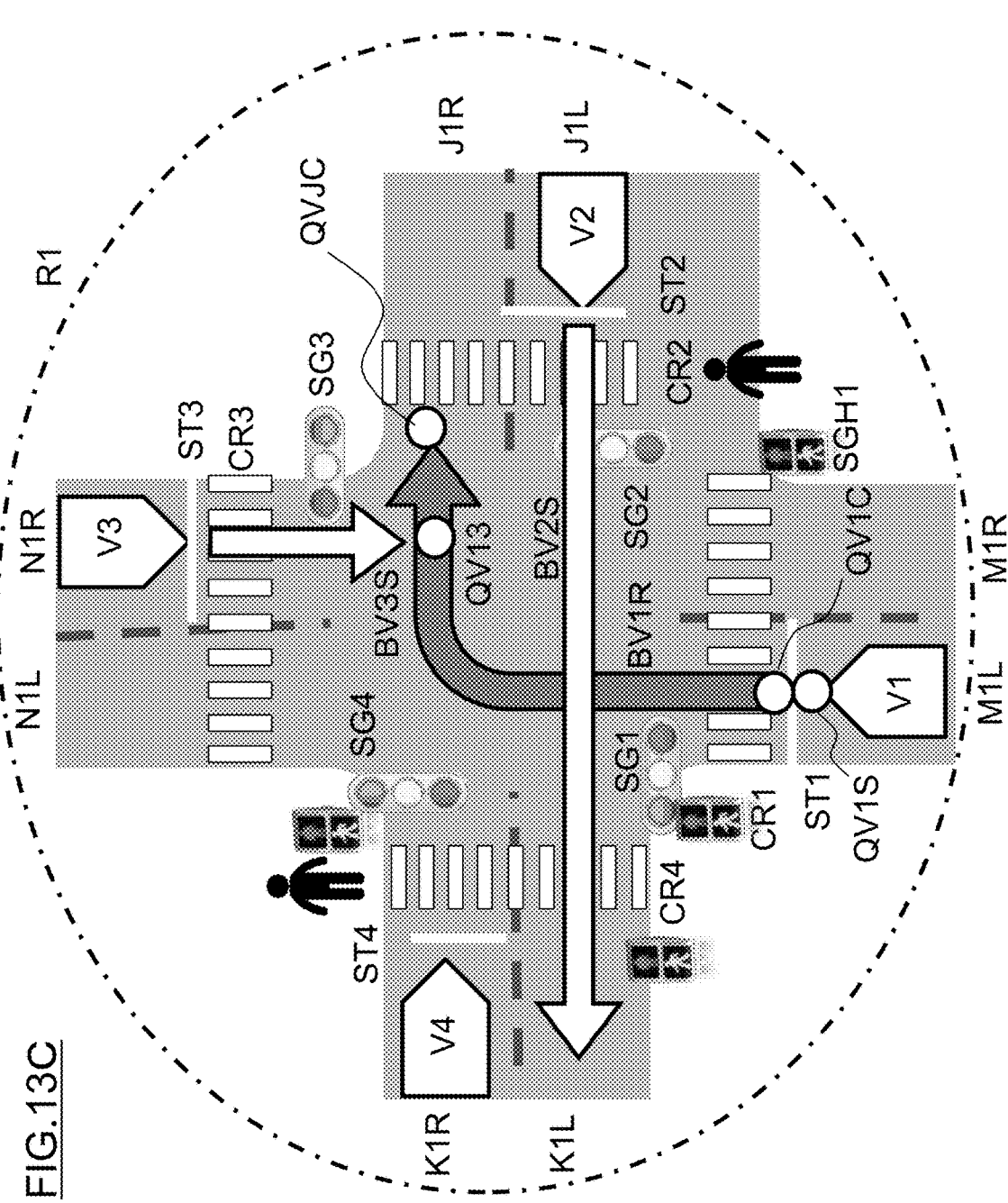
FIG. 13C is a third view for describing a scheme of setting candidate stop positions.

Depending on the state of traffic signals on the first route for the subject vehicle V1, there are cases in which consideration is not necessary for second routes that merge into the first route for the subject vehicle V1 and second routes that intersect with the first route for the subject vehicle V1. In the example illustrated in FIG. 13C, the traffic signal SG1 at the intersection shows the green light. In this case, the traffic signal SG2 on the second route BV2S which intersects at a right angle with the first route BV1R for the subject vehicle V1 shows the red light (stopping). As such, another vehicle V2 on the second route does not affect the subject vehicle V1. The determination processor 11 determines that the priority level of the first route BV1R is higher than the priority level of the second route BV2S. Then, the determination processor 11 takes into account the situation that the traffic signal SG2 on the second route BV2S shows the red light, and excludes the point of intersection with the second route BV2S from the events.

The relationship between the subject vehicle V1 and the crosswalk CR1 will be discussed. When the traffic signals for pedestrians SGH1 at the crosswalk CR1 show the red light, pedestrians waiting at the crosswalk CR1 may not affect the subject vehicle V1. The determination processor 11 therefore determines that the crosswalk CR1 is not an event which the subject vehicle V1 encounters. When the traffic signals for pedestrians SGH1 at the crosswalk CR1 show the green light, pedestrians on the crosswalk CR1 may affect the subject vehicle V1. The determination processor 11 therefore determines that the crosswalk CR1 is an event which the subject vehicle V1 encounters. There may also be cases in which no traffic signals exist at the crosswalk CR1 or cases in which indications of traffic signals cannot be detected. In such cases, it is possible to determine whether or not to be an event by estimating the signal light of the traffic signals for pedestrians SGH1, which should be opposite to the traffic signal SG1 for vehicles, and using the above schemes.

Next, the relationship between the subject vehicle V1 and the second route BV3S will be discussed. Another vehicle V3 travels straight on the second route BV3S. An exemplary case will be employed for the discussion, in which the traffic signal SG3 on the second route BV3S regulating the travel of the other vehicle V3 shows the green light. According to the traffic rule, the second route BV3S is a lane in which traveling on the second route BV3S takes priority over traveling on the first route BV1R on which the subject vehicle V1 turns to the right. The determination processor 11 therefore determines that the point of intersection QV13 between the second route BV3S and the first route BV1R is an event.

In this example, the determination processor 11 determines three events: the stop line ST1 on the first route BV1R; the point of intersection QV13 with the second route BV3S; and the stop position QVJC before the crosswalk CR2.

Figure 13D:
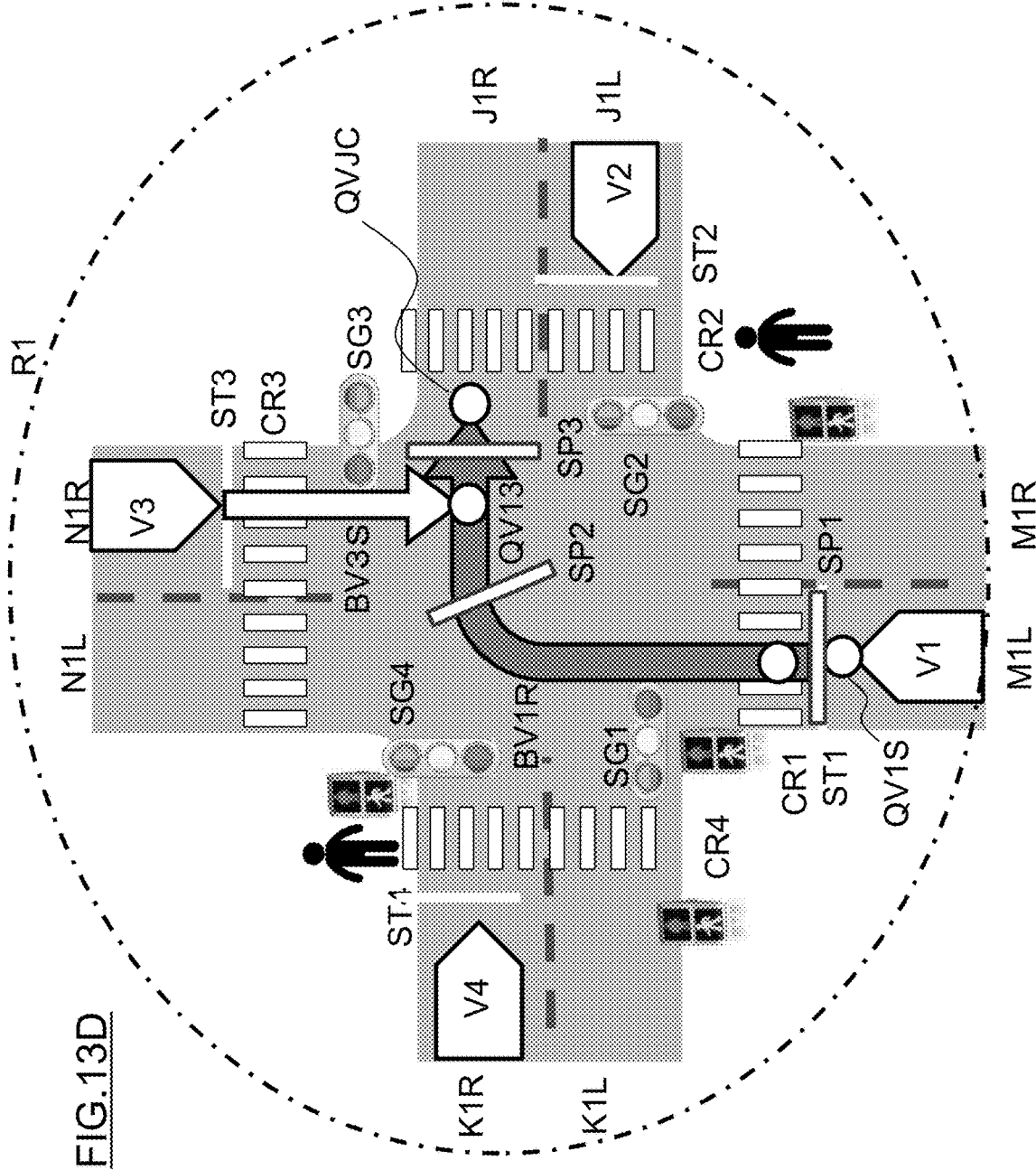
FIG. 13D is a fourth view for describing a scheme of setting candidate stop positions.

As illustrated in FIG. 13D, the determination processor 11 arranges the events (stop line ST1, point of intersection QV13 with second route BV3S, stop position QVJC before crosswalk CR2, and crosswalk CR2) on the first route BV1R in the order of encounters with the subject vehicle V1 in accordance with relative distances from the subject vehicle V1 to the encounter events.

The drive planning processor 21 makes a determination of "progressing (Go)" or "stopping (Stop)" for each event. For example, the determination of progressing/stopping is made for the stop line ST1 on the basis of the state of the traffic signal SG1 and made for the crosswalk CR2 on the basis of presence or absence of a pedestrian crossing. That is, for the stop line ST1, determination of progressing is made when the traffic signal SG1 shows the green light while determination of stopping is made when the traffic signal SG1 shows the red light. For the crosswalk CR1, determination of stopping is made when there is a pedestrian who is crossing or starts crossing while determination of progressing is made when there is not a pedestrian who is crossing or starts crossing. For a second route which merges into or intersects with the first route for the subject vehicle V1, determination of progressing/stopping is made using presence or absence of another vehicle traveling on the second route and the degree of approaching with another vehicle which merges into or intersects with the first route for the subject vehicle at the point of intersection. The scheme of determining the degree of approaching is as described previously.

The drive planning processor 21 sets candidate stop positions in accordance with the positions of respective encounter events. In the example illustrated in FIG. 13D, the drive planning processor 21 sets a candidate stop position SP1 in the vicinity of the stop line ST1, sets a candidate stop position SP2 in the vicinity of the center R0 of the intersection, and sets a candidate stop position SP3 before the crosswalk CR2. The candidate stop position SP1 is set at an upstream position (position at the subject vehicle V1 side) separate from the stop line ST1 by a predetermined distance. The candidate stop position SP2 is set at an upstream position separate from the point of intersection QV13 between the second route BV3S and the first route BV1R by a predetermined distance. The candidate stop position SP3 is set at a position before the crosswalk so as to be separate from the crosswalk by a specified distance. The subject vehicle can make a stop at any of these three candidate stop positions because the subject vehicle does not interfere with the traffic streams on other routes if the traffic signal SG1 on the first route BV1R shows the green light.

The drive planning processor 21 determines an optimum candidate stop position from the plurality of candidate stop positions. Although not particularly limited, the drive planning processor 21 determines the center of intersection, which is a candidate stop position that is nearest to the subject vehicle V1 and determined as "stopping," as the stop position. Thus, an appropriate event is selected from the plurality of candidate stop positions for the subject vehicle V1 to make a stop, and a stop position suitable for the scene to be encountered can therefore be determined.

A second scheme of setting a stop position in a driving operation plan will then be described.

Description will be made with reference to an exemplary scene illustrated in FIG. 14A. The scene illustrated in FIG. 14A is a scene in which the subject vehicle V1 turns to the right at a T-intersection. The determination processor 11 extracts a first route BV1, a crosswalk CR1, and a crosswalk CR2. The first route BV1 has a point of intersection with the second route BV2S. In the T-intersection, traveling on the second route BV2S has priority over traveling on the first route BV1.

The determination processor 11 refers to the traffic rule information 224 to extract a stop position on the first route BV1R on which the subject vehicle V1 travels. The stop position in the traffic rule is a point at which the subject vehicle V1 encounters a situation in which stopping is forced. The determination processor 11 further extracts points at which the subject vehicle V1 is highly likely to encounter events. Specifically, the determination processor 11 extracts a second route CR1 (crosswalk) having a point of intersection with the first route BV1R, a second route BV2S, a second route BV4S, and a second route CR2 (crosswalk). Then, the determination processor 11 extracts one or more points of intersections between the first route BV1R and the second route BV4S. In this example, five points of intersections are extracted as illustrated in FIG. 14A: "point Q1 before stop line ST1"; "point Q2 before crosswalk CR1"; "point Q3 before second route BV2S"; "point Q4 before second route BV4S"; and "point Q5 before crosswalk CR2."

The drive planning processor 21 arranges the events in the order of Q1→Q2→Q3→Q4→Q5 in accordance with the order of encounters with the subject vehicle V1 on the basis of relative distances from the subject vehicle V1 to the events on the first route for the subject vehicle V1. These may be displayed on the display 251, if necessary.

The determination processor 11 refers to the map information 222, the road information 223, and the traffic rule information 224 to determine whether or not there are events that can be candidates for the stop position. The determination processor 11 sets events that may affect the subject vehicle V1 as encounter events and does not set events that do not affect the subject vehicle V1 as encounter events. The scene of this example represents a T-intersection with no traffic signals and the subject vehicle V1 travels on a non-priority lane. All of the extracted five events are therefore extracted as events which the subject vehicle encounters.

Figure 14B:
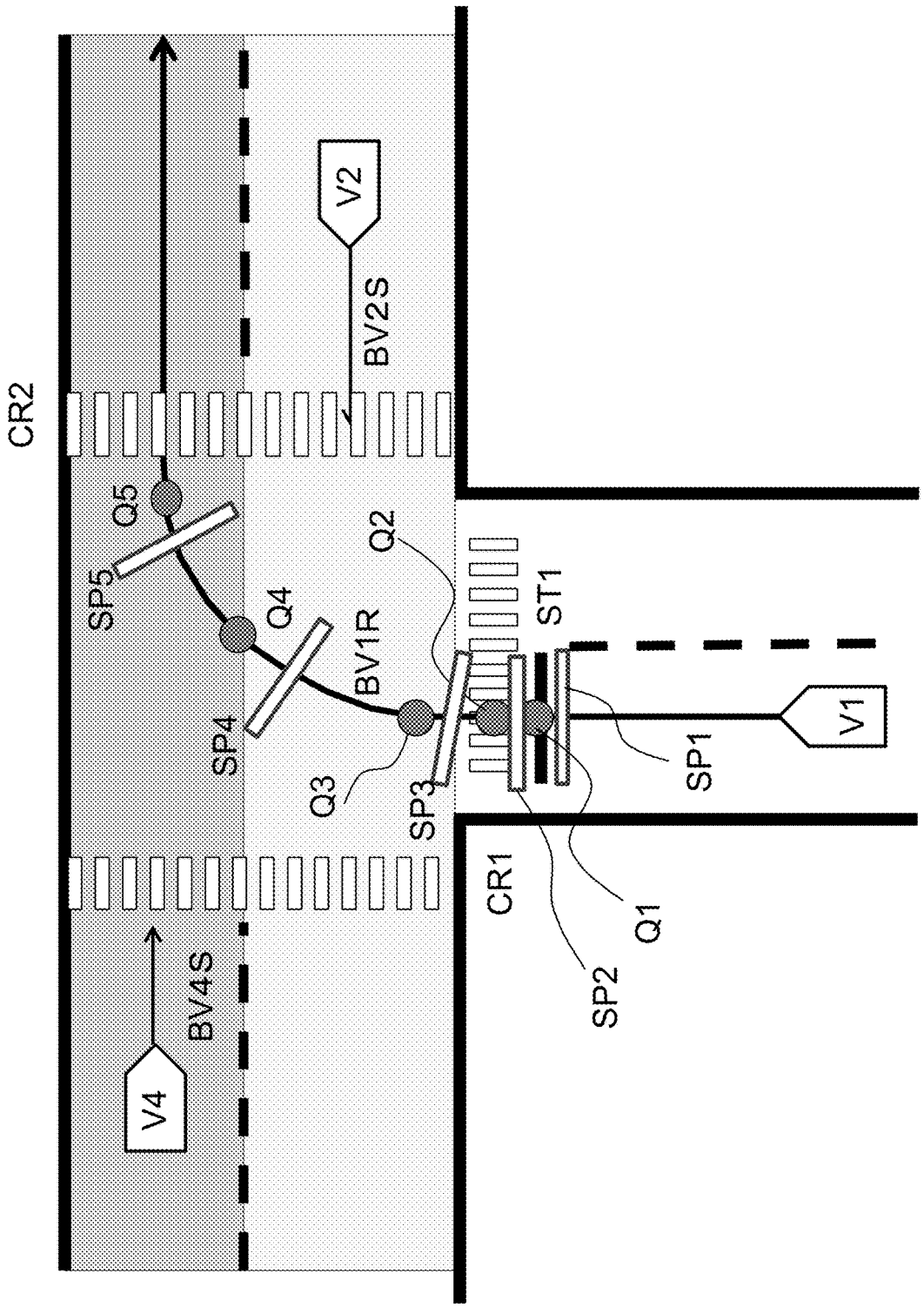
FIG. 14B is a second view for describing a scheme of setting candidate stop positions in a T-intersection.

As illustrated in FIG. 14B, the drive planning processor 21 sets candidate stop positions in accordance with the positions of respective events. The drive planning processor 21 sets each candidate stop position at a position shifted toward the upstream side from each of the points Q1 to Q5 by a certain distance. In this example, the drive planning processor 21 sets a "candidate stop position SP1 corresponding to the stop line ST1," a "candidate stop position SP2 corresponding to the crosswalk CR1," a "candidate stop position SP3 corresponding to the point of intersection with the second route BV2S," a "candidate stop position SP4 corresponding to the point of intersection with the second route BV4S," and a "candidate stop position SP5 corresponding to the crosswalk CR2" as the candidate stop positions.

The drive planning processor 21 determines an appropriate stop position from the plurality of candidate stop positions SP1 to SP5 included in one scene. Although not particularly limited, the drive planning processor 21 determines the candidate stop position SP1, which is a candidate stop position that is nearest to the subject vehicle V1, as the stop position.

When, after controlling the subject vehicle V1 to make a stop at the candidate stop position SP1, the drive planning processor 21 finds a pedestrian at the crosswalk CR1, then the drive planning processor 21 controls the subject vehicle V1 to make a stop again at the candidate stop position SP2 corresponding to the crosswalk CR1.

When two or more candidate stop positions are close to each other (within a predetermined distance), the drive planning processor 21 unifies them. This can mitigate the processing load.

When no pedestrians exist at the crosswalk CR1, the drive planning processor 21 controls the subject vehicle V1 to progress to the candidate stop position SP3 and to make a stop there. When a pedestrian is found only at the crosswalk CR2, the drive planning processor 21 determines the candidate stop position SP5 corresponding to the crosswalk CR2 as the stop position.

When another vehicle V4 travels on the second route BV4S and may affect the traveling of the subject vehicle V1, the drive planning processor 21 executes the following process. The drive planning processor 21 determines whether or not the set plurality of candidate stop positions includes a candidate stop position on a route that is in a different direction from the traveling direction of the subject vehicle V1. In the example illustrated in FIG. 14B, the candidate stop position SP4 exists within a lane region of the second route BV2S which is in a different direction from that of the first route BV1R. The drive planning processor 21 therefore estimates that the stop position for the subject vehicle V1 affects another vehicle V2. The drive planning processor 21 determines the candidate stop position SP3 located prior to (at the upstream side of) the candidate stop position SP4 as the stop position. When the candidate stop position SP3 is not within the travelable region of the second route, the candidate stop position SP3 is determined as the stop position. According to this example, when the subject vehicle V1 turns to the right and enters the priority road of T-intersection from the non-priority road, the stop position can be determined with consideration for another vehicle V2 traveling from right to left on the second route BV2S as the priority route of the T-intersection and another vehicle V4 traveling from left to right on the second route BV4S. Stopping is thus possible at a natural stop position that does not affect the other vehicles V2 and V4.

A third scheme of setting a stop position in a driving operation plan will be described below.

Figure 15:
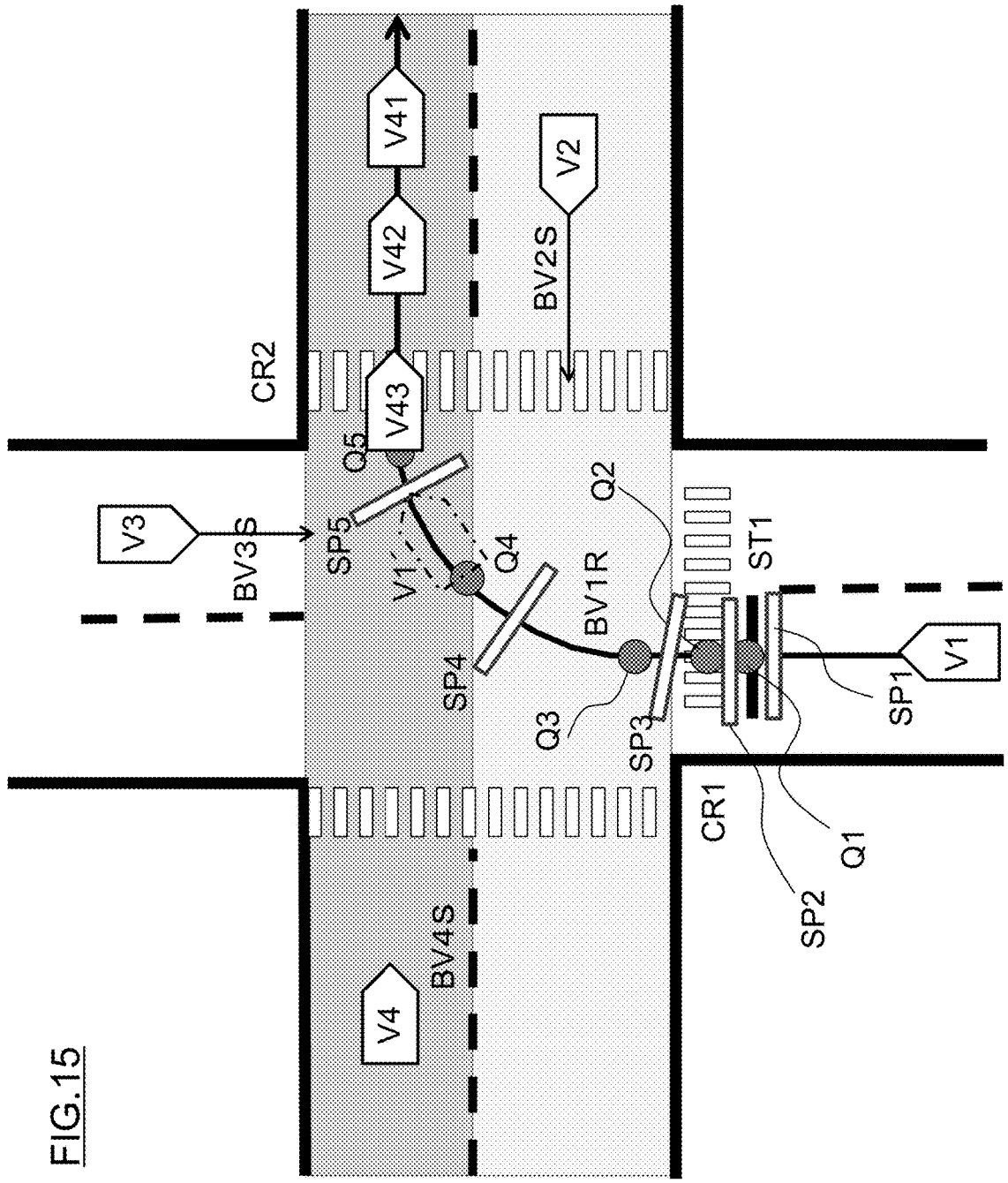
FIG. 15 is a third view for describing a scheme of setting candidate stop positions in a traffic jam.

Description will be made with reference to an exemplary scene illustrated in FIG. 15. The scene illustrated in FIG. 15 is a scene in which the road after right turn is jammed. When the speed of another vehicle merging into the first route at the position of any of candidate stop positions is a specified speed or less, the drive planning processor 21 determines that the first route for the subject vehicle V1 is jammed. In this example, even in such a scene of traffic jam, the stop position of another vehicle is taken into account to determine an appropriate stop position for the subject vehicle. The determination processor 11 extracts a first route BV1, a crosswalk CR1, and a crosswalk CR2.

In this example, passing is determined for the stop line ST1 because the traffic signal shows the green light. With regard to the point of intersection with another vehicle V3 which travels straight in the oncoming lane, it is assumed that the determination of "progressing" is made in this example because the other vehicle V3 is less likely to come close to the subject vehicle V1. However, still another vehicle V43 exists before the crosswalk CR2 and there is therefore no space for the subject vehicle V1 to make a stop before the crosswalk CR2.

The drive planning processor 21 makes a determination as to whether or not stopping is possible at a "point of intersection Q4 with the second route BV3S" that is an event prior to a point of intersection Q5 at which the subject vehicle encounters an event. In this example, on the assumption that the red light is shown at the crosswalk CR1 and no pedestrians exist at the crosswalks CR1 and CR2, determination of progressing is made for the crosswalks CR1 and CR2.

The drive planning processor 21 sets candidate stop positions SP1 to SP5 on the basis of the positions of points of intersections Q1 to Q5, respectively. The drive planning processor 21 assumes that the candidate stop position SP4 corresponding to the point of intersection Q4 prior to the point of intersection Q5 as the stop position. The drive planning processor 21 determines whether or not the candidate stop position SP4 is included in a lane of the second route BV2S on which the traveling direction is different from that on the first route BV1R. The candidate stop position SP4 is included in a lane of the second route BV2S and the stop position may therefore interfere with the traveling of another vehicle V2 which travels on the second route BV2S. In particular, if the traffic jam continues and the traffic signal changes from the green light to the red light, the stop position for the subject vehicle V1 will affect the traveling of another vehicle V2.

As such, the candidate stop position SP3 prior to the candidate stop position SP4 is provisionally determined as the stop position. The drive planning processor 21 makes the same determination also for the candidate stop position SP3. The candidate stop position SP3 also interferes with the second route BV2S, so the candidate stop position SP2 prior to the candidate stop position SP3 is determined as a candidate. Here, the candidate stop position SP2 interferes with the crosswalk CR1 which is a second route. Thus, the stop line ST1 is ultimately determined as the stop position.

In this way, in a scene in which the area located ahead of the intersection is jammed when the subject vehicle V1 turns to the right at the intersection, an appropriate stop position is determined from among the candidate stop positions with consideration for the stop position of another vehicle V43 and the subject vehicle V1 can therefore be controlled to make a stop at the stop position which does not affect other vehicles.

When planning a driving operation plan, the drive planning processor 21 can determine whether or not lane change is possible. When an object is detected ahead of the subject vehicle V1, the drive planning processor 21 calculates the distance from the subject vehicle V1 to the object. In addition or alternatively, the drive planning processor 21 may take into account the speed to calculate the time remaining for the subject vehicle V1 to reach the object. The drive planning processor 21 makes a determination as to the possibility of lane change, that is, whether or not the lane change is possible, by determining whether a relative distance X is ensured sufficiently between the subject vehicle and another vehicle traveling ahead. In an example, the drive planning processor 21 defines a distance XMIN as a threshold for determining that the lane change is possible, and determines whether or not X>XMIN is satisfied, where X represents a distance from the subject vehicle to a vehicle to overtake. The drive planning processor 21 determines that the subject vehicle V1 can change lanes when X>XMIN is satisfied, and otherwise determines that the lane change is not possible. The threshold XMIN is a distance required for the subject vehicle V1 to overtake another vehicle traveling ahead, or a margin distance that may have to be taken into account when the subject vehicle V1 travels in this traveling scene.

As will be understood, the vehicle speed may be taken into account to calculate a time for reaching as substitute for the distance. In an example, the drive planning processor 21 defines a time for reaching TMIN as a threshold for determining that the lane change is possible, and determines whether or not T>TMIN is satisfied, where T represents a time remaining for the subject vehicle to reach a vehicle to overtake. The drive planning processor 21 determines that the subject vehicle V1 can change lanes when T>TMIN is satisfied, and otherwise determines that the lane change is not possible. The threshold TMIN is a time required for the subject vehicle V1 to overtake another vehicle traveling ahead, or a margin time that may have to be taken into account when the subject vehicle V1 travels in this traveling scene.

In one or more embodiments of the present invention, after the events are arranged in the order of encounters with the subject vehicle V1 on the basis of the relative distances between the events and the subject vehicle V1, a determination is made as to whether or not the lane change is possible. This allows the subject vehicle to respond to overtaking of another vehicle with consideration for vehicles adjacent to the first route for the subject vehicle and vehicles traveling ahead of the subject vehicle.

A procedure of the process executed in the travel assistance system 1 according to one or more embodiments of the present invention will then be described with reference to the flowchart of FIG. 16. As will be understood, the overview of processing in each step is as described above. Flow of the process will be mainly described here and an example of a specific process will be described later.

First, in step S1, the determination processor 11 acquires subject vehicle information of the subject vehicle V1. The subject vehicle information includes the position, speed/acceleration, and traveling direction of the subject vehicle V1.

In step S2, the determination processor 11 acquires object information. The object information includes presence or absence of an object existing around the subject vehicle V1, the attribute of an object (stationary object or moving object), the position of an object, the speed/acceleration of an object, and the moving direction of an object. The object information can be acquired from the object detection device 230 and/or the navigation device 220.

In step S3, the determination processor 11 determines whether the nearest encounter scene which the subject vehicle V1 is to encounter is changed. The encounter scene is a scene, such as an intersection which the subject vehicle is to pass through. The determination processor 11 determines whether or not the traveling route is changed and whether or not the subject vehicle has passed through the encounter scene which was to be determined immediately before. This is because the necessity of setting a new encounter scene should be determined. When the current position of the subject vehicle V1 belongs to a route that has already been calculated, the determination processor 11 determines that the traveling route is not changed. When the current position of the subject vehicle V1 does not belong to the route which has already been calculated, the determination processor 11 determines that the traveling route is changed.

When the current position of the subject vehicle V1 does not belong to a region that has been set as the encounter scene immediately before, the determination processor 11 determines that the subject vehicle V1 has passed through the encounter scene. When the current position of the subject vehicle V1 belongs to the region which has been set as the encounter scene immediately before, the determination processor 11 determines that the subject vehicle V1 has not yet passed through the encounter scene.

When the traveling route is changed or when the subject vehicle V1 has passed through the encounter scene, the determination processor 11 determines that the encounter scene is changed, and executes the process of steps S4 to S9. When the traveling route is not changed and the subject vehicle V1 has not yet passed through the encounter scene, the determination processor 11 determines that the encounter scene is not changed and the routine proceeds to step S11.

In step S4, the determination processor 11 calculates a first route on which the subject vehicle V1 travels. The first route calculated by the navigation device 220 may also be utilized. The first route is specified by a road identifier, lane identifier, node identifier, and/or link identifier. These road identifier, lane identifier, node identifier, and link identifier are defined in the map information 222 and/or the road information 223.

In step S5, the determination processor 11 sets a scene which the subject vehicle V1 traveling on the first route encounters. The encounter scene is a region that includes points at which points of intersections between the first route and other routes exist. The form of a point of intersection with the first route is not limited and may be any of a merging point, branching point, intersection, T-intersection, and adjacent point. The encounter scene is a region that includes points at which stopping is required on the first route in accordance with the traffic rule information 224. The determination processor 11 refers to the map information 222, road information 223, and/or traffic rule information 224 to set a region R1 that is a scene in which, as illustrated in FIG. 2B, the subject vehicle V1 is highly likely to encounter events. Examples of scenes which the subject vehicle V1 encounters include a region in the vicinity of an intersection, a region in the vicinity of a merging point of lanes, a region in the vicinity of a crosswalk, a region in the vicinity of a stop line, a region in the vicinity of a railroad crossing, and a region in the vicinity of a construction site.

In step S6, the determination processor 11 extracts second routes having points of intersections with the first route. The determination processor 11 refers to the map information 222 and/or the road information 223 to extract second routes having points of intersections with the first route. The determination processor 11 refers to link information (node information) defined in the map information 222. At a location at which two or more routes intersect with each other, the link information (node information) is connected to two or more other links. The determination processor 11 extracts second routes that intersect with the first route, from the connection situation of the link information (node information).

In step S7, the determination processor 11 extracts events which the subject vehicle V1 encounters in the set encounter scene. The determination processor 11 extracts points of intersections between the first route and the second routes as events. As will be understood, at a merging point of routes, two or more links are connected to another link. At an intersection, the vicinity of entrance to the intersection corresponds to a branching point of lanes while the vicinity of exit from the intersection corresponds to a merging point of lanes. Thus, a point at which one link is connected to two or more other links can be extracted as an event in which the first route and one or more second routes intersect with each other at the exit side of an intersection. In other words, one or more second routes can be detected at the exit from an intersection by detecting the existence of a point at which one link is connected to two or more other links. In addition, the link information is defined also with a crosswalk, and a crosswalk intersecting with the first route can be detected as a second route by determining the intersection between a link of the first route and a link of the crosswalk. The determination processor 11 extracts points at which stopping is required on the first route in accordance with the traffic rule information 224, as events.

Positions of the extracted events are stored in association with the routes. Positions of the extracted events may also be stored in association with the map information 222 and/or the road information 223. In the planning of a driving operation plan which will be performed afterward, a driving action is determined for the position of each extracted event.

In step S8, the determination processor 11 rearranges the extracted plurality of events in the order of encounters with the subject vehicle V1.

In step S9, the output control processor 31 displays the rearranged plurality of events on the display 251. In addition or alternatively, the output control processor 31 may output the rearranged plurality of events by voice using the speaker 252.

In step S11, the drive planning processor 21 extracts objects which the subject vehicle traveling on the first route encounters. The drive planning processor 21 extracts information on objects existing on the second routes. This information is included in the object information obtained in step S2. In the example illustrated in FIG. 2G, another vehicle V2 traveling on the second route BV2S and another vehicle V3 traveling on the second route BV3R are extracted.

In step S12, the drive planning processor 21 associates the objects with the events or the routes. The object information may also be associated with route identifiers because if the routes can be specified, points of intersections with the first route can be narrowed down. The object information of another vehicle V2 is associated with the identifier of the second route BV2S or the identifier of the point of intersection QV12 (positional information). The object information of another vehicle V3 is associated with the identifier of the second route BV3R or of the point of intersection QV12.

In step S13, the drive planning processor 21 determines a driving action for each event. The driving action is determined on the basis of the possibility of contact between the subject vehicle V1 and an object, as described above. The possibility of contact is determined on the basis of the distance between the subject vehicle V1 and the object or the time remaining for the subject vehicle V1 to come into contact with the object.

In step S14, the drive planning processor 21 determines whether or not an event determined with "stopping" exists in the plurality of events which belong to the region R1 set as the scene. The drive planning processor 21 determines whether or not at least one event determined with "stopping" exists within the region R1 set as the scene.

When, in step S14, a determination is made that an event determined with "stopping" does not exist, the routine proceeds to step S16 in which a driving operation plan of "passing" through the region R1 set as the scene is planned. When, in step S14, one or more events determined with "stopping" exist, the routine proceeds to step S15 in which a driving operation plan in the region R1 set as the scene is planned. Specifically, the driving content of "progressing" or "stopping" is determined for each of the extracted events and a stop position is set in accordance with positions of the events.

Steps S15 and S16 are followed by step S17, in which the driving control is executed on the basis of the planned driving operation plan. The vehicle controller 210 is used for controlling the subject vehicle V1 to make a stop at the position of an event determined with "stopping" and controlling the subject vehicle V1 to progress at the position of an event determined with "progressing."

Figure 16:
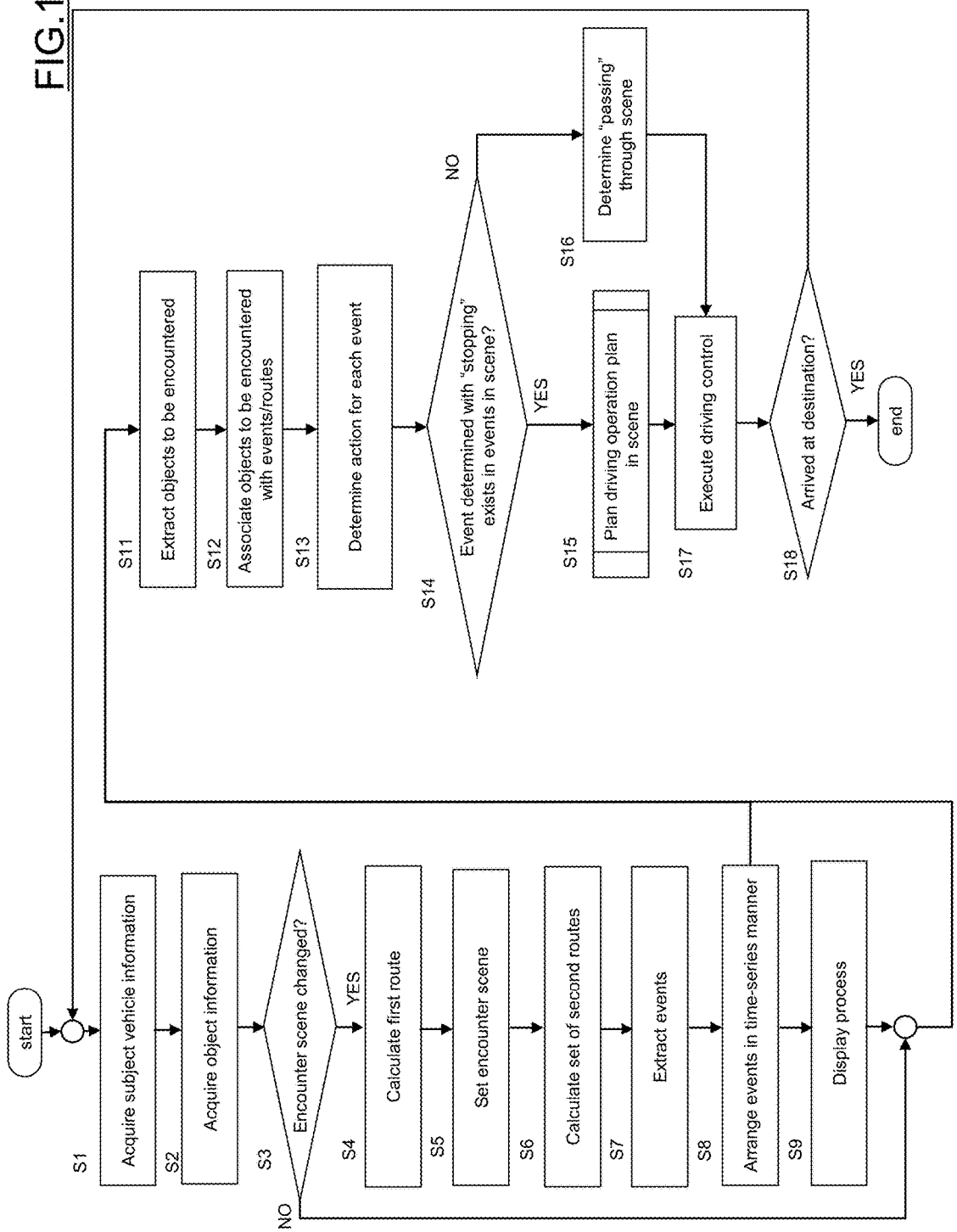
FIG. 16 is a flowchart illustrating a control procedure in a travel assistance system according to one or more embodiments of the present invention.
Figure 17:
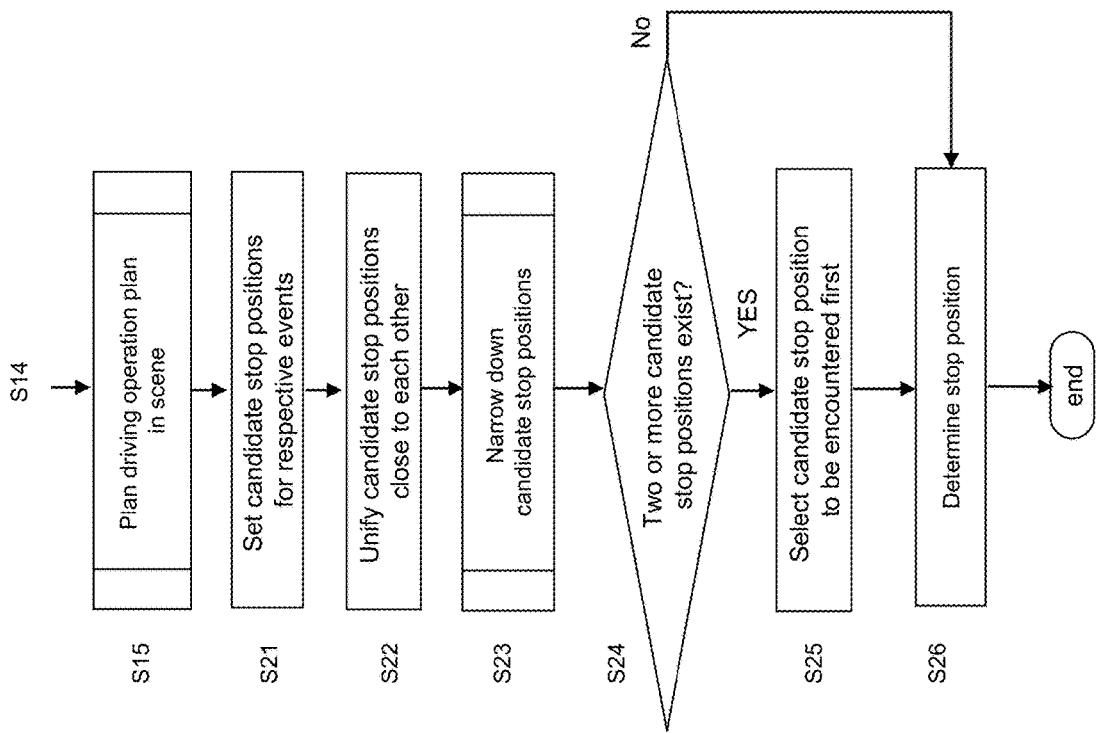
FIG. 17 is a flowchart illustrating a subroutine of step S15 of the control procedure illustrated in FIG. 16.

FIG. 17 is a flowchart illustrating a subroutine of the process, illustrated in FIG. 16, of planning a driving operation plan. As illustrated in FIG. 17, in step S21, the drive planning processor 21 sets candidate stop positions in accordance with the positions of respective events. If, in step S22, two or more candidate stop positions are close to each other within a predetermined distance, the drive planning processor 21 unifies them. In step S23, the drive planning processor 21 determines the validity of the candidate stop positions. Specifically, the drive planning processor 21 determines whether the position of each candidate stop position exists within the region of a second route and whether the position of each candidate stop position does not exist within a parking and stopping prohibition region.

When, in step S24, there are a number of candidate stop positions after being narrowed down, the routine proceeds to step S25 in which the drive planning processor 21 selects a candidate stop position which the subject vehicle V1 encounters first. In step S26, the drive planning processor 21 determines a stop position.

Figure 18:
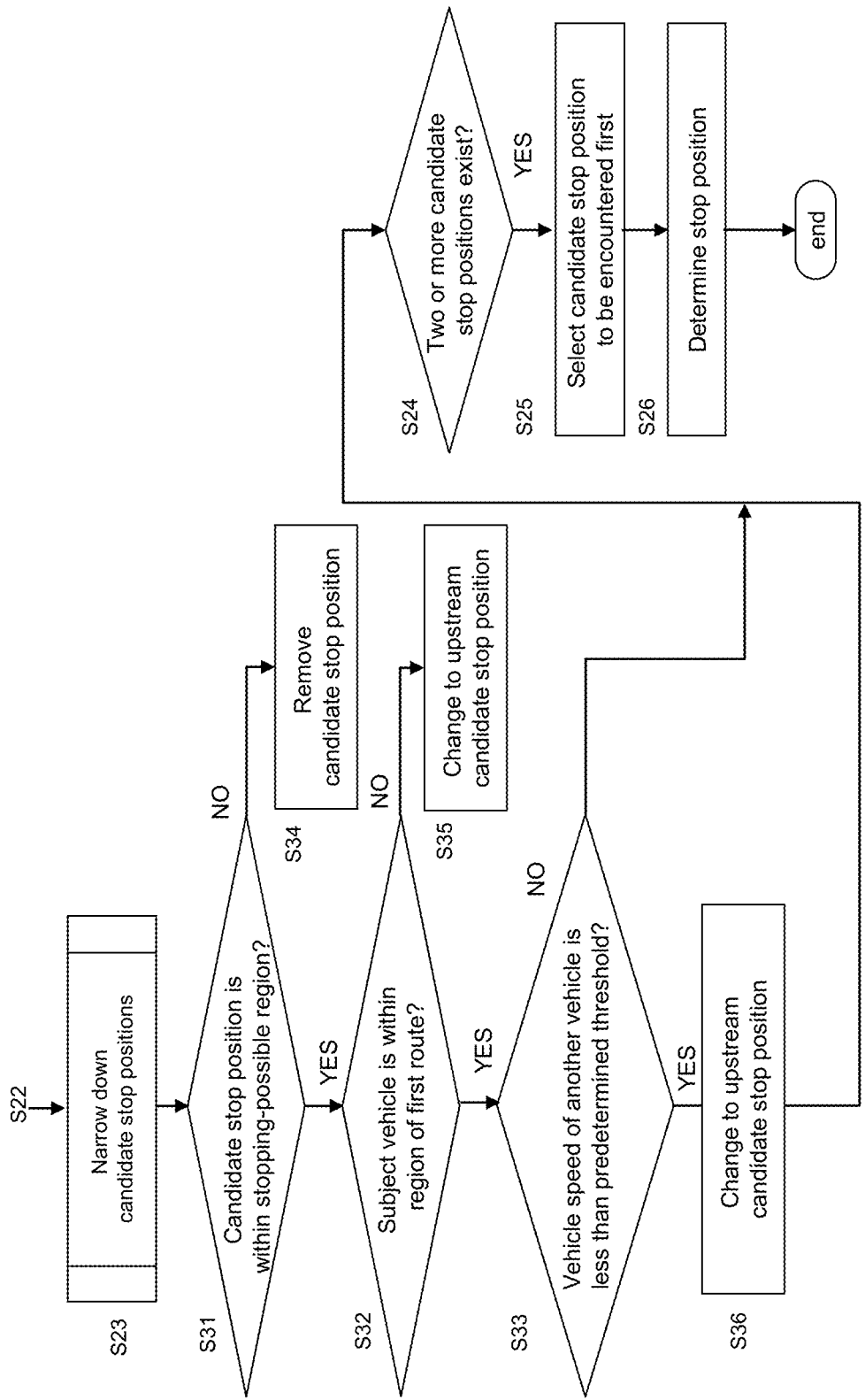
FIG. 18 is a flowchart illustrating a subroutine of step S23 of a control procedure illustrated in FIG. 17.

FIG. 18 is a flowchart illustrating a subroutine of the process, illustrated in FIG. 17, of narrowing down the candidate stop positions.

In step S31, the drive planning processor 21 determines whether or not a candidate stop position is within a stopping-possible region (region in which stopping is possible). When the candidate stop position is not within a stopping-possible region, stopping is not preferred and the routine proceeds to step S34 in which the candidate stop position is removed from candidate data. Also when the candidate stop position is within a parking and stopping prohibition region, the candidate stop position is removed from the candidate data. On the other hand, when the candidate stop position is within a stopping-possible region, the routine proceeds to step S32.

In step S32, the drive planning processor 21 determines whether or not the subject vehicle is within a region of the first route. When the candidate stop position is not within a region of the first route, the subject vehicle may adversely affect another vehicle traveling on another route or a pedestrian walking on a crosswalk which is another route. The routine therefore proceeds to step S35 in which the position of the candidate stop position is shifted toward the upstream side (subject vehicle side). On the other hand, when the candidate stop position is within a region of the first route, the routine proceeds to step S33.

In step S33, the drive planning processor 21 determines whether or not the vehicle speed of another vehicle merging into the first route is less than a predetermined value. The predetermined value is a threshold of the speed for determining the occurrence of traffic jam. When the speed of another vehicle is slow, the traffic after the merging may be jammed. When the vehicle speed of another vehicle is less than the predetermined value, the routine proceeds to step S36.

In step S33, the drive planning processor 21 takes into account the possibility that the subject vehicle V1 cannot make a stop at an appropriate position due to the traffic jam occurring on the merging route, and preliminarily shifts the candidate stop position toward the upstream side (subject vehicle side). When the vehicle speed of another vehicle is not less than the predetermined value, the routine proceeds to step S24. The process of steps S24 to S26 is as described with reference to FIG. 17.

Another embodiment regarding the process of extracting events will be described below.

The scene determination device 10 according to one or more embodiments of the present invention includes a determination processor 11. Other configurations, such as an onboard apparatus 200, are as previously described.

The determination processor 11 according to one or more embodiments of the present invention extracts a first route on which the subject vehicle travels and a second route having a point of intersection with the first route.

The determination processor 11 according to one or more embodiments of the present invention calculates a travel estimation line of time series of the subject vehicle V1 traveling on the first route. The travel estimation line includes elements on the time axis. The travel estimation line is represented by a set of information items regarding the position of the subject vehicle V1 which is moving, that is, a set of positional information items that vary as the time passes. The change of position of the subject vehicle V1 is estimated on the basis of the current position and the destination information which is input to the navigation device 220. The determination processor 11 may make the navigation device 220 execute calculation of the travel estimation line and may acquire the result. The travel estimation line may be a continuous line segment and may also be discrete line segments.

In addition or alternatively, the determination processor 11 calculates a travel estimation strip of time series of the subject vehicle V1 traveling on the first route. The travel estimation strip includes elements on the time axis. The travel estimation strip is represented by a set of information items regarding the position of the subject vehicle V1 which is moving, that is, a set of positional information items that vary as the time passes. The travel estimation strip is different from the travel estimation line in that the travel estimation strip represents the position of the subject vehicle V1 by a plane, but the contents of information is the same. The travel estimation strip may be obtained by expanding the width of the travel estimation line along a certain plane. The determination processor 11 may make the navigation device 220 execute calculation of the travel estimation strip and may acquire the result.

The determination processor 11 according to one or more embodiments of the present invention calculates a travel estimation line of time series of the subject vehicle V1 traveling on the first route and extracts an event which the subject vehicle encounters, on the basis of the positions of points of intersections between the travel estimation line and a second route having a point of intersection with the first route. The time is taken into account to extract an event from the positions of the points of intersections with the travel estimation line, and an appropriate event can thereby be extracted.

The determination processor 11 according to one or more embodiments of the present invention extracts the event on the basis of the position of a point of intersection located at the most upstream side along the traveling direction of another vehicle traveling on the second route, among the points of intersections between the travel estimation line and the second route. The event is extracted on the basis of the position of a point of intersection at which the travel estimation line and the second route intersect with each other at the earliest timing. The moving direction of another vehicle traveling on the second route is taken into account, and an appropriate event can thereby be extracted with consideration for the time.

The determination processor 11 according to one or more embodiments of the present invention calculates a travel estimation strip of time series of the subject vehicle traveling on the first route and extracts an event which the subject vehicle encounters, on the basis of the position of a point of intersection that is obtained at the earliest timing and located at the most upstream side along a traveling direction on the second route, among the points of intersections between the travel estimation strip and the second route. The points of intersections between the second route and the travel estimation strip make one or more line segments. Among the points of intersections, a point of intersection located at the most upstream side along the traveling direction on the second route is employed, and one event can thus be extracted with consideration for the time.

When the subject vehicle travels in a region of the first route in which a lane is not defined, the determination processor 11 according to one or more embodiments of the present invention refers to the map information 222 to generate the travel estimation line or the travel estimation strip. This allows an event to be extracted even within a region, such as an intersection, in which a lane is not defined.

The determination processor 11 according to one or more embodiments of the present invention refers to the map information 222 in which nodes and links are defined, to extract a first node associated with the first route on which the subject vehicle travels. The first node is defined with a connection relationship with other nodes. The determination processor 11 selects a route to which the other nodes belong, as the second route. The other nodes are defined with the connection relationship with the first node. The second route can be searched using the connection relationship with the nodes. The second route can therefore be searched with a low processing load.

When two or more extracted events which the subject vehicle V1 encounters are close to each other within a predetermined distance, the determination processor 11 according to one or more embodiments of the present invention unifies the two or more events into one event. Events close to each other are organized thereby to prevent repetition of progressing/stopping, and smooth driving can be performed.

The drive planning processor 21 according to one or more embodiments of the present invention determines either a progressing action or a stopping action for each of events extracted by the determination processor 11. This enables extraction of the events without uncomfortable feeling with regard to time.

Figure 19:
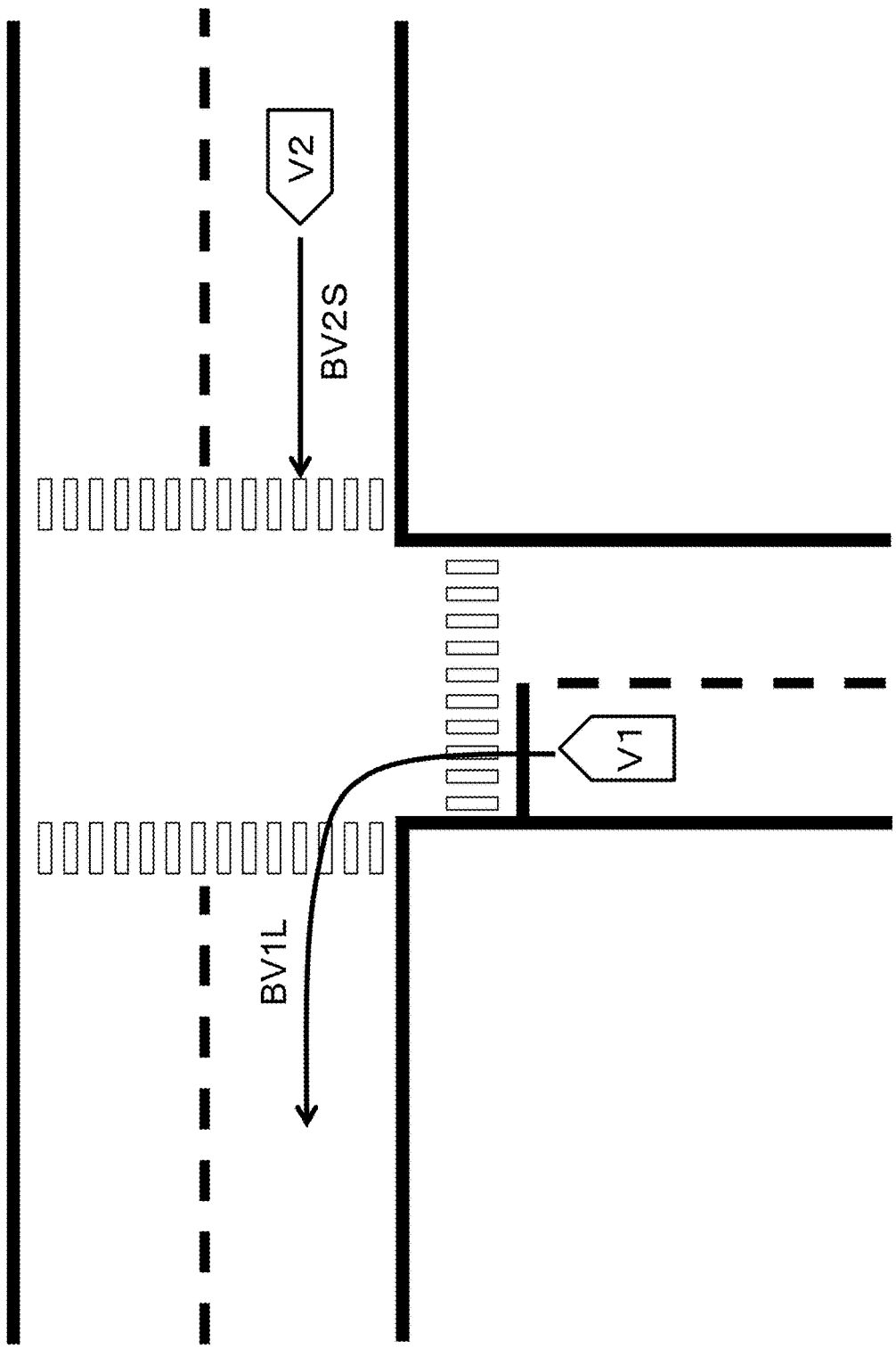
FIG. 19 is a view illustrating a scene describing a scheme of extracting events.

An example of a specific process in the scene illustrated in FIG. 19 will be described. In the scene illustrated in FIG. 19, the subject vehicle V1 turns to the left and enters the priority road of T-intersection from the non-priority road along a first route BV1L.

Figure 20:
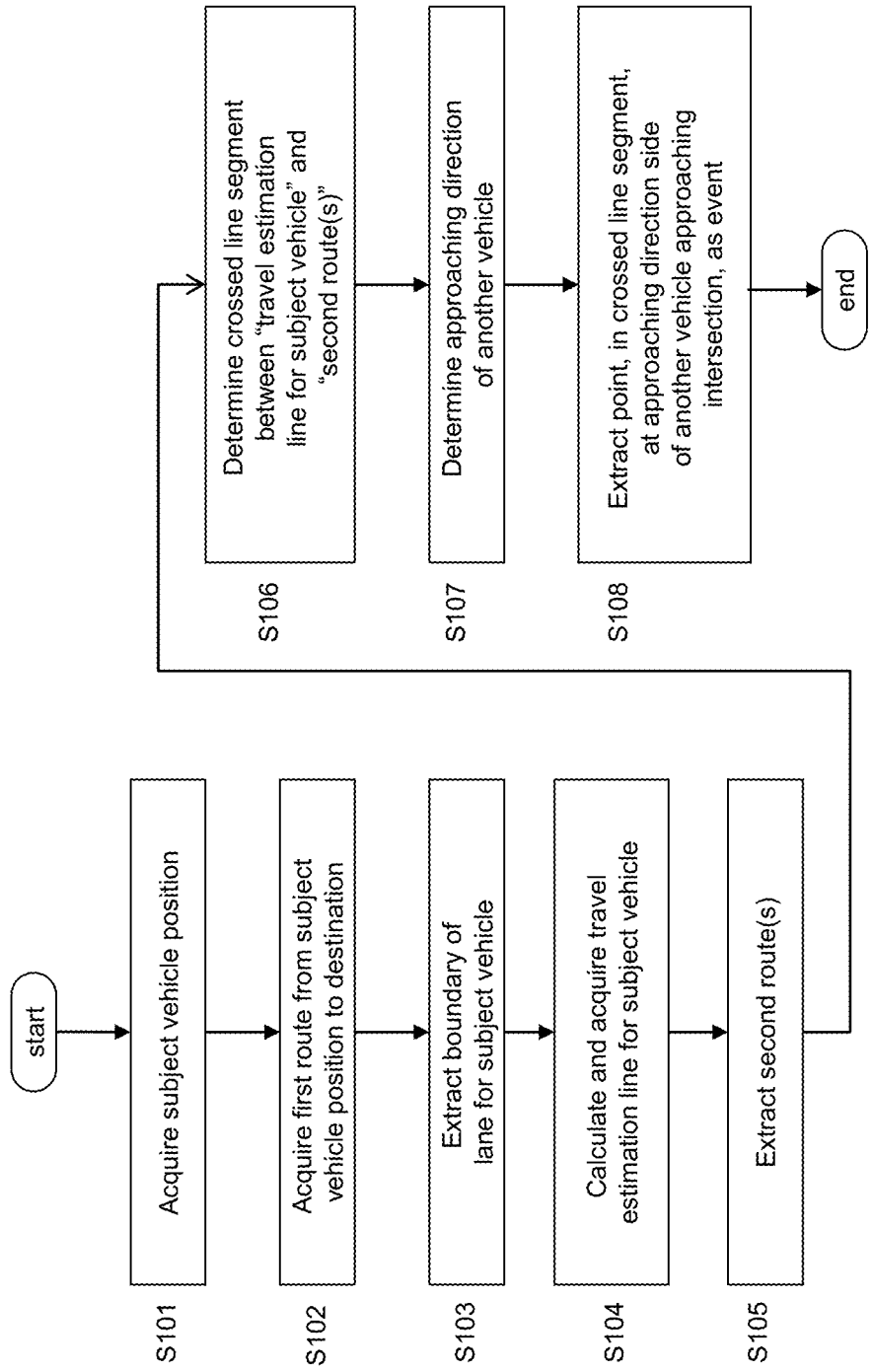
FIG. 20 is a flowchart illustrating a control procedure of a first scheme of extracting events.

FIG. 20 is a flowchart illustrating a control procedure in this process. The control procedure will be described together with a process of extracting events.

In step S101, the determination processor 11 acquires the current position of the subject vehicle from the position detection device 221. In step S102, the determination processor 11 acquires the first route for the subject vehicle V1. The first route is obtained from the current position and the destination. The first route is specified not only with the road but also with the lane which includes directional information. The same applies to the second routes. The determination processor 11 makes the navigation device 220 calculate the routes. In step S103, the determination processor 11 acquires positional information of the boundary (such as lane marks, curbstones, and guardrails) of the first route on which the subject vehicle travels. The determination processor 11 may acquire the information on the boundary of the first route from the map information 222 or the road information 223.

Figure 21:
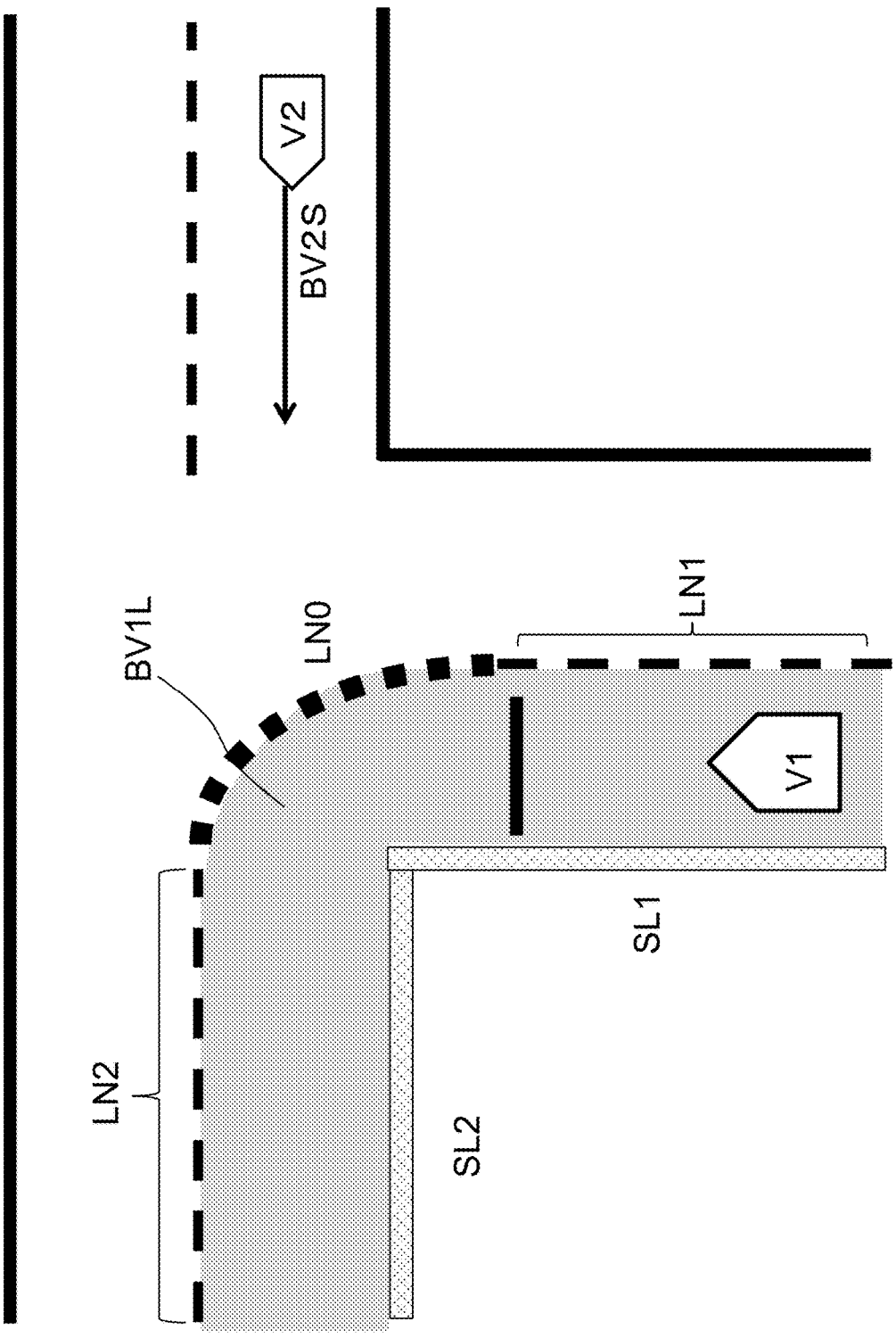
FIG. 21 is a first view for describing the first scheme of extracting events.

In some regions, such as intersections and merging points, boundary information of lanes does not exist on the road. The determination processor 11 therefore creates virtual boundary information for a region that does not have information on the boundary. The determination processor 11 creates a virtual boundary of the lane from boundary information (such as lane marks, curbstones, and guardrails) of the lane around the intersection and destination information of the lane. In an example, as illustrated in FIG. 21, the determination processor 11 creates a virtual boundary LN0 for a lane in an area in which no lane marks are present using boundary information items LN1 and LN2 of lanes around the intersection, boundary information items SL1 and SL2 of curbstones, and left-turn information on the first route BV1L. As illustrated in FIG. 21, the determination processor 11 can create a virtual lane by connecting lane information items of a "lane LN1 on the first route before turning left" and a "lane LN2 on the first route after turning left."

Figure 22:
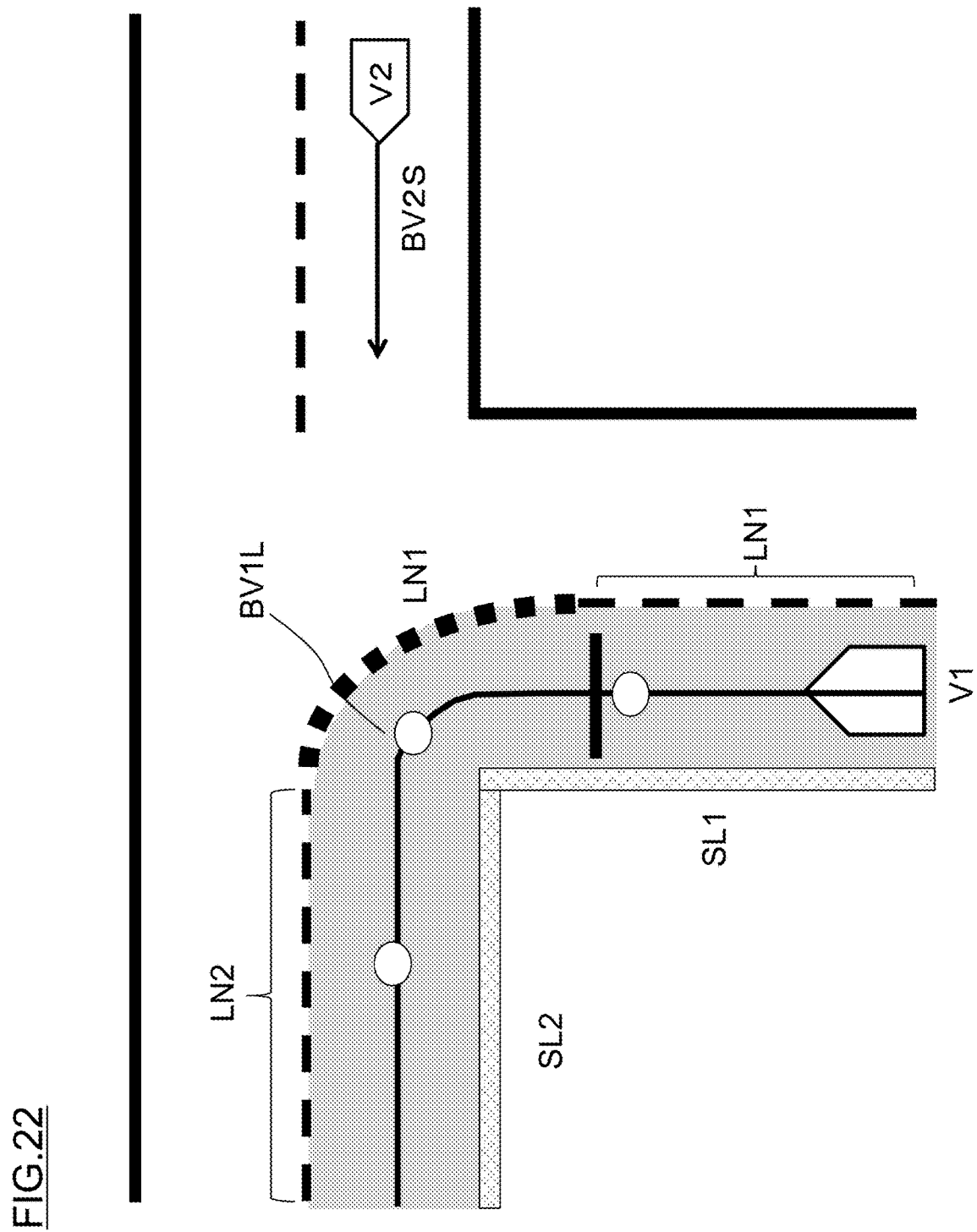
FIG. 22 is a second view for describing the first scheme of extracting events.

In step S104, the determination processor 11 calculates a travel estimation line/strip that is positional information as to where the subject vehicle V1 traveling on the first route will be located in the future. The travel estimation line/strip is associated in the time axis with points to which the subject vehicle is expected to move. The travel estimation line or strip calculated herein may not necessarily be a route defined by a continuous function and may also be a route defined by a discontinuous function. The determination processor 11 may calculate the travel estimation line or strip using the virtual boundary lines of lanes illustrated in FIG. 21. In addition or alternatively, as illustrated in FIG. 22, the determination processor 11 may calculate the travel estimation line using midpoints in the width direction between the virtual boundary lines of lanes and may also calculate the travel estimation strip by specifying a region defined with a predetermined width from the centers of the virtual lanes.

Figure 23:
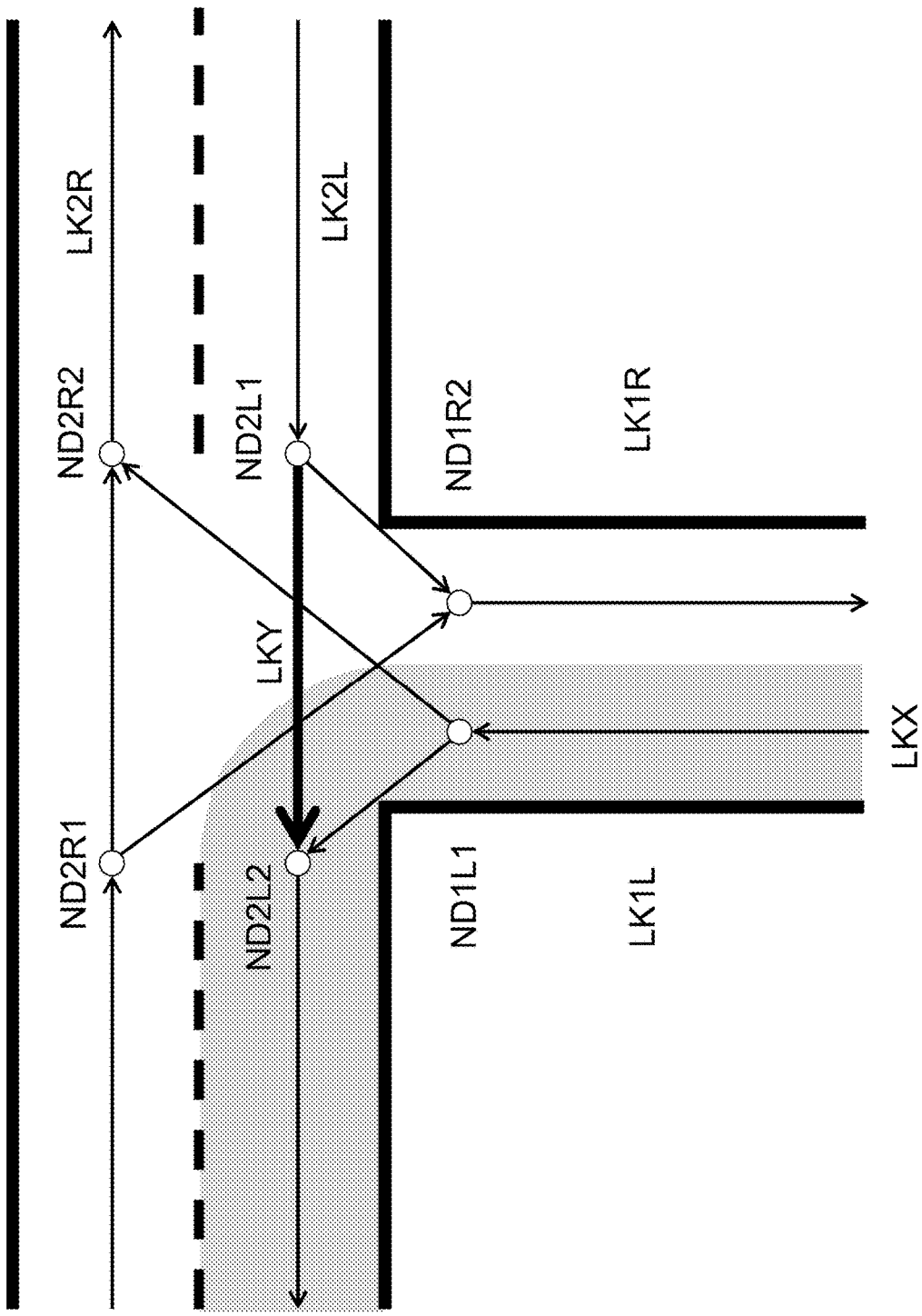
FIG. 23 is a third view for describing the first scheme of extracting events.

In step S105, the determination processor 11 calculates a second route having a point of intersection with the first route. The determination processor 11 calculates the second route using node/link information associated with the first route in the map information 222. For example, as illustrated in FIG. 23, the determination processor 11 reads a plurality of nodes/links that express a T-intersection. In the map information 222, the connecting port of each node represents a connection point in the intersection. Examples of nodes in an intersection include those at which links are branched from one node to two or more nodes and those at which links are unified into one node from two or more nodes. In this process, attention is focused on nodes at which links are unified into one node from two or more nodes. This is because a link that is likely to connect to the first route can be extracted in relation to nodes at which destinations of a number of links gather together. Thus, a second route that may interfere with the first route for the subject vehicle V1 can be extracted.

Figure 24A:
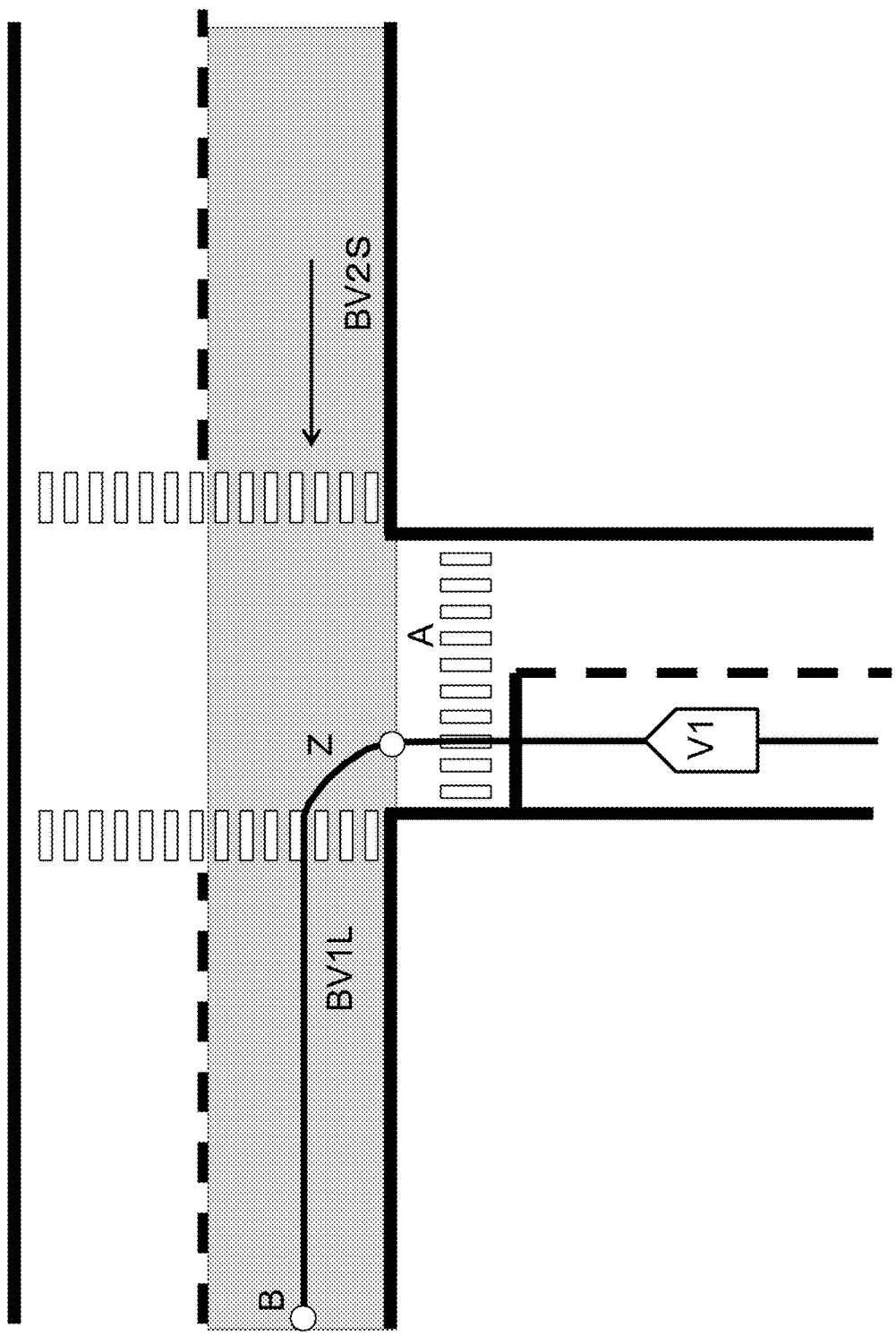
FIG. 24A is a fourth view for describing the first scheme of extracting events.

In step S106, the determination processor 11 obtains a crossed line segment between the travel estimation line and the second route. As illustrated in FIG. 24A, a crossed line segment Z is a line segment that has a finite length. The travel assistance apparatus 100 takes into account the information up to hundreds of meters ahead in order to allow the subject vehicle V1 to travel while responding to events to be encountered. In such a case, the length of the travel estimation line Z is hundreds of meters. On the other hand, the second route is a region that continues so long as the lane continues. The crossed line segment to be obtained herein is represented by points of intersections between the "travel estimation line Z" and a "second route BV." In the example illustrated in FIG. 24A, the crossed line segment lies between a point A and a point B. When the length of the "travel estimation line Z" is determined on the basis of the length of a link, the length of the "travel estimation line Z" is a finite length from one end of a single link to the other end. With reference to the length of the link illustrated in FIG. 23, the length of the "travel estimation line Z" is a length from the point A to a point B', as illustrated in FIG. 24B.

In step S107, the determination processor 11 determines a traveling direction on the second route BV2S. The traveling direction may be determined from the direction of a link as specified by the map information 222. The second route allows traveling in the arrow direction from the right-hand side to the left-hand side in the figure when viewed from the subject vehicle V1.

In step S108, the determination processor 11 selects an event at the point which is nearest to the upstream side (right-hand side in the figure), within the obtained crossed line segment between the second route and the travel estimation line, in the direction along which another vehicle traveling on the second route BV2S approaches the subject vehicle.

Figure 24B:
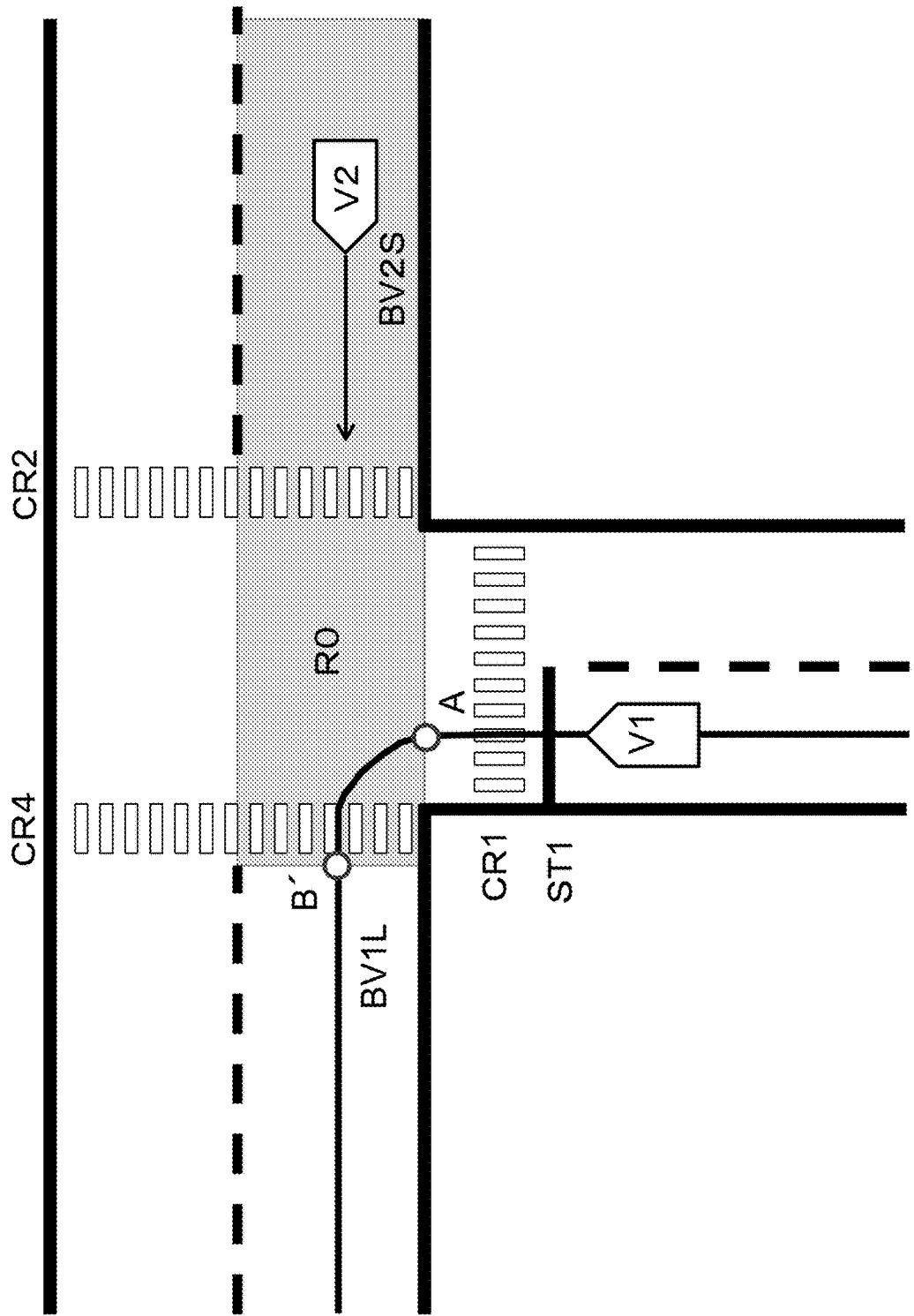
FIG. 24B is a fifth view for describing the first scheme of extracting events.

In the line segment AB illustrated in FIG. 24B, the point which is nearest to the upstream side (right-hand side in the figure) in the traveling direction on the second route BV2S is the point A. This point is located at the rightmost point among points that constitute the line segment AB. This example represents a case of left turn of the subject vehicle V1, so it is opposite when turning to the right.

The point A selected as an event can be positioned at the further upstream side than the crosswalk CR4. Here, if the time is not taken into account, any of the points A and B' illustrated in FIG. 24B can be an event. Extraction of the point B' as an event means that a determination is made that the event occurs after passing through the crosswalk. This contradicts the actual order of encounters with the subject vehicle and a problem occurs in that the action determination based on the order of encounters with the subject vehicle cannot be performed. In contrast, according to one or more embodiments of the present invention, the point A before the crosswalk CR4 can be extracted as an event because the order of encounters with the subject vehicle V1 is taken into account.

According to this process, when the subject vehicle turns to the left and enters the priority road of T-intersection from the non-priority road, the event can be set at an appropriate position with consideration for the traveling direction of a vehicle traveling from left to right on the second route which is the priority-route of the T-intersection. Thus, the event which the subject vehicle encounters can be obtained without inconsistency with the order of encounters with the subject vehicle.

A process of calculating a travel estimation strip and extracting an event using the travel estimation strip will then be described.

As in the embodiment described with reference to FIG. 21, an exemplary scene will be described in which the subject vehicle turns to the left and enters the priority road of T-intersection from the non-priority road and another vehicle travels from right to left on the priority road of T-intersection.

Figure 25:
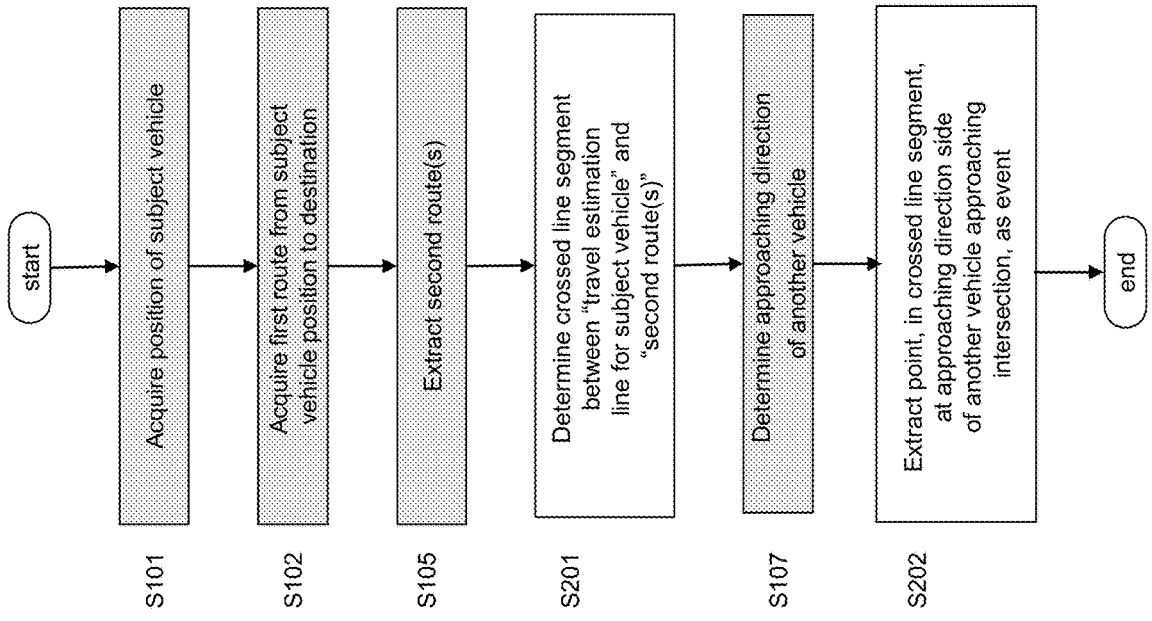
FIG. 25 is a flowchart illustrating a control procedure of a second scheme of extracting events.

FIG. 25 is a flowchart illustrating a control procedure in this process. The process of steps S101, S102, and S105 is the same as the process described previously with reference to FIG. 20.

Figure 26A:
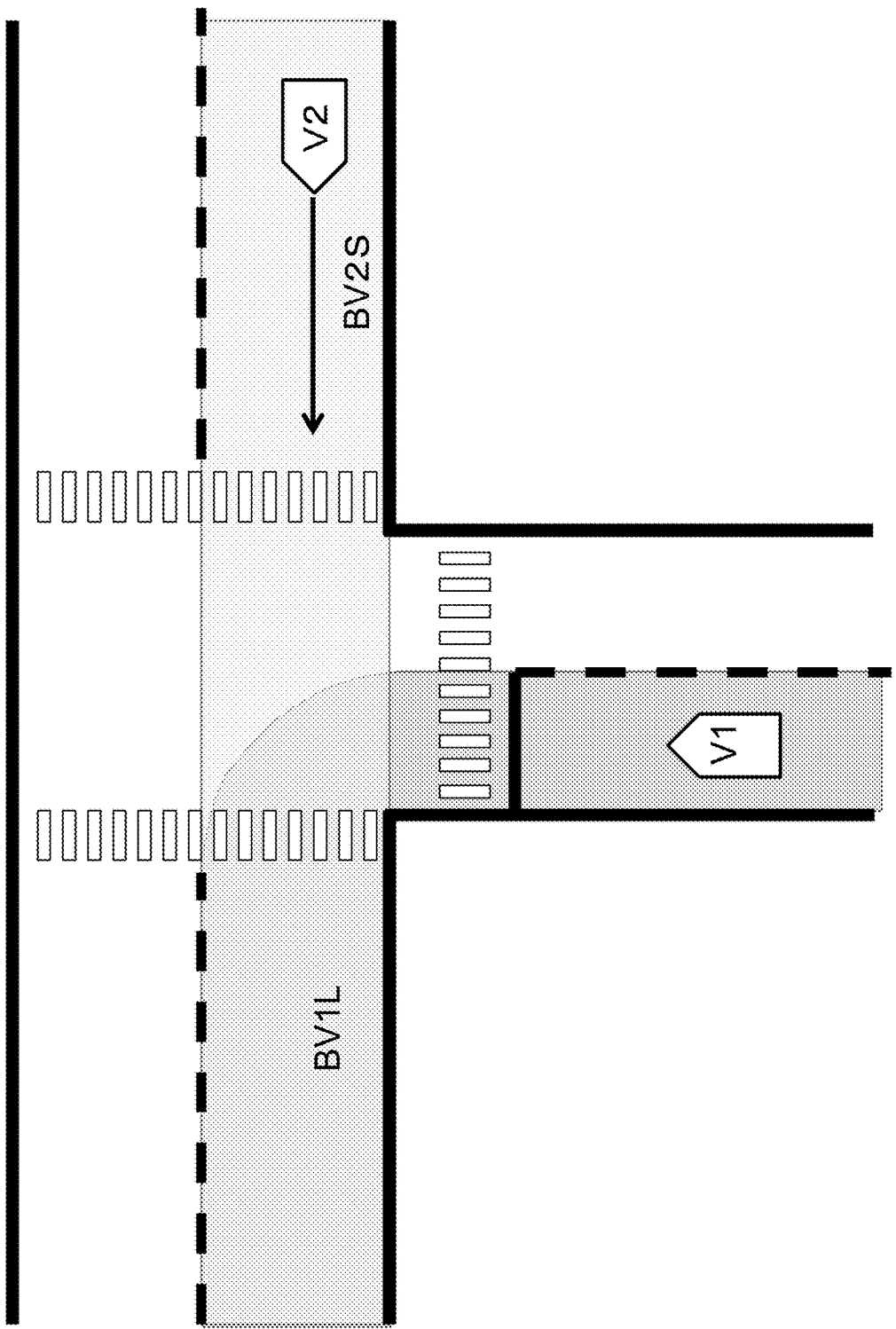
FIG. 26A is a first view for describing the second scheme of extracting events.
Figure 26B:
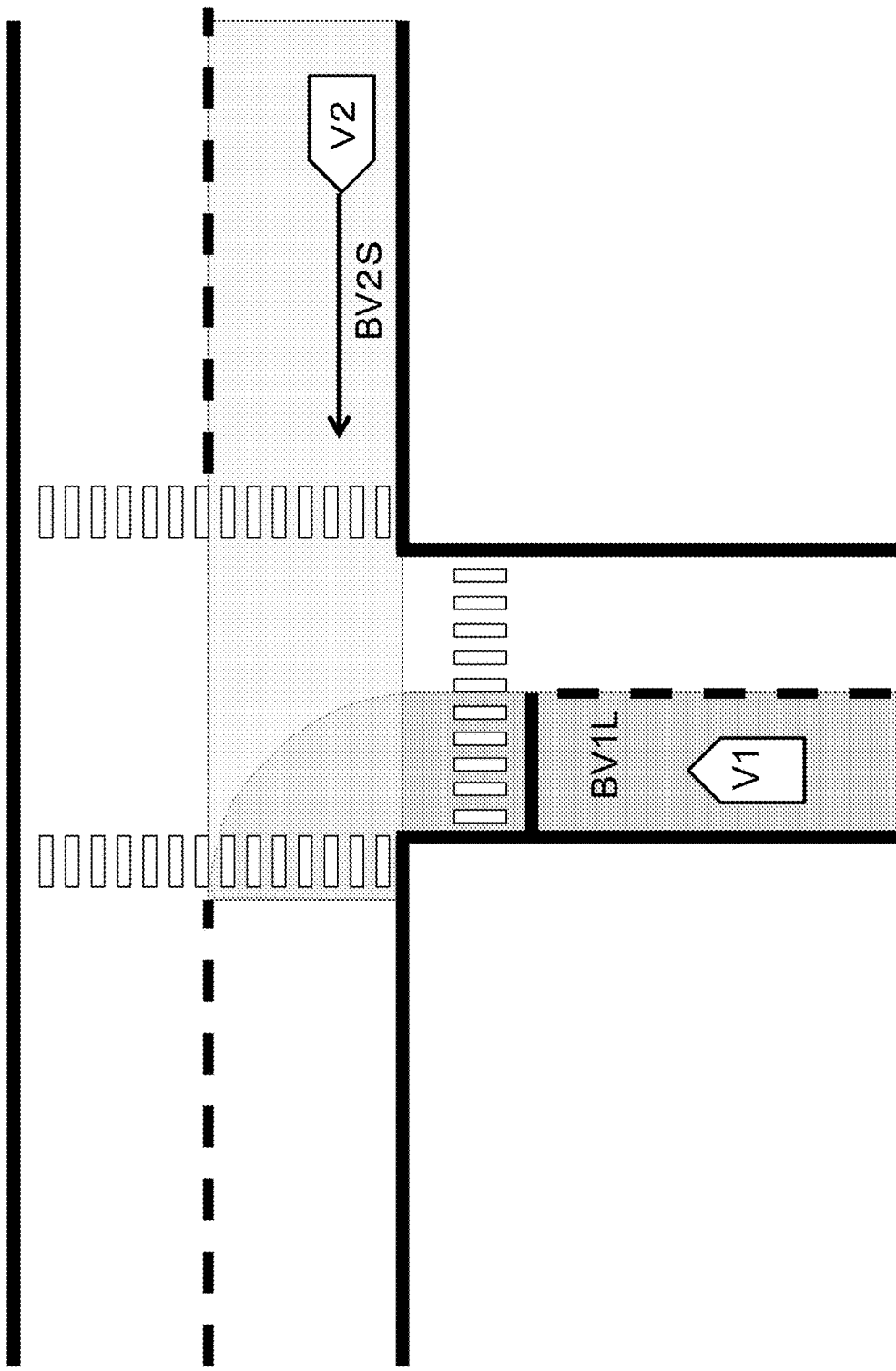
FIG. 26B is a second view for describing the second scheme of extracting events.

In the subsequent step S201, as illustrated in FIG. 26A, the determination processor 11 determines a region in which the travel estimation strip BV1L and the second route overlap each other. The travel estimation strip BV1L is a region having a finite length (width). Depending on the range to be estimated, the length of the travel estimation strip BV1L is up to hundreds of meter. When the travel estimation strip is defined using links as illustrated in FIG. 26B, the travel estimation strip is a region that is defined by the finite lengths (width) of the links.

Step S201 is followed by step S107 in which the determination processor 11 determines the approaching direction of another vehicle traveling on the second route. The approaching direction of another vehicle can be determined from the traveling direction on the second route.

Figure 26C:
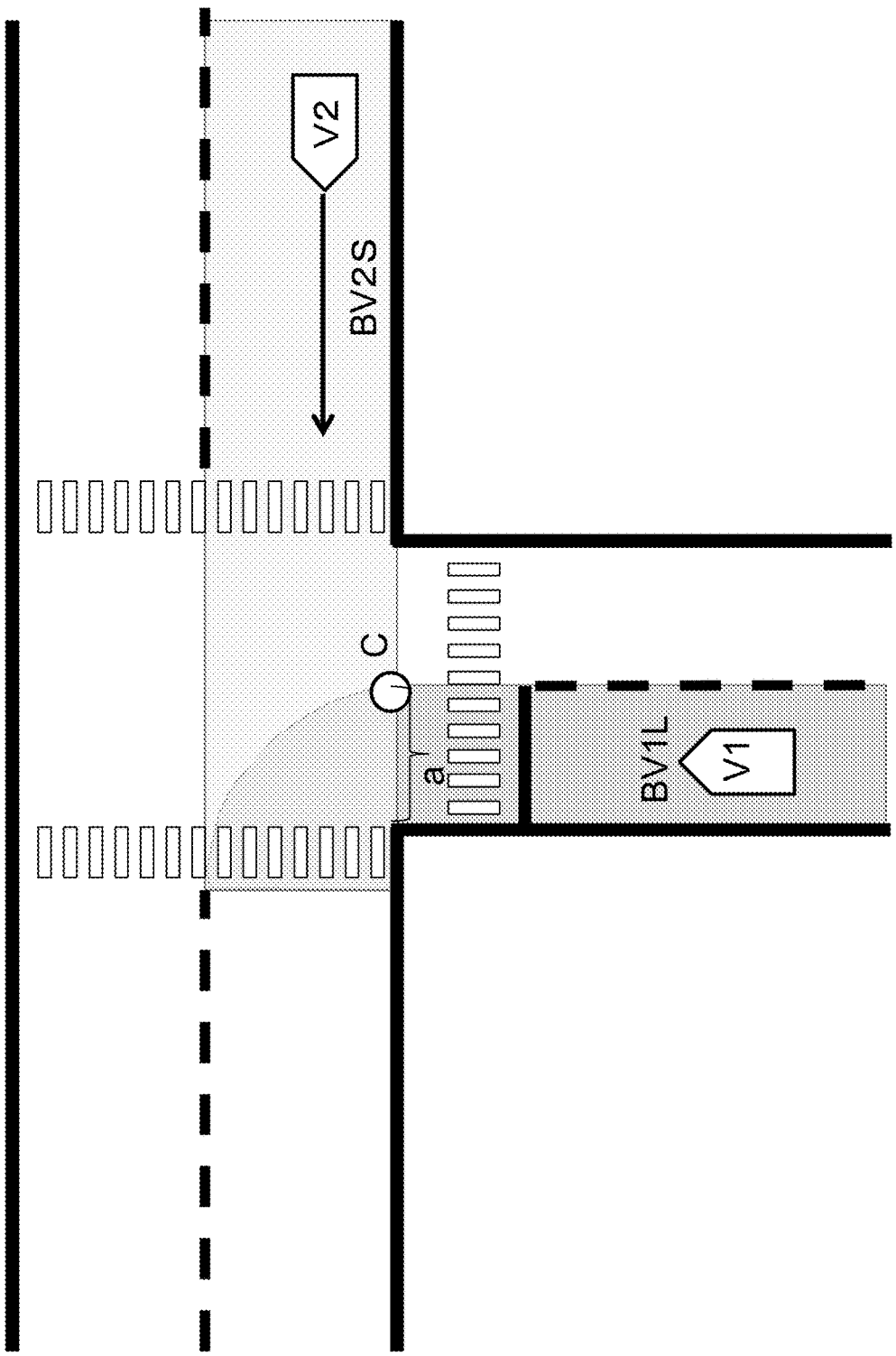
FIG. 26C is a third view for describing the second scheme of extracting events.

In step S202, the determination processor 11 extracts a point that is nearest to another vehicle in the approaching direction of the other vehicle on the second route BV2S. Specifically, as illustrated in FIG. 26C, the event in this example is a point C that is located near to the subject vehicle V1 and at the most upstream side in the traveling direction on the second route BV2S, within a boundary line "a" between the "second route" and the non-overlapping region of the travel estimation strip. It can be found that the point C is positioned ahead of the stop line for the subject vehicle and the crosswalk in the travel estimation strip and before the crosswalk encountered after passing through the intersection.

The determination processor 11 executes a process of unifying events. This process is executed after the process illustrated in FIG. 20. The process of unifying events will be described with reference to the example illustrated in FIG. 27A. In the example of FIG. 27, when the subject vehicle V1 turns to the left at the intersection along the first route BV1L, events are extracted by taking into account another vehicle V3 which turns to the right from the oncoming lane and still another vehicle V2 which travels straight on the second route BV2S intersecting with the first route BV1L.

Figure 27A:
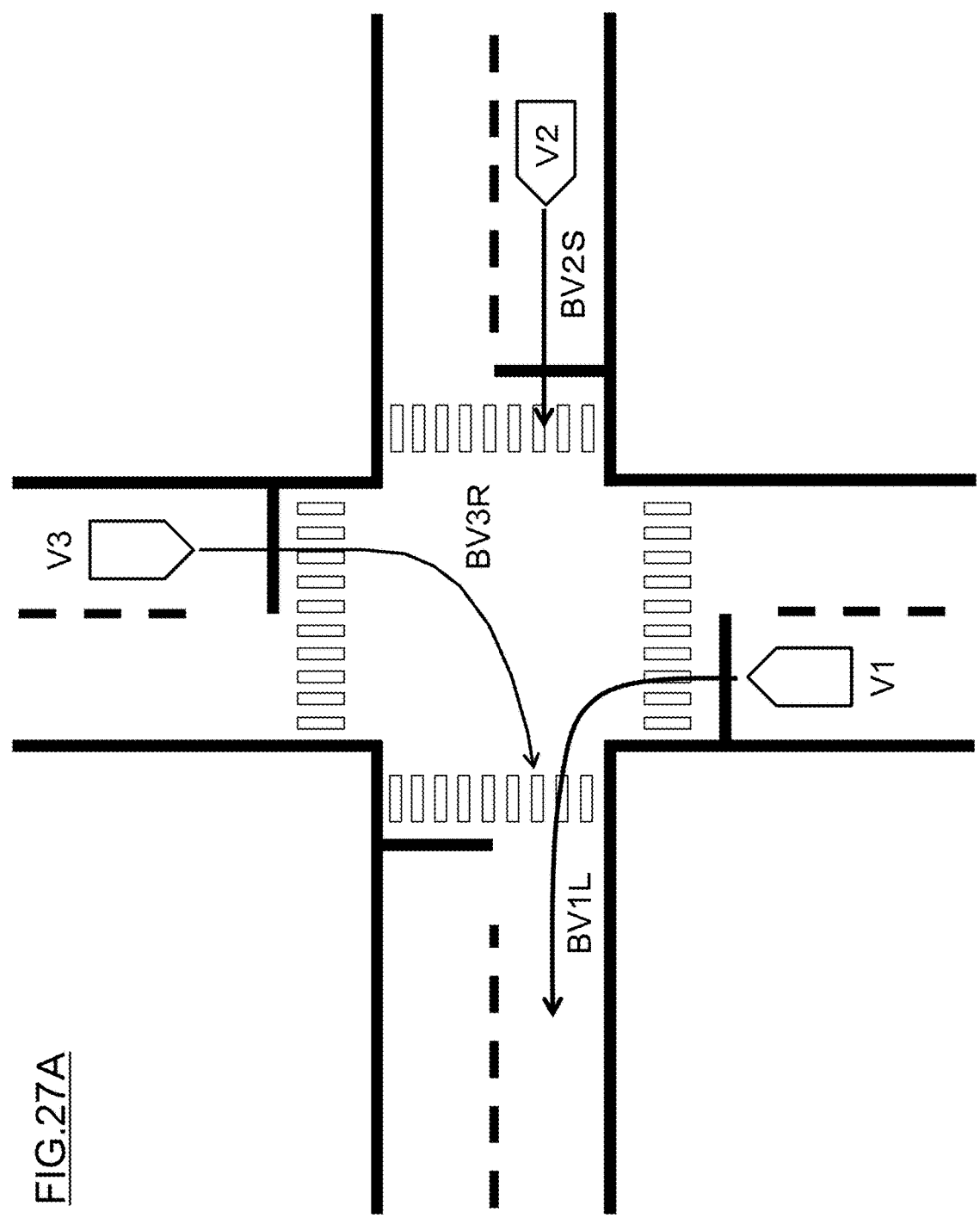
FIG. 27A is a view illustrating a scene describing a scheme of unifying events.
Figure 27B:
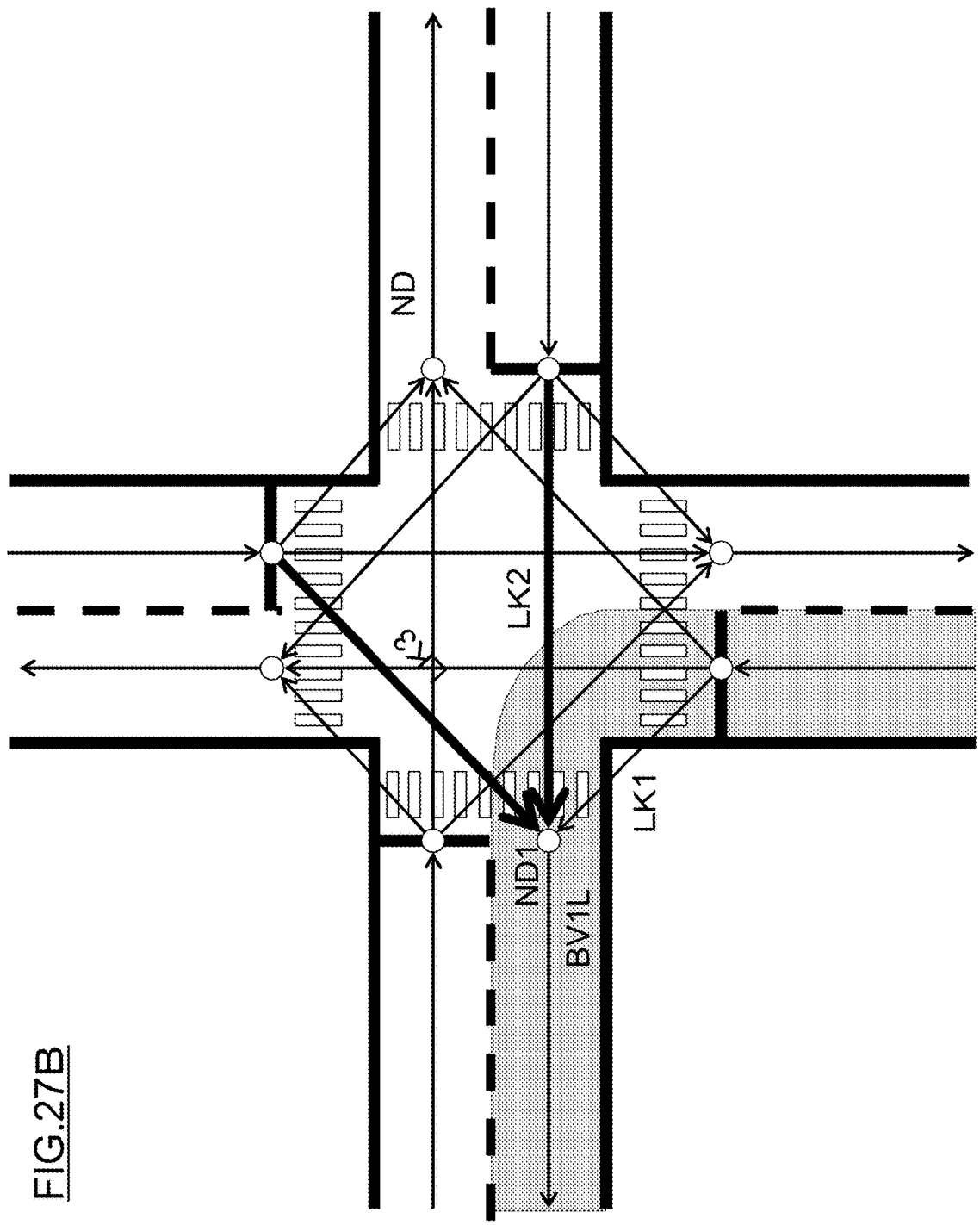
FIG. 27B is a first view for describing the scheme of unifying events.

As illustrated in FIG. 27B, a node ND1 is set immediately after the left turn in the intersection, and three types of links are merged into the node ND1: a link LK1 for the subject vehicle V1 to travel; a link LK3 for another vehicle V3 turning right from the oncoming lane travels; and a link LK2 for still another vehicle V2 traveling from right to left to travel. Thus, by focusing attention on a node at which links are unified into one node from two or more nodes, it is possible to extract links having points of intersections with the first route on which the subject vehicle travels. This enables easy extraction of second routes.

Figure 27C:
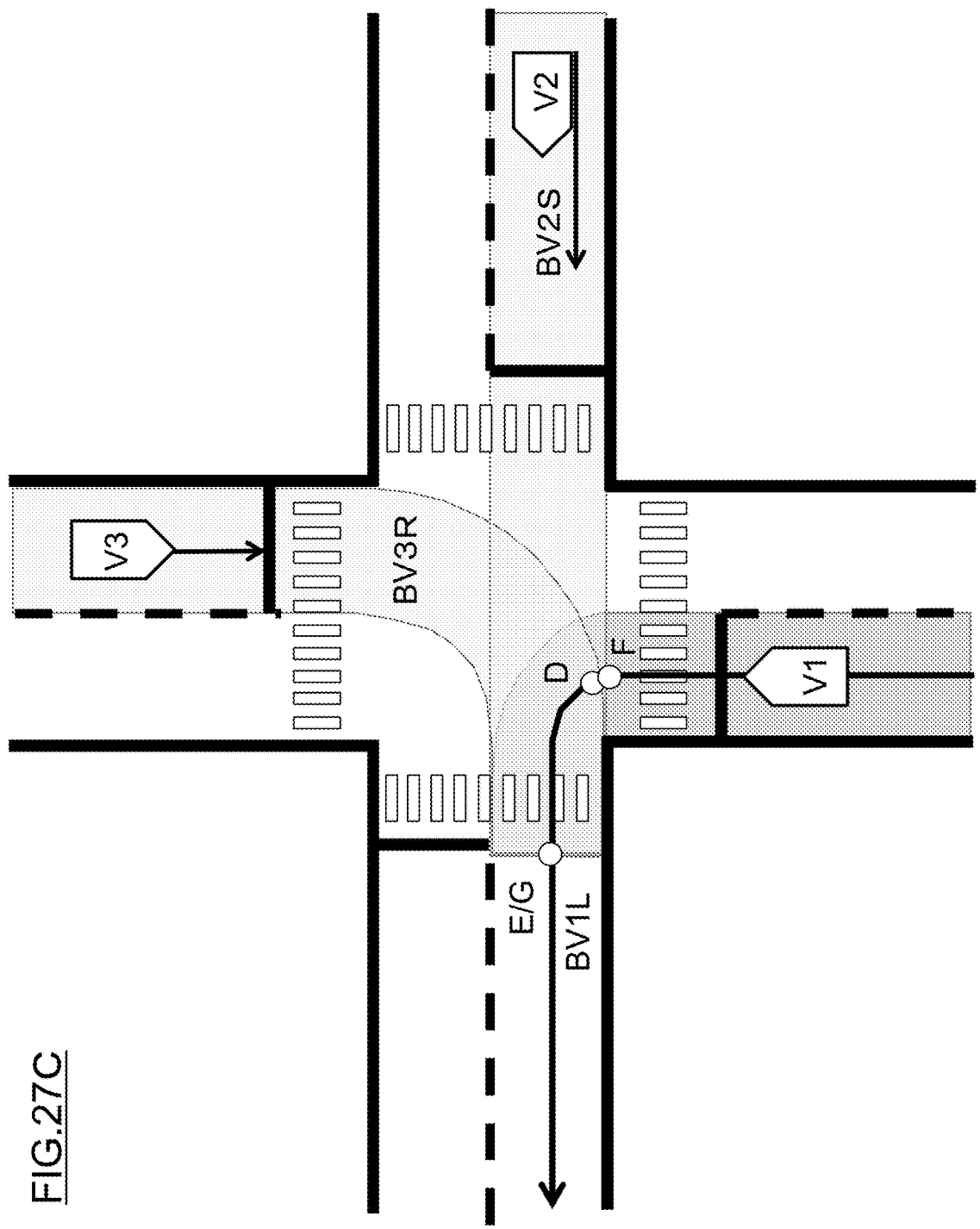
FIG. 27C is a second view for describing the scheme of unifying events.

As illustrated in FIG. 27C, crossed line segments between the travel estimation line (strip) and second routes are obtained. In this example, there are a line segment DE that is the crossed line segment between the "travel estimation line (strip)" and the "second route BV3R" and a line segment FG that is the crossed line segment between the "travel estimation line (strip)" and the "second route BV2S."

A determination is made for the approaching directions of other vehicles traveling on the "second route BV3R" and the "second route BV2S" to determine directions in which the other vehicles approach the subject vehicle V1. In this example, when viewed from the subject vehicle V1, another vehicle V3 moves from top to bottom in the figure and still another vehicle V2 moves from right to left in the figure.

The determination processor 11 extracts a point, in a crossed line segment, that is located at the most upstream side along the direction in which another vehicle approaches, as an event. In this example, points D and F are extracted.

Figure 27D:
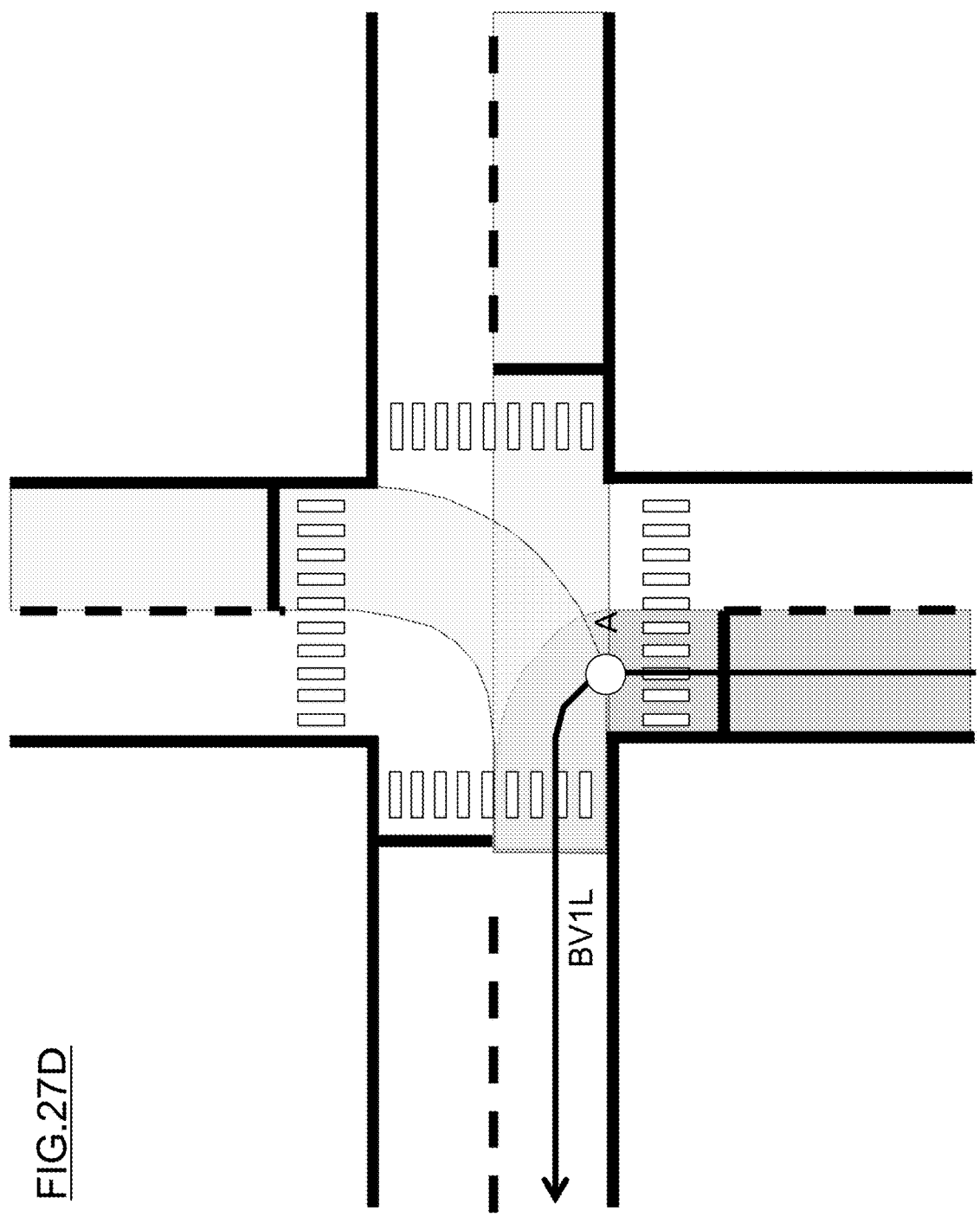
FIG. 27D is a fourth view for describing the scheme of unifying events.

As illustrated in FIG. 27D, when two or more events exist in a certain region, the determination processor 11 unifies them. For example, when two or more events exist within the same lane, they are unified into one event. This allows the stop position to be shared.

Figure 28:
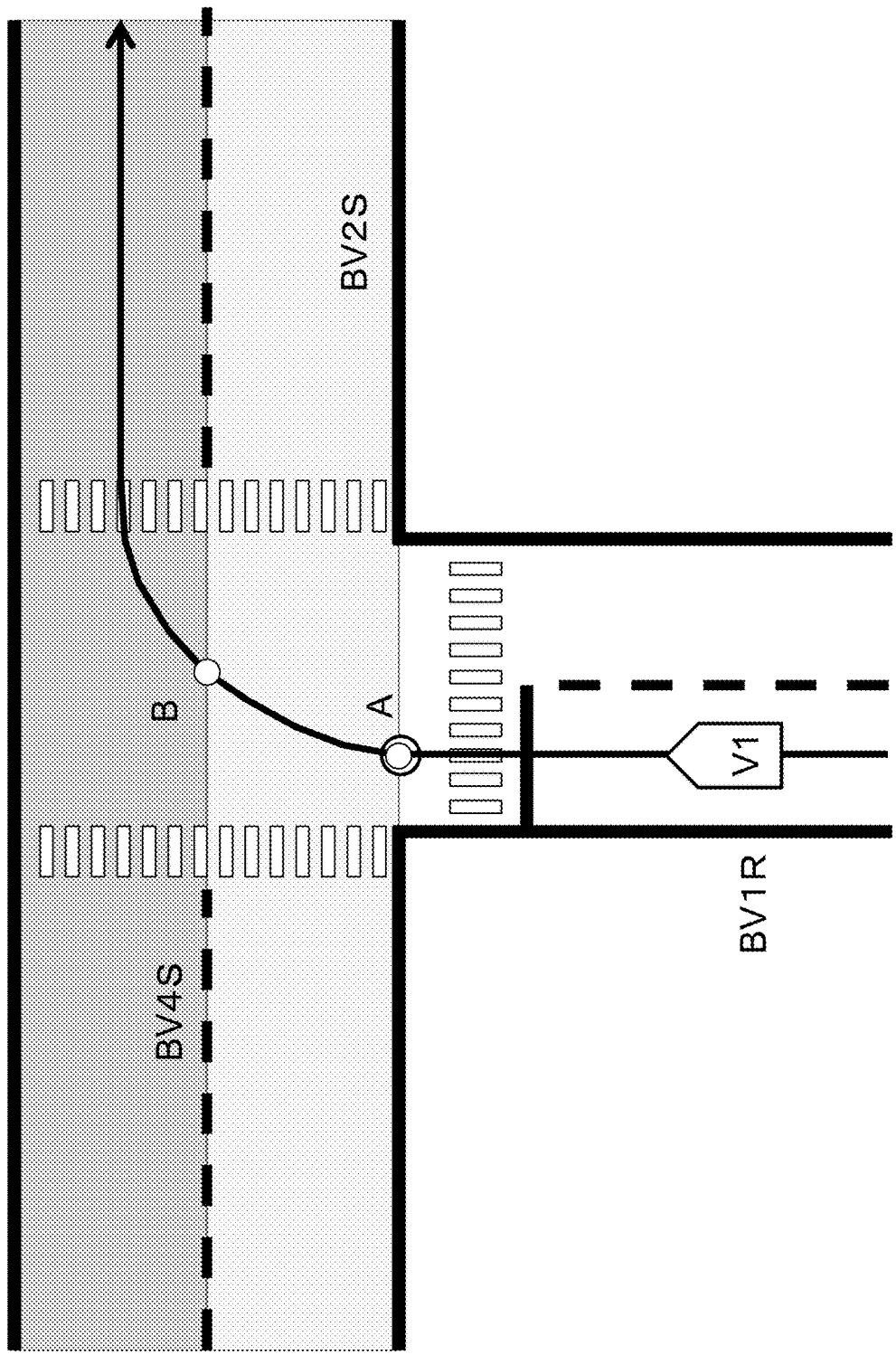
FIG. 28 is a view for describing another example of the scheme of unifying events.

As illustrated in FIG. 28, when the subject vehicle turns to the right at a T-intersection, two interference points A and B exist. The first interference point is the point of intersection between a "first route BV1R" and a "second route BV2S" and the second interference point is the point of intersection between the "first route BV1R" and a "second route BV4S." With regard to stopping at the first and second interference points, they are not within the same lane, but the driver may take an action to make a stop before entering the lane at the nearer side. Thus, when two or more events exist within a certain region or when the stop position for two or more interference points is identical, unification into one interference point allows simple determination of the stop position.

Figure 29:
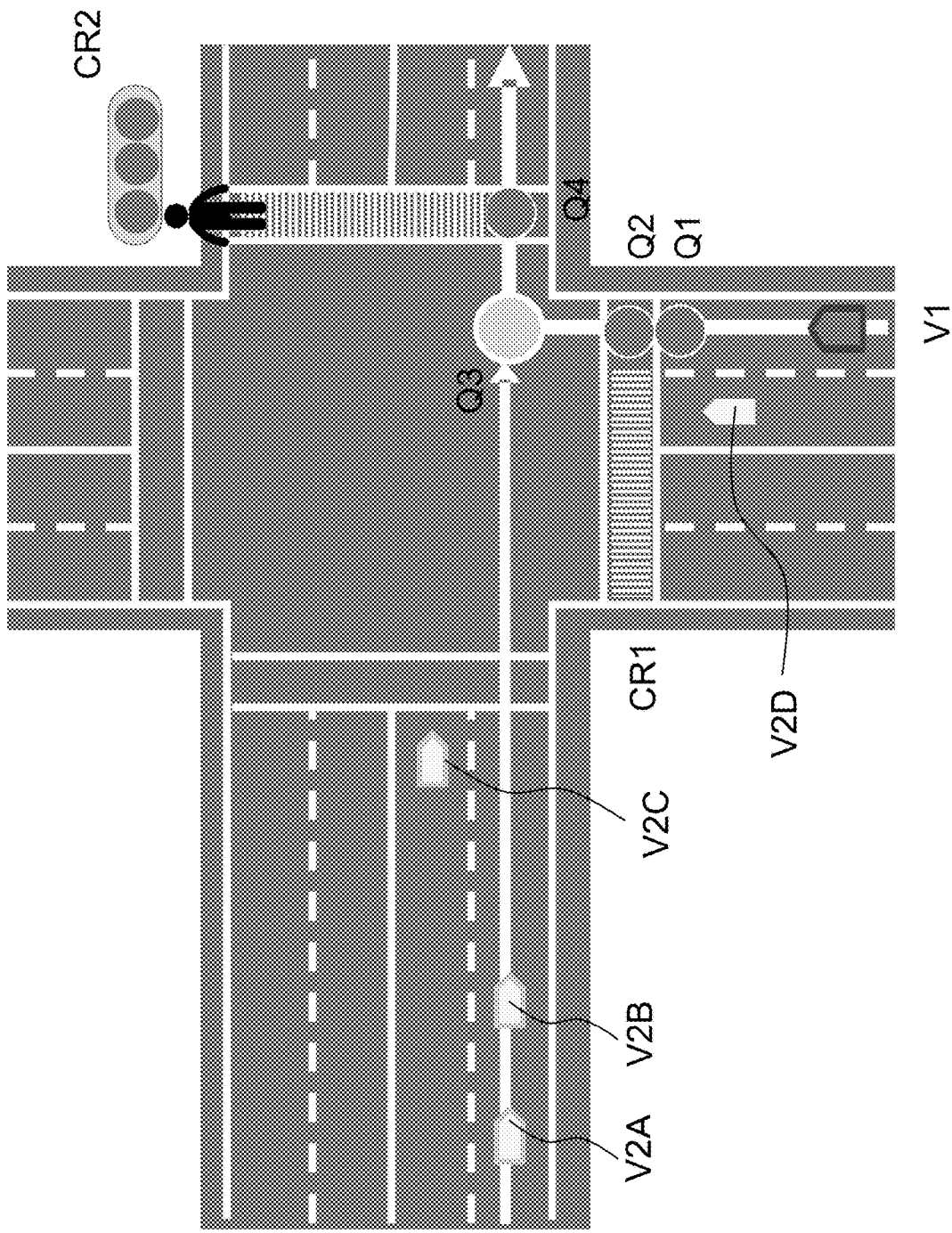
FIG. 29 is a view for describing effects of the present invention.

FIG. 29 illustrates a scene of encounters at an intersection. Events that affect the traveling of the subject vehicle V1 are encounters with the following five objects: (1) existence of another vehicle V2A on a second route merging; (2) existence of still another vehicle V2B on the second route; (3) existence of yet another vehicle V2C on the second route; (4) existence of another vehicle V2D traveling on the adjacent lane; and (5) a pedestrian crossing the crosswalk.

A commonly-used process may include acquiring presence or absence of the above five objects, calculating the positional relationship among the objects, and then determining progressing/stopping. Even in consideration of the determination of presence or absence of the objects, the determination process has to be executed 25 times.

In contrast, according to one or more embodiments of the present invention, the events are narrowed down to events that occur only at the points of intersections between the first route and the second routes to determine progressing/stopping. In the example illustrated in FIG. 29, it suffices that the travel assistance apparatus 100 executes only four determination processes: (1) determination of progressing/stopping at the stop line; (2) determination of progressing/stopping at the crosswalk; (3) determination of progressing/stopping at the point of intersection with the second route; and (4) determination of progressing/stopping at the next crosswalk. Thus, simple determination is enabled by employing information in which the events are narrowed down and arranged in a time-series manner, and the processing load can be reduced.

Figure 30:
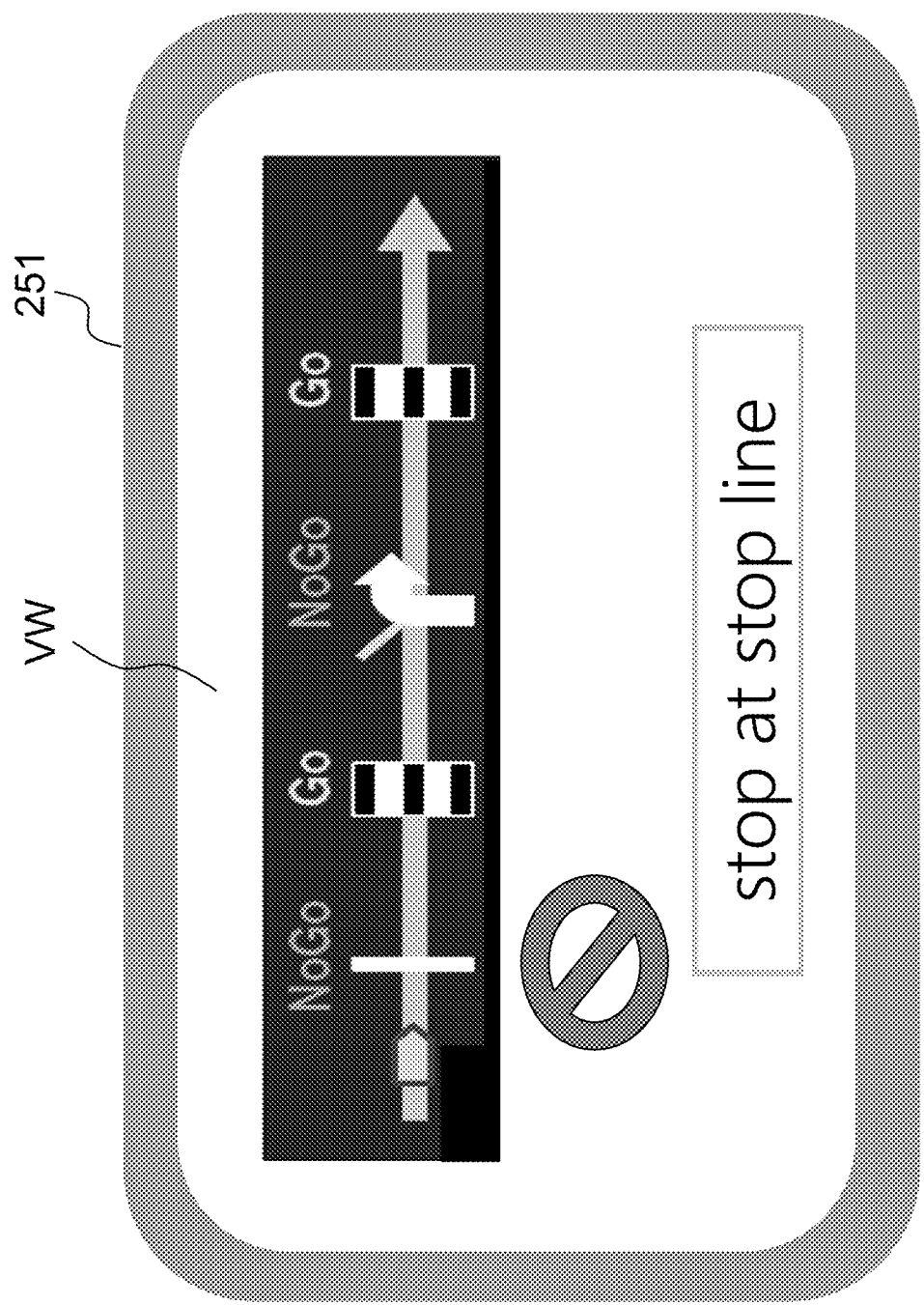
FIG. 30 is an example of display information representing events of the scene illustrated in FIG. 29 in a time-series manner.

Finally, a display example of the determination result of FIG. 29 is illustrated in FIG. 30. As illustrated in FIG. 30, the determination in each event can be expressed in a simple manner. The events to be encountered are associated with the time axis along which the subject vehicle progresses and the user can easily perceive of the events. The user can share the determination contents for the subject vehicle, that is, the contents of the driving operation plan, with the device or apparatus. In particular, when the travel assistance process executes a part or whole of the control of driving, the user can be quickly informed of the driving action at the vehicle side thereby to be assured of the reliability to the control in automated driving (or in partially-automated driving).

The travel assistance apparatus 100 according to one or more embodiments of the present invention is configured and operates as the above and the following effects can be obtained.

(1-1) The scene determination device 10 according to one or more embodiments of the present invention extracts a plurality of events which the subject vehicle traveling on the first route encounters, on the basis of relationships between the first route on which the subject vehicle travels and second routes having points of intersections with the first route, and determines a scene using a relationship between each of the extracted events and the subject vehicle. When the scene determination device 10 according to one or more embodiments of the present invention is used, only the events determined to be important from the viewpoint of determining the action of the subject vehicle can be taken into account to determine the scene which the subject vehicle encounters. Events can be narrowed down to those to be determined and the processing load can therefore be mitigated. In the travel assistance including automated driving, the delay in processing is not preferred. Mitigation of the processing load can reduce the time required for the processing and thus prevent the occurrence of delay in the processing.

(1-2) The scene determination device 10 according to one or more embodiments of the present invention uses a relationship derived from a traffic rule on the first route and a traffic rule on each of the second routes to extract an event which the subject vehicle traveling on the first route encounters. When the scene determination device 10 according to one or more embodiments of the present invention is used, events for which contemplation is necessary from the viewpoint of the traffic rules can be extracted.

(1-3) The scene determination device 10 according to one or more embodiments of the present invention uses detection information of an object existing around the subject vehicle to extract an event which the subject vehicle traveling on the first route encounters. When the scene determination device 10 according to one or more embodiments of the present invention is used, objects that affect the driving of the subject vehicle can be extracted as the events.

(1-4) The scene determination device 10 according to one or more embodiments of the present invention uses positional information of existence of an object to extract an event which the subject vehicle traveling on the first route encounters. When the scene determination device 10 according to one or more embodiments of the present invention is used, the positions of objects can be taken into account to extract the events.

(1-5) The scene determination device 10 according to one or more embodiments of the present invention uses a traffic rule on the first route and a traffic rule on each of the second routes to obtain a priority level regarding passage on the first route and the second route and uses the priority level to extract an event which the subject vehicle traveling on the first route encounters. When the scene determination device 10 according to one or more embodiments of the present invention is used, events for which contemplation is necessary from the viewpoints of a priority route, traffic signal rule, etc. can be extracted.

(1-6) The scene determination device 10 according to one or more embodiments of the present invention uses traffic signal information of the first route and traffic signal information of each of the second routes to obtain a priority level regarding passage on the first route and the second route and uses the priority level to extract an event which the subject vehicle traveling on the first route encounters. When the scene determination device 10 according to one or more embodiments of the present invention is used, events for which contemplation is necessary from the viewpoint of the indication of an actual traffic signal can be extracted.

(1-7) The scene determination device 10 according to one or more embodiments of the present invention uses road information of the first route and road information of each of the second routes to obtain a priority level regarding passage on the first route and the second route and uses the priority level to extract an event which the subject vehicle traveling on the first route encounters. When the scene determination device 10 according to one or more embodiments of the present invention is used, events for which contemplation is necessary from the viewpoints of the road width, traffic volume on the road, road shape, etc. can be extracted.

(1-8) The travel assistance apparatus 100 according to one or more embodiments of the present invention uses relationships between the events determined by the determination processor and the subject vehicle to plan/determine a driving operation plan when traveling on the first route. When the travel assistance apparatus 100 according to one or more embodiments of the present invention is used, the driving operation plan can be planned/determined on the basis of the determination for necessary events. Events are thus narrowed down to those to be contemplated and the processing time can be reduced while planning an appropriate driving operation plan. This allows the travel assistance to be carried out with a reduced delay time.

(1-9) The travel assistance apparatus 100 according to one or more embodiments of the present invention uses positional information of existence of an object to plan/determine driving action for an event which the subject vehicle traveling on the first route encounters. When the travel assistance apparatus 100 according to one or more embodiments of the present invention is used, the driving operation plan can be planned/determined only with contemplation of objects that affect the driving of the subject vehicle.

(1-10) The travel assistance apparatus 100 according to one or more embodiments of the present invention uses a traffic rule on the first route and a traffic rule on each of the second routes to obtain a priority level regarding passage on the first route and the second route and uses the priority level to plan/determine driving action for an event which the subject vehicle traveling on the first route encounters. When the travel assistance apparatus 100 according to one or more embodiments of the present invention is used, the driving operation plan can be planned/determined with consideration for a priority route, traffic signal, and the like.

(1-11) The travel assistance apparatus 100 according to one or more embodiments of the present invention uses traffic signal information of the first route and traffic signal information of each of the second routes to obtain a priority level regarding passage on the first route and the second route and uses the priority level to plan/determine driving action for an event which the subject vehicle traveling on the first route encounters. When the travel assistance apparatus 100 according to one or more embodiments of the present invention is used, the driving operation plan can be planned/determined with consideration for indication of the actual traffic signal.

(1-12) The travel assistance apparatus 100 according to one or more embodiments of the present invention uses road information of the first route and road information of each of the second routes to obtain a priority level regarding passage on the first route and the second route and uses the priority level to plan/determine driving action for an event which the subject vehicle traveling on the first route encounters. When the travel assistance apparatus 100 according to one or more embodiments of the present invention is used, the driving operation plan can be planned/determined with consideration for the road width, traffic volume on the road, road shape, etc.

(1-13) The scene determination method according to one or more embodiments of the present invention includes extracting second routes having points of intersections with a first route on which the subject vehicle travels and extracting a plurality of events which the subject vehicle traveling on the first route encounters, on the basis of relationships between the first route and the second routes. When the scene determination method according to one or more embodiments of the present invention is used, the action and effect described in (1-1) can be obtained.

(2-1) The scene determination device 10 according to one or more embodiments of the present invention extracts a plurality of events which the subject vehicle encounters when traveling on the first route and rearranges the extracted plurality of events in the order of encounters with the subject vehicle. When the scene determination device 10 according to one or more embodiments of the present invention is used, narrowed-down events can be rearranged in the order of encounters with the subject vehicle thereby to determine the events with consideration for the order of encounters without causing a further processing load.

(2-2) The scene determination device 10 according to one or more embodiments of the present invention extracts the events including stationary objects and moving objects and rearranges the stationary objects and moving objects included in the extracted plurality of events in the order of encounters with the subject vehicle. When the scene determination device 10 according to one or more embodiments of the present invention is used, the order of encounters with the objects including stationary objects and moving objects can be determined on the same time axis without causing a further processing load.

(2-3) The scene determination device 10 according to one or more embodiments of the present invention extracts the plurality of events which the subject vehicle traveling on the first route encounters, on the basis of relationships between the first route on which the subject vehicle travels and second routes having points of intersections with the first route, and determines the scene using a relationship between each of the extracted events and the subject vehicle. When the scene determination device 10 according to one or more embodiments of the present invention is used, the scene which the subject vehicle encounters can be determined only with consideration for events that are determined to be important for the subject vehicle to determine an action. Events can be narrowed down to those to be determined and the processing load can therefore be mitigated.

(2-4) The travel assistance apparatus 100 according to one or more embodiments of the present invention displays information items, which represent the extracted events, in the order of encounters with the subject vehicle. When the travel assistance apparatus 100 according to one or more embodiments of the present invention is used, the driver of the subject vehicle V1 can visually recognize what types of events the subject vehicle V1 is to encounter and the order of the encounters.

(2-5) The travel assistance apparatus 100 according to one or more embodiments of the present invention displays the information items representing the extracted events at positions in accordance with ratios of actual distances from the subject vehicle to the events. When the travel assistance apparatus 100 according to one or more embodiments of the present invention is used, the driver of the subject vehicle V1 can visually recognize when, what types of events the subject vehicle V1 is to encounter and the order of the encounters.

(2-6) The travel assistance apparatus 100 according to one or more embodiments of the present invention uses relationships between the events determined by the determination processor and the subject vehicle to plan/determine a driving operation plan for the subject vehicle to travel on the first route. When the travel assistance apparatus 100 according to one or more embodiments of the present invention is used, the driving operation plan can be planned/determined on the basis of the determination of necessary events. Events are narrowed down to those to be contemplated and, therefore, the processing time can be reduced while planning an appropriate driving operation plan. This allows the travel assistance to be carried out with a reduced delay time.

(2-7) The travel assistance apparatus 100 according to one or more embodiments of the present invention extracts a single event which the subject vehicle encounters first and at which the subject vehicle should stop, from the plurality of events which the subject vehicle encounters when traveling on the first route, and plans/determines the driving operation plan such that a point at which the extracted single event occurs is a stop point for the subject vehicle. When the travel assistance apparatus 100 according to one or more embodiments of the present invention is used, the influence on the traffic stream can be mitigated because the subject vehicle V1 is controlled to make a stop at the event which is nearest to the current position of the subject vehicle V1.

(2-8) The scene determination method according to one or more embodiments of the present invention uses a determination processor configured to determine a scene which the subject vehicle traveling on a route encounters. The scene determination method includes extracting a plurality of events which the subject vehicle encounters when traveling on the first route and rearranging and outputting the extracted plurality of events in the order of encounters with the subject vehicle. When the scene determination method according to one or more embodiments of the present invention is used, the action and effect described in (2-1) can be obtained.

(3-1) The scene determination device 10 according to one or more embodiments of the present invention calculates a travel estimation line of time series of the subject vehicle traveling on the first route and determines a scene using a relationship between the subject vehicle and an event that is extracted on the basis of positions of points of intersections between the travel estimation line and a second route having a point of intersection with the first route. It is difficult to separate two or more events that are simultaneously acquired from the current position of the subject vehicle, such as in an image captured by a camera. It is also difficult to correctly determine the order of encounters with two or more events included in a captured image. If the order of encounters cannot be correctly determined, the reliability will deteriorate in the driving operation plan which should be planned/determined in a time-series manner. The use of the scene determination device 10 according to one or more embodiments of the present invention allows the calculation load to be reduced while taking into account the order of encounters with events to plan/determine a highly-accurate driving operation plan.

(3-2) The scene determination device 10 according to one or more embodiments of the present invention extracts the event on the basis of a position of a point of intersection located at the most upstream side along a traveling direction on the second route, among the points of intersections between the travel estimation line and the second route. When the scene determination device 10 according to one or more embodiments of the present invention is used, it is possible to appropriately extract an event (point) that should be paid attention first in the scene.

(3-3) When the subject vehicle travels in a region of the first route in which a lane is not defined, the scene determination device 10 according to one or more embodiments of the present invention refers to map information to calculate the travel estimation line. When the scene determination device 10 according to one or more embodiments of the present invention is used, an appropriate event (point) can be extracted even in a location, such as an intersection and merging point, in which a lane is not defined.

(3-4) The scene determination device 10 according to one or more embodiments of the present invention calculates a travel estimation strip of time series of the subject vehicle traveling on the first route and extracts an event which the subject vehicle encounters, on the basis of the position of a point of intersection between the travel estimation strip and a second route having a point of intersection with the first route. The point of intersection between the travel estimation strip and the second route is obtained at the earliest timing and located at the most upstream side along a traveling direction on the second route, among points of intersections between the travel estimation strip and the second route. The scene determination device 10 determines the scene using a relationship between the extracted event and the subject vehicle. The use of the scene determination device 10 according to one or more embodiments of the present invention can simplify the process for planning an ultimate driving operation plan. The calculation load can be reduced while taking into account necessary events to plan/determine a highly-accurate driving operation plan.

(3-5) When the subject vehicle travels in a region of the first route in which a lane is not defined, the scene determination device 10 according to one or more embodiments of the present invention refers to map information to calculate the travel estimation strip. When the scene determination device 10 according to one or more embodiments of the present invention is used, an appropriate event (point) can be extracted even in a location, such as an intersection and merging point, in which a lane is not defined.

(3-6) The scene determination device 10 according to one or more embodiments of the present invention refers to map information, in which nodes and links are defined, to extract a first node associated with the first route on which the subject vehicle travels. The first node is defined with a connection relationship with other nodes. The scene determination device 10 selects a route to which the other nodes belong, as the second route. The other nodes are defined with the connection relationship with the first node. When the scene determination device 10 according to one or more embodiments of the present invention is used, the information on nodes and links can be utilized to obtain the second route with a reduced calculation load.

(3-7) When two or more extracted events which the subject vehicle encounters are close to each other within a predetermined distance, the scene determination device 10 according to one or more embodiments of the present invention unifies the two or more events into one event. When the scene determination device 10 according to one or more embodiments of the present invention is used, the subject vehicle can travel smoothly in the region R1 of the scene without repeating stop-and-go driving.

(3-8) The travel assistance apparatus 100 according to one or more embodiments of the present invention determines either a progressing action or a stopping action for each of events extracted by the determination processor. When the travel assistance apparatus 100 according to one or more embodiments of the present invention is used, either "stop" or "go" can be determined for each event for which necessity of determination is high, and a correct and simple driving operation plan can thereby be planned/determined.

(3-9) The scene determination method according to one or more embodiments of the present invention includes calculating a travel estimation line of time series of the subject vehicle traveling on the first route, extracting an event which the subject vehicle encounters, on the basis of positions of points of intersections between the travel estimation line and a second route having a point of intersection with the first route, and determining the scene using a relationship between the extracted event and the subject vehicle. When the scene determination method according to one or more embodiments of the present invention is used, the action and effect described in (3-1) can be obtained.

(4-1) The drive planning device 20 according to one or more embodiments of the present invention determines an action (a single action) for each of a plurality of events which the subject vehicle encounters, and plans/determines a series of driving operation plan for a scene which the subject vehicle encounters using content of each action determined for each of the plurality of events. When the drive planning device 20 according to one or more embodiments of the present invention is used, the process for planning an ultimate driving operation plan can be simplified. The calculation load can be reduced while taking into account necessary events to plan/determine a highly-accurate driving operation plan. Moreover, the driving operation plan can be planned/determined in which it is made clear where the subject vehicle should make a stop from start of passing through a scene to completion of passing through the scene.

(4-2) The drive planning device 20 according to one or more embodiments of the present invention determines either a progressing action or a stopping action for each of the plurality of events which the subject vehicle encounters. When the drive planning device 20 according to one or more embodiments of the present invention is used, either "stop" or "go" can be determined for each event for which necessity of determination is high, and a correct and simple driving operation plan can thereby be planned/determined.

(4-3) When a determination of a stopping action or a determination of being undeterminable (impossible to determine) is made for the plurality of events which the subject vehicle encounters, the drive planning device 20 according to one or more embodiments of the present invention controls the subject vehicle to make a stop at an event that is nearest to the subject vehicle. When a point at which the subject vehicle V1 should make a stop exists in the region R1 corresponding to the scene, the use of the drive planning device 20 according to one or more embodiments of the present invention allows the subject vehicle V1 to make a stop immediately and can avoid the risk.

(4-4) When a determination of a progressing action is made for an event of the plurality of events which the subject vehicle encounters and a determination of a stopping action or of being undeterminable is made for a next event to be encountered next to the event, the drive planning device 20 according to one or more embodiments of the present invention controls the subject vehicle to make a stop at an encounter point with the event for which the progressing action is determined. Even in a case in which the progressing action is once determined, when the event which the subject vehicle V1 encounters next requires the stopping action or is undeterminable, the use of the drive planning device 20 according to one or more embodiments of the present invention allows the subject vehicle V1 to make a stop at a position for which the progressing action is once determined. The location for which the progressing action is determined is a location in which the subject vehicle V1 is permitted to exist, and the subject vehicle V1 can therefore make a stop in safety.

(4-5) When a determination of a stopping action or of being undeterminable is made for an event of the plurality of events which the subject vehicle encounters and the event belongs to the second route, the drive planning device 20 according to one or more embodiments of the present invention controls the subject vehicle to make a stop at a position which is located at a further upstream side than the event and at which stopping is possible. Even in a case in which a determination of the stopping action or of being undeterminable is made for an event, when the stop position for the event belongs to the second route, the subject vehicle V1 may obstruct other vehicles traveling on the second route. The stop position is therefore inappropriate. When the drive planning device 20 according to one or more embodiments of the present invention is used, the stop position can be set at the upstream position at which stopping is possible, rather than within the second route.

(4-6) When a determination of a stopping action or of being undeterminable is made for an event of the plurality of events which the subject vehicle encounters and the event is located within a predetermined distance from another event, the drive planning device 20 according to one or more embodiments of the present invention controls the subject vehicle to make a stop at a position which is located at a further upstream side than the event and at which stopping is possible. Even in a case in which a determination of the stopping action or of being undeterminable is made for an event, when the stop position for the event is close to or overlaps the stop position for another event, matching with the determination for the other event may have to be taken into account. The stop position is therefore inappropriate. The use of the drive planning device 20 according to one or more embodiments of the present invention allows the stop position to be set at the upstream position at which stopping is possible, rather than within the second route. This can reduce cases of being undeterminable. Moreover, the load of determination processes can be reduced and the subject vehicle V1 can travel smoothly in the region R1 of the scene without repeating stop-and-go driving.

(4-7) When a determination of the progressing action is made for one event of the plurality of events which the subject vehicle encounters and a determination of the stopping action or of being undeterminable is made for another event to be encountered next to the event, the drive planning device 20 according to one or more embodiments of the present invention plans the driving operation plan such that the subject vehicle progresses through the one event if a degree of separation between the one event and the other event is a predetermined value or more. When separate events are determined in different ways: "progressing" at the upstream side and "stopping" at the downstream side, the subject vehicle V1 can be allowed to progress through the upstream event thereby to prevent the process from being complexed.

(4-8) When a determination of the progressing action is made for one event of the plurality of events which the subject vehicle encounters and a determination of the stopping action or of being undeterminable is made for another event to be encountered next to the event, the drive planning device 20 according to one or more embodiments of the present invention plans/determines the driving operation plan so as to reduce a speed of the progressing action in the one event. When a parking vehicle or the like exists and the parking vehicle is avoidable but objects cannot be sufficiently detected due to a blind area caused by the parking vehicle, the progressing is allowed while the speed during avoidance of the parking vehicle is reduced. This can prevent interference with the traffic stream with consideration for the safety.

(4-9) The travel assistance apparatus 100 according to one or more embodiments of the present invention extracts a plurality of events which the subject vehicle traveling on the first route encounters, on the basis of relationships between the first route on which the subject vehicle travels and second routes having points of intersections with the first route, rearranges the extracted plurality of events in the order of encounters with the subject vehicle, and plans/determines the series of driving operation plan for the scene which the subject vehicle encounters using determined relationships between the subject vehicle and the plurality of events which the subject vehicle encounters in a time-series manner. The use of the travel assistance apparatus 100 according to one or more embodiments of the present invention allows the driving operation plan to be planned/determined on the basis of the determination for necessary events. The narrowed-down events to be contemplated can reduce the processing time while planning an appropriate driving operation plan. The travel assistance can thereby be carried out with a reduced delay time.

(4-10) The drive Planning method according to one or more embodiments of the present invention includes planning the driving operation plan for a scene which the subject vehicle encounters using determination results for relationships between the subject vehicle and a plurality of events which the subject vehicle encounters in a time-series manner when traveling on the first route. When the drive planning method according to one or more embodiments of the present invention is used, the action and effect described in (4-1) can be obtained.

(5-1) The drive planning device 20 according to one or more embodiments of the present invention sets one or more candidate stop positions for the subject vehicle to make a stop, using determination results for relationships between the subject vehicle and a plurality of events which the subject vehicle encounters in a time-series manner when traveling on the first route. The one or more candidate stop positions are set for respective events. The drive planning device 20 plans/determines a driving operation plan for a scene which the subject vehicle encounters using determination results for relationships between the subject vehicle and the plurality of events which the subject vehicle encounters at the candidate stop positions. In the traffic in which the first route and the second routes have points of intersections, the use of the drive planning device 20 according to one or more embodiments of the present invention allows the driving operation plan to be planned/determined with consideration for the relationships between the subject vehicle V1 and the plurality of events which the subject vehicle V1 encounters at the candidate stop positions. The driving can therefore be realized without affecting other vehicles, pedestrians, etc.

(5-2) The drive planning device 20 according to one or more embodiments of the present invention determines a candidate stop position, among the candidate stop positions, that is nearest to the subject vehicle in the scene which the subject vehicle encounters, as a stop position for the subject vehicle to make a stop. According to the drive planning device 20 in one or more embodiments of the present invention, the subject vehicle V1 is controlled to make a stop at the position, among the candidate stop positions, which is nearest to the current position of the subject vehicle V1, and the influence on the traffic stream can be mitigated.

(5-3) The drive planning device 20 according to one or more embodiments of the present invention sets the candidate stop positions at positions located at a further upstream side by predetermined distances than stop positions required for the subject vehicle to make a stop. When the drive planning device 20 according to one or more embodiments of the present invention is used, the influence on the traffic stream can be mitigated because the subject vehicle V1 is controlled to make a stop at a position that is nearer to the current position of the subject vehicle than the stop position defined in the traffic rule information 224.

(5-4) The drive planning device 20 according to one or more embodiments of the present invention sets the candidate stop positions at positions located at a further upstream side by predetermined distances than an outer edge of a region in which parking and stopping of the subject vehicle are prohibited. The influence on the traffic stream can be mitigated because the subject vehicle V1 is controlled to make a stop at a position that is nearer to the current position of the subject vehicle than the stop position defined in the actual traffic rule information 224.

(5-5) The drive planning device 20 according to one or more embodiments of the present invention sets the candidate stop positions outside/nearside a travelable region of another route as a second route that intersects with the first route. The influence on the traffic stream can be mitigated because the subject vehicle V1 is controlled to make a stop at a position that is nearer to the current position of the subject vehicle V1 than a position located inside a lane of the second route or than the outer edge of the travelable region.

(5-6) When the subject vehicle passes through one event and the vehicle body of the subject vehicle protrudes from the first route, the drive planning device 20 according to one or more embodiments of the present invention plans/determines the driving operation plan such that the subject vehicle makes a stop at a candidate stop position that is located at an upstream side adjacent to the one event. When the subject vehicle V1 protrudes from the first route, that is, when the vehicle body of the subject vehicle V1 may enter a lane of another route or its travelable region, the influence on the traffic stream can be mitigated because the subject vehicle V1 is controlled to make a stop at the position of an event that is nearer to the current position of the subject vehicle V1.

(5-7) The drive planning device 20 according to one or more embodiments of the present invention does not set the candidate stop positions in a region in which events which the subject vehicle encounters do not occur due to a traffic signal on the first route or a traffic rule on the first route. According to the drive planning device 20 in one or more embodiments of the present invention, stopping can be avoided in a scene in which stopping is not required, and smooth traveling can be performed.

(5-8) When another vehicle merges into the first route at the position of a candidate stop position from a second route having a point of intersection with the first route and the speed of the other vehicle is a specified speed or less, the drive planning device 20 according to one or more embodiments of the present invention determines stopping at another candidate stop position that is located at the upstream side adjacent to the candidate stop position. When the speed of another vehicle merging into the first route at the position of a candidate stop position is a specified speed or less, the subject vehicle can make a stop at a candidate stop position near the current position of the subject vehicle thereby to take a driving action that does not affect the streams of other vehicles and pedestrians.

(5-9) The travel assistance apparatus 100 according to one or more embodiments of the present invention extracts a plurality of events which the subject vehicle traveling on the first route encounters, on the basis of relationships between the first route on which the subject vehicle travels and second routes having points of intersections with the first route and sets one or more candidate stop positions for the subject vehicle to make a stop, on the basis of determined relationships between the subject vehicle and the events. The one or more candidate stop positions are set for respective events. The travel assistance apparatus 100 determines a stop position for the subject vehicle to make a stop, in accordance with determination results for relationships between the subject vehicle and the plurality of events which the subject vehicle encounters at the candidate stop positions, and controls the subject vehicle to make a stop at the stop position. The use of the travel assistance apparatus 100 according to one or more embodiments of the present invention allows the driving operation plan to be planned/determined on the basis of the determination for necessary events. The narrowed-down events to be contemplated can reduce the processing time while planning an appropriate driving operation plan. The travel assistance can thereby be carried out with a reduced delay time.

(5-10) The drive planning method according to one or more embodiments of the present invention includes setting one or more candidate stop positions for the subject vehicle to make a stop, using determination results for relationships between the subject vehicle and a plurality of events which the subject vehicle encounters in a time-series manner when traveling on the first route. The one or more candidate stop positions are set for respective events. The drive planning method further includes planning a driving operation plan for a scene which the subject vehicle encounters using determination results for relationships between the subject vehicle and the plurality of events which the subject vehicle encounters at the candidate stop positions. When the drive planning method according to one or more embodiments of the present invention is used, the action and effect described in (5-1) can be obtained.

Embodiments heretofore explained are described to facilitate understanding of the present invention and are not described to limit the present invention. It is therefore intended that the elements disclosed in the above embodiments include all design changes and equivalents to fall within the technical scope of the present invention.

That is, in the present description, one or more embodiments of the travel assistance apparatus according to the present invention are described by exemplifying the travel assistance apparatus 100 which includes the scene determination device 10, the drive planning device 20, and the output device 30, but the present invention is not limited to this.

In the present description, one or more embodiments of the scene determination device according to the present invention are described by exemplifying the scene determination device 10 which includes the determination processor 11, but the present invention is not limited to this. In the present description, one or more embodiments of the drive planning device according to the present invention are described by exemplifying the drive planning device 20 which includes the drive planning processor 21, but the present invention is not limited to this. In the present description, one or more embodiments of the output device according to the present invention are described by exemplifying the output device 30 which includes the output control processor 31, but the present invention is not limited to this. As will be understood, the determination processor 11, the drive planning processor 21, and the output control processor 31 may be configured as a single processor and may also be configured as multiple processors.

In the present description, an example of the onboard apparatus is described by exemplifying the onboard apparatus 200 which includes the vehicle controller 210, navigation device 220, object detection device 230, lane departure prevention device 240, output device 250, detection device 260, drive device 270, and steering device 280, but the present invention is not limited to this. There is no restriction to arranging any of the scene determination device, drive planning device, output device, and travel assistance apparatus according to the present invention together with any existing device or apparatus which is applicable to vehicles at the time of filing of this application.

REFERENCE SIGNS LIST

1 Travel assistance system
100 Travel assistance apparatus
10 Scene determination device
11 Determination processor
20 Drive planning device
21 Drive planning processor
30 Output device
31 Output control processor
210 Vehicle controller
   220 Navigation device
   221 Position detection device
   222 Map information
   223 Road information
   224 Traffic rule information
230 Object detection device
   231 Camera
   232 Radar device
240 Lane departure prevention device
   241 Camera
   242 Road information
250 Output device
   251 Display
   252 Speaker
260 Detection device
   261 Steering angle sensor
   262 Vehicle speed sensor
   263 Attitude sensor
270 Drive device
   271 Braking device
280 Steering device

The invention claimed is:

1. A drive planning device comprising:
a drive planning processor configured to plan a driving operation plan for a subject vehicle traveling on a route, the drive planning processor executing a process to:
determine an action for each of a plurality of events which the subject vehicle encounters in a time-series manner when traveling on a first route; and
plan a series of driving operation plan for a scene which the subject vehicle encounters using content of each action determined for each of the plurality of events,
wherein, when a determination of a progressing action is made for one event of the plurality of events which the subject vehicle encounters and a determination of a stopping action or of being undeterminable is made for another event to be encountered next to the one event, the drive planning processor plans the driving operation plan such that the subject vehicle progresses through the one event and makes a stop based on a position of the other event.

2. The drive planning device according to claim 1, wherein the drive planning processor determines either a progressing action or a stopping action for each of the plurality of events which the subject vehicle encounters.

3. The drive planning device according to claim 1, wherein, when a determination of a stopping action or of being undeterminable is made for the plurality of events which the subject vehicle encounters, the drive planning processor plans the driving operation plan such that the subject vehicle makes a stop at an event, among the plurality of events, that is nearest to the subject vehicle.

4. The drive planning device according to claim 1, wherein, when a determination of a stopping action or of being undeterminable is made for an event of the plurality of events which the subject vehicle encounters and the event belongs to another route as a second route having a point of intersection with the first route, the drive planning processor plans the driving operation plan such that the subject vehicle makes a stop at a position at which stopping is possible, wherein the position is located at a further upstream side than the event.

5. The drive planning device according to claim 1, wherein, when a determination of a stopping action or of being undeterminable is made for an event of the plurality of events which the subject vehicle encounters and the event is located within a predetermined distance from another event, the drive planning processor plans the driving operation plan such that the subject vehicle makes a stop at a position at which stopping is possible, wherein the position is located at a further upstream side than the other event.

6. The drive planning device according to claim 1, wherein, when a determination of a progressing action is made for one event of the plurality of events which the subject vehicle encounters and a determination of a stopping action or of being undeterminable is made for another event to be encountered next to the one event, the drive planning processor plans the driving operation plan so as to reduce a speed of the progressing action in the one event.

7. A travel assistance apparatus comprising:
the drive planning device according to claim 1; and
a scene determination device including a determination processor configured to determine the scene which the subject vehicle encounters, the determination processor being operative to:
extract the plurality of events which the subject vehicle traveling on the first route encounters, on a basis of relationships between the first route on which the subject vehicle travels and other routes as second routes having points of intersections with the first route; and
rearrange the extracted plurality of events in order of encounters with the subject vehicle,
the drive planning processor being operative to plan the series of driving operation plan for the scene which the subject vehicle encounters using determined relationships between the subject vehicle and the plurality of events which the subject vehicle encounters in a time-series manner.

8. A drive planning method using a drive planning processor configured to plan a driving operation plan for a subject vehicle, the drive planning method comprising:
executing a process of planning the driving operation plan for a scene which the subject vehicle encounters using determination results for relationships between the subject vehicle and a plurality of events which the subject vehicle encounters in a time-series manner when traveling on a first route,
wherein the process includes, when a determination of a progressing action is made for one event of the plurality of events which the subject vehicle encounters and a determination of a stopping action or of being undeterminable is made for another event to be encountered next to the one event, planning the driving operation plan such that the subject vehicle progresses through the one event and makes a stop based on a position of the other event.

* * * * *